(12) United States Patent
Smith et al.

(10) Patent No.: US 7,396,971 B2
(45) Date of Patent: Jul. 8, 2008

(54) TWO STAGE HYDROCARBON CONVERSION REACTION SYSTEM

(75) Inventors: Jeffrey S. Smith, Seabrook, TX (US); Keith Holroyd Kuechler, Friendswood, TX (US); Nicolas P. Coute, Houston, TX (US); Rathna P. Davuluri, Fairfax, VA (US); David C. Skouby, Centreville, VA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 619 days.

(21) Appl. No.: 10/210,217

(22) Filed: Aug. 1, 2002

(65) Prior Publication Data

US 2004/0024276 A1    Feb. 5, 2004

(51) Int. Cl.
*C07C 1/20* (2006.01)
(52) U.S. Cl. ...................... 585/640; 585/639
(58) Field of Classification Search .................. 585/639, 585/640, 638
See application file for complete search history.

(56) References Cited

U.S. PATENT DOCUMENTS

| 5,191,141 A | 3/1993 | Barger et al. ................. 585/640 |
| 6,166,282 A | 12/2000 | Miller ......................... 585/638 |

FOREIGN PATENT DOCUMENTS

| EP | 1046695 | 4/2000 | |
| GB | 767 312 | 1/1957 | ................. 767/312 |
| WO | WO 01/04079 | 1/2000 | |

OTHER PUBLICATIONS

Grace et al., "Situating the High-Density Circulating Fluidized Bed," AIChE Journal, vol. 45, No. 10, Oct. 1999, pp. 2108-2116.
Maojun et al., "Determination of Particle Velocity Distribution in Two Kinds of Riser Reactor", Petroleum Processing and Petrochemicals, vol. 31, No. 2, Feb. 2000.

*Primary Examiner*—Thuan Dinh Dang

(57) ABSTRACT

This invention is to a method and system for operating a hydrocarbon conversion process. A two stage reactor system is used in which the gas superficial velocity of the second reaction stage is greater than that in the first reaction stage. The first reaction stage operates at more continuous stirred tank reactor (CSTR) like characteristics, and the second reaction stage operates at more plug flow reactor (PFR) like characteristics.

23 Claims, 9 Drawing Sheets

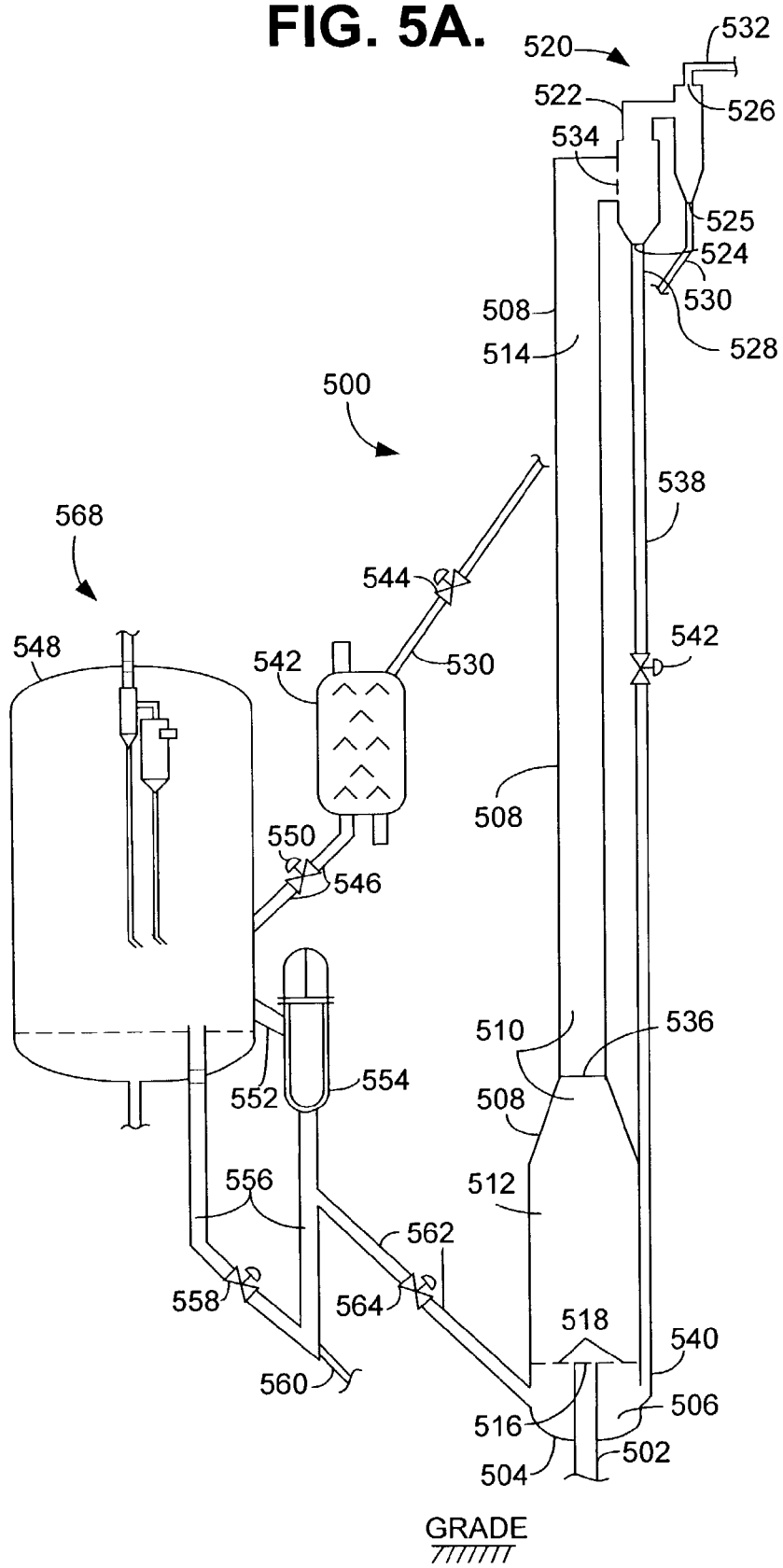
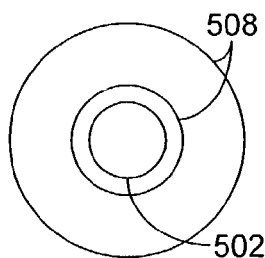
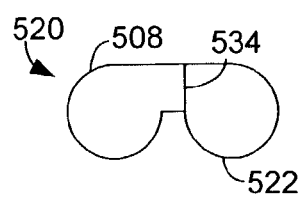
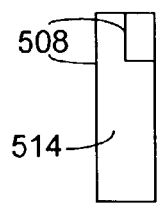

TWO STAGE HYDROCARBON CONVERSION REACTION SYSTEM

FIELD OF THE INVENTION

The present invention relates to a reaction system useful in hydrocarbon conversion processes. More particularly, this invention relates to a reaction system which uses two stages and having both continuous stirred tank (CSTR) and plug flow reactor (PFR) hydrodynamic characteristics.

BACKGROUND OF THE INVENTION

When converting a feedstock containing a hydrocarbon to a product in an industrial reactor, it is desirable to maximize the production of a desired product or products, and to control, typically to minimize, the production of by-products. One type of reactor useful for conducting hydrocarbon conversion reactions is a fluidized bed reactor, wherein solid catalyst particles are suspended in a fluidized state during contact with the feedstock and other vapor materials. These types of reactors generally have a regular cylindrical geometry, that is, comprise a cylinder of some length having a constant diameter along that length. In general, the reactor cross-sectional area available through which catalyst particles and vapors flow is directly proportional to a characteristic width, and specifically for a cylinder directly proportional to the diameter.

U.S. Pat. No. 6,166,282 discloses one type of fluidized bed reactor which is used in converting oxygenates to olefins. The reactor includes a dense phase zone, a transition zone, and a riser section. It is disclosed that by using the dense phase zone and the transition zone in the same reactor, combined with an initial catalyst separation or disengagement step, significant advantages over conventional bubbling or fluidized bed reactors can be obtained. The dense phase zone operates at a superficial velocity of less than 1 meter per second, and the transition zone operates at a superficial velocity of from 1 to 4 meters per second. As a mixture of unreacted feedstock, fluidized catalyst particles, and reaction products enters the transition zone, the reaction continues to essentially complete conversion.

European Patent Application EP 1 046 695 discloses another type of fluidized bed reactor which incorporates the use of multiple zones in a fluidized bed reactor. This patent publication is specifically directed to the utilization of different feedstock and other vapors in each of these zones to control reaction conditions such as temperature in each of these zones, and to increase secondary reactions and byproduct production.

PCT Publication WO01/04079 discloses a fluidized bed reactor having a fluidization section and a riser section. This patent publication is specifically a reaction system involving oxidation of propylene with a vanadium and bismuth catalyst to produce acrylic acid.

An article in the Chinese periodical *Petroleum Processing and Petrochemicals*, Vol. 31, No. 2, February 2000, by Zheng Maojun, et. al., entitled "Determination Of Particle Velocity Distribution In Two Kinds Of Riser Reactor", discusses an auxiliary bed of a larger diameter in conjunction with a riser of smaller diameter. The article describes the use of the auxiliary bed as a means to provide a better plug flow pattern in the riser.

Additional systems and methods are needed to improve the effectiveness of fluidized bed hydrocarbon conversion reactors. In particular, such systems are needed to improve product selectivity while maintaining a high conversion of feed. Such systems are particularly desirable in maintaining high selectivity to ethylene and propylene products in the emerging field of oxygenate conversion using oxygenate to olefin catalysts.

SUMMARY OF THE INVENTION

This invention provides systems and methods for catalytically converting hydrocarbon feed to product at high selectivity and high conversion. In one embodiment, the invention provides a hydrocarbon conversion apparatus. The apparatus comprises a reactor shell including at least one tapering element.

In one embodiment of the invention, there is a first reaction stage within the reactor shell having a first volume and a first average equivalent diameter, the first reaction stage having a catalyst inlet through which a catalyst may enter. The invention can further include a lowest feedstock inlet through which a hydrocarbon feedstock may enter, as well as a first material transit through which a catalyst, a hydrocarbon feedstock and a hydrocarbon conversion product may exit.

It one embodiment, the first material transit is positioned at a higher elevation relative to grade than the lowest feedstock inlet. The apparatus aspect of the invention can also include a second reaction stage within the reactor shell. The second reaction stage has a second volume, a length and a second average equivalent diameter, and is desirably joined to the first material transit of the first reaction stage such that a catalyst, a hydrocarbon feedstock and a hydrocarbon conversion product may enter. The second reaction stage can further include a second material transit through which a catalyst, a hydrocarbon feedstock and a hydrocarbon conversion product may exit.

A separation device can be included in the apparatus. The separation device is desirably in fluid communication with the second material transit of the second reaction zone. The separation would be provided to separate a catalyst from a hydrocarbon feedstock and a hydrocarbon conversion product in the hydrocarbon conversion apparatus. The separation device can further include a product exit through which a hydrocarbon conversion product and a hydrocarbon feedstock may exit and a catalyst exit through which catalyst may exit. It is desirable that the product exit is positioned at a higher elevation relative to grade than the catalyst exit.

In one embodiment, the first volume is at least 20% and no greater than 90% of the sum of the first volume and the second volume. In another embodiment, the ratio of the length to the second average equivalent diameter is at least about 5.0:1. In yet another embodiment, the first average equivalent diameter is desirably at least about 1.05 times the second average equivalent diameter. It is also desirable that the first average equivalent diameter is at least about 0.3 meters.

The invention optionally includes a catalyst circulation conduit through which a catalyst may flow. The catalyst circulation conduit desirably includes a first end in fluid communication with the catalyst exit of the separation device, and a second end joined to the catalyst inlet of the first reaction stage. The catalyst circulation conduit is provided for fluid communication of catalyst from the separation device to the first reaction stage.

The invention is also directed to a method of converting hydrocarbon feed to product. The method includes contacting hydrocarbon conversion catalyst with hydrocarbon feed in a first reaction stage to form a product. In one embodiment, the hydrocarbon feed is converted at a first hydrocarbon feedstock conversion of at least 20.0%. In another embodiment, the hydrocarbon feed is converted at a hydrocarbon feedstock conversion of no greater than 98.0%.

The product, any unconverted hydrocarbon feed, and a hydrocarbon conversion catalyst is flowed from the first reaction stage to a second reaction stage so that conversion of the hydrocarbon feed continues in the second reaction stage. In one embodiment of the method of the invention, the second reaction stage has an average gas superficial velocity (GSV) which is greater than that of the first reaction stage.

BRIEF DESCRIPTION OF THE DRAWINGS

FIGS. 5A-D show a sectional elevation of an alternative embodiment of a hydrocarbon conversion apparatus of the present invention, and three partial transverse sections of the apparatus along lines as indicated.

DETAILED DESCRIPTION OF THE INVENTION

Figure 1A:
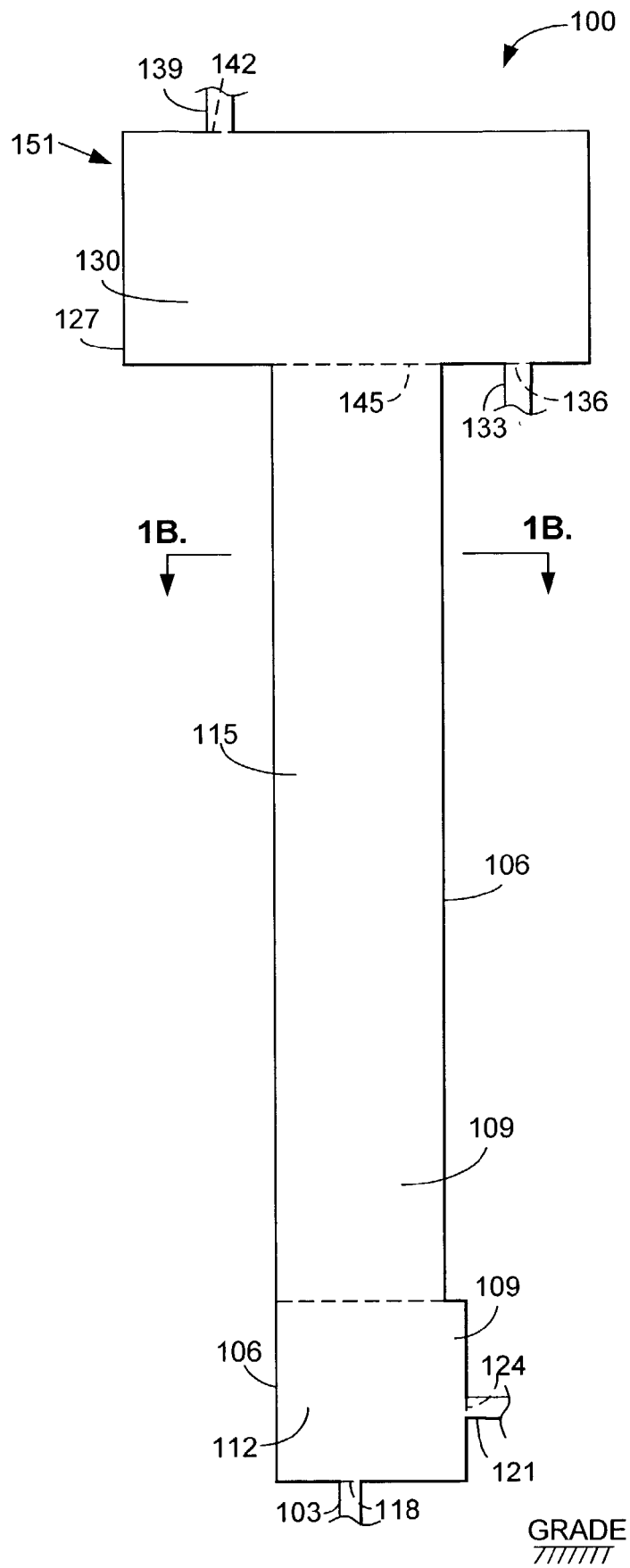
FIGS. 1A-B show a sectional elevation of a hydrocarbon conversion apparatus of the present invention, and a partial transverse section of the apparatus along a line as indicated.

This invention provides systems for catalytically converting hydrocarbon feed to product so that high product selectivity is achieved, while maintaining high feed conversion. The invention is carried out in a two stage reaction process. The reaction process is carried out in the system such that the first stage operates at more continuous stirred tank reactor (CSTR) like characteristics, and the second stage operates at more plug flow reactor (PFR) like characteristics.

The inventors have found that there must be a balance between the CSTR and PFR operating characteristics in each stage in order to achieve the desired product selectivity and feed conversion. If the overall conversion of feed to product is carried out at largely CSTR characteristics, higher conversions are more easily achievable using smaller reactor volumes. However, CSTR characteristics tend to yield lower product selectivities, which is particularly undesirable in certain reactions such as oxygenate to olefin conversion reactions. Although high selectivities to desired product can be achieved under largely PFR characteristics, such conditions would require a reactor design that would have such a high reactor length to diameter ratio that it would be impractical to build and operate at commercial scale. Therefore, the invention balances the first and second stage reaction characteristics so that high product selectivity and high conversion can be achieved at the same time, and at a smaller reactor volume than conventional fluidized bed reaction systems.

To provide the appropriate balance from more CSTR type characteristics in the first reaction stage to more PFR type characteristics in the second reaction stage, the second reaction stage has an average gas superficial velocity (GSV) which is greater than that of the first stage. The system is further operated so that the conversion of the feed to product in the first stage proceeds to a maximum, without negatively impacting selectivity to the desired product. That is, the reaction proceeds to a point where undesirable side reactions or undesirable by-products are kept to a minimum in the first reaction stage. Then the reaction process is shifted to a second reaction stage where conversion of unreacted feed may be slower or operate according to a different reaction mechanism, but product selectivity is nevertheless kept high and by-product formation is kept low.

The GSV should be sufficiently high to achieve more PFR like characteristics in the second reactor stage. In one embodiment, the conditions also should be such that conversion of the feed in the first reaction stage is at least about 20.0% and no greater than about 98.0%, with further conversion being carried out in the second reaction stage. The reactor unit is, therefore, designed so that the first and second reaction stages have appropriate volumes and reactor length to diameter ratios to meet both the desired GSV and conversion conditions. Such conditions and designs result in more CSTR like characteristics in the first reaction stage and more PFR like characteristics in the second stage.

As used herein and in the claims, the terms "catalyst," "solid, particulate catalyst" and "hydrocarbon conversion catalyst" have the same meaning and are used interchangeably to describe small, formulated catalyst particles capable of being fluidized and catalytically enhancing the rate and selectivity of a hydrocarbon conversion reaction. Also as used herein, the terms "product," "reaction product" and "conversion product" have the same meaning and are used interchangeably to describe the materials that result from the reaction of a hydrocarbon feedstock with a catalyst. Finally, as used herein, the terms "feed," "feedstock" and "hydrocarbon feedstock" have the same meaning and are used interchangeably to describe a hydrocarbon material suitable for conversion to products with a catalyst.

All of the figures disclosed herein are intended to represent examples of types of reactors which can be used in the two stage reactor system of this invention. Other designs not specifically described herein can be included as part of the system of this invention as long as the apparatus is designed to maintain the appropriate first and second reaction stage conversions at the appropriate GSVs in each reaction stage as also described herein. The designs should be such that the first reaction stage exhibits more CSTR like characteristics and the second reaction stage exhibits more PFR like characteristics.

Figure 1B:
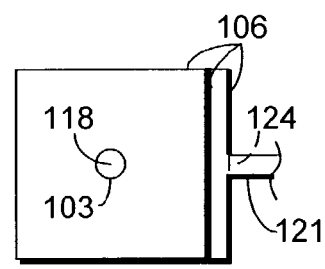

FIG. 1A presents a sectional elevation of a hydrocarbon conversion apparatus 100 of the present invention. FIG. 1B presents a partial transverse section of the apparatus, looking down on FIG. 1A along a line as indicated, focusing on elements associated with reaction zone 109, and omitting separation device 151.

With continuing reference to FIGS. 1A-B, a feedstock conduit 103, that would provide a gaseous or liquid feedstock to the apparatus, is openly joined to a reactor shell 106 which forms the totality of a reaction zone 109, in which a reaction among the feedstock and a solid, particulate catalyst would take place. Reaction zone 109 is composed of a first reaction stage 112 and a second reaction stage 115. The first reaction stage 112 and second reaction stage 115 are distinguished in that the former has a larger characteristic width in a plane perpendicular to net flow than the latter, and are provided to allow feedstock, product and other gases that may flow through the reaction zone 109 to have an increasing gas superficial velocity as the extent of reaction (disappearance of feedstock) increases. The characteristic width of a reaction stage in the plane perpendicular to the net flow of the feedstock, product and other gases that would occur within that reaction stage when the apparatus is in use is hereinafter established as an "average equivalent diameter (AED; sometimes having a subscript indicating the reaction stage)," discussed in detail below.

In an embodiment of the present invention, there is a "lowest feedstock inlet," through which a feedstock would flow from a feedstock element into the first reaction stage, defined as the open, cross-section surface, parallel to grade, formed at the lowest point of the intersection of an end of the feedstock element and the reaction zone. The lowest feedstock element is typically openly joined to or protruding into the lower portion of a reactor shell. Examples of feedstock elements include, but are not limited to, open conduits, grids and nozzles. The lowest feedstock inlet determines the lower boundary of the geometry of the first reaction stage.

In another embodiment of the invention, there is only one feedstock element (which will thus necessarily define the lowest feedstock inlet). In other embodiments, there are two feedstock elements, one of which will define the lowest feedstock inlet, and the other which will define another inlet. In yet other embodiments, there are three, or four, or five, or six, or more than six feedstock elements, one of which will define the lowest feedstock inlet, and the others which will define other inlets. Treatment of various other inlets is discussed later herein.

In the embodiment in FIGS. 1A-B, the "lowest feedstock inlet" 118, through which feedstock would flow from feedstock conduit 103 into first reaction stage 112, is defined as the open, cross-section surface, parallel to grade, formed at the open joint of feedstock conduit 103 with reactor shell 106. The open, cross-section surface parallel to grade defining the lowest feedstock inlet 118 is contiguous with shell 106, and the entirety of the lowest feedstock inlet 118 is encompassed by the end of feedstock conduit 103. There are numerous alternative embodiments, some of which are illustrated later in FIG. 5 and FIG. 6.

The term "low," "up" and "down," and various forms thereof, are referenced relative to grade. As an apparatus of the present invention may have more than one feedstock inlet, the term "lowest" feedstock inlet refers to that one of the apparatus closest to grade.

Returning to FIGS. 1A-B, a catalyst inlet conduit 121, that would provide a solid, particulate catalyst to the apparatus is openly joined to reactor shell 106 which forms the totality of a reaction zone 109, in which a reaction among the feedstock and a solid, particulate catalyst would take place.

In an embodiment of the invention, there is a "catalyst inlet," through which a solid, particulate catalyst would flow from a catalyst inlet conduit into the first reaction stage, defined as the open, cross-section surface having the minimum area that is connected to all points on the end of a catalyst inlet conduit, within the first reaction stage. A catalyst inlet conduit is typically openly joined or protruding into the lower portion of the reactor shell. The invention may have more than one catalyst inlet conduit and hence more than one catalyst inlet. Preferably, the catalyst inlet forms a part of the boundary of the geometry of the first reaction stage.

In the embodiment in FIGS. 1A-B, catalyst inlet conduit 121 is openly joined to a lower portion of reactor shell 106 to establish a catalyst inlet 124 as another part of the boundaries of the first reaction stage 112. In this embodiment, catalyst inlet 124 is contiguous with reactor shell 106 and forms no dislocations in the geometry of reactor shell 106 and first reaction stage 112, however, there are numerous other embodiments which can be used in this invention. One must bear in mind that in a reaction zone of the present invention the solid, particulate catalyst and the feedstock will be contacted. In an alternative embodiment not shown, a catalyst inlet conduit may protrude through a reactor shell into the first reaction stage and end in some geometry. If that geometry were a circle, i.e., the right end of a cylinder, the catalyst inlet would be defined as the surface area of that open circle at the end of the cylinder. Further, the portion of the cylinder that is a catalyst inlet conduit within the first reaction stage would not be considered as part of the volume of the first reaction stage, since it would not be possible for feedstock to contact catalyst within that cylinder when the apparatus is in operation. The end of a catalyst inlet conduit may have any geometry, including those that may be complicated and require many more measurements and calculations to determine the area of the surface connected to all points of the end, which defines a catalyst inlet.

Another embodiment of the present invention includes a separation device, comprising one or more separation elements which serve to separate a solid, particulate catalyst from a gaseous conversion product and possibly unconverted feedstock, and further a catalyst exit and a product exit. In general, once the catalyst is separated from the conversion product and unconverted feedstock, reaction largely ceases, allowing for control of the extent of reaction desired in the apparatus while in use. There are numerous possible embodiments of the separation device and the separation elements, many of which are discussed below. A separation element is desirably in fluid communication with the reactor shell, more particularly, the second material transit of second reaction zone, described in detail later.

As noted above, the optional separation device can include a product exit through which a conversion product and possibly unconverted feedstock may exit the device, and a catalyst exit through which a solid, particulate catalyst may exit the device. In one embodiment, the product exit is positioned at a higher elevation relative to grade than the catalyst exit. However, the absolute location, geometry or nature of a catalyst exit or a product exit included with a separation device may vary widely. In many embodiments, there will be no need to use these boundaries in calculations required to determine that one has an apparatus of the present invention (unlike those described above for a catalyst inlet or a feedstock inlet). The fact that they exist in any form to allow their respective materials to be carried away from the separation device, by, for example, a conduit, is all that is required. In some cases, noted below in determining the position of the second material transit which is in fluid communication with the separation device, the lowest or highest point of such desirably ends in open or openly joined communication with the separation device.

In the embodiment of FIGS. 1A-B, separation device 151 is comprised of termination vessel 127 (i.e., the separation element), catalyst exit 136 and product exit 142. Reactor shell 106 is openly joined to termination vessel 127, which is one form of a separation element in which solid, particulate catalyst is separated from a conversion product along with any unreacted feedstock. Termination vessel 127 defines a termination volume 130. During the operation of the apparatus, the termination volume 130, of greater characteristic width than the second reaction stage 115, would allow the gas velocity of conversion products and feedstock to slow. This, in turn, further allows the solid, particulate catalyst to disengage from the flowing gas and fall down within the termination volume 130 while the gas continues to proceed upward.

A catalyst exit conduit 133, which would carry catalyst away from the separation device, is openly joined to termination vessel 127. A catalyst exit 136, through which catalyst may flow out of the termination volume 130 and into catalyst exit conduit 133, is shown as the open surface area at the junction of termination vessel 127 and catalyst exit conduit 136. Further, a product exit conduit 139, which would carry reaction product and unreacted feedstock away from the separation device, is openly joined to termination vessel 127. A product exit 142, through which catalyst may flow out of the termination volume 130 and into product exit conduit 139, is shown as the open surface area at the junction of termination vessel 127 and product exit conduit 139. In an alternative embodiment not shown, one end of the catalyst exit conduit or the product exit conduit may protrude through the termination vessel and be in open communication with a termination volume, with any type of end on those conduits forming a catalyst exit or a product exit.

In one embodiment, the invention will include at least one "second material transit," through which a solid, particulate catalyst, conversion product and possibly unconverted feedstock may flow out of the second reaction zone and into the separation device, defined in various embodiments as one of the following:

1. The open, cross-section surface or surfaces defined by where a reactor shell is openly joined to a separation element. A partial list of such separation elements, discussed in this and later figures, includes termination vessels, cyclones, and the open ends of "ram's heads." Other separation devices, including but not limited to filters, and combinations of those listed or others may be used in the present invention. A termination vessel shell is distinguished from a simple continuation of a reactor shell in that there is at least one joint of the two shell surfaces of an angle greater than 80°, providing a rapid expansion in volume moving along the apparatus from lowest feedstock inlet to product exit.

2. The open, cross-section surface of a reactor shell end in open communication with a termination volume (another, particular form of separation element), i.e., the reactor shell protrudes through and ends in a volume defined by a larger shell which is a termination vessel having a catalyst exit and a product exit. In this embodiment, the surface is determined as described above for a catalyst inlet, i.e., the minimum surface area that encompasses all points of the reactor shell end.

3. In the absence of such readily recognizable features noted above in this listing, the second material transit is defined as the open, cross-section surface running parallel to grade through the lowest point of the catalyst exit, or the highest point of the product exit, whichever defines the smallest volume of the sum of the first and second reaction stages (discussed below).

Continuing the discussion on the embodiment in FIGS. 1A-B, a second material transit 145, through which a solid, particulate catalyst, a conversion product and possibly unreacted feedstock may flow out of second reaction stage 115 and into termination volume 130, is established as the open, cross-section surface formed at the junction of reactor shell 106 and termination vessel termination vessel 127.

In another embodiment of the invention, the volume of the reaction zone, which is the total, i.e., the sum, of the volume of the first reaction stage and the second reaction stage, is established as the volume bounded by the reactor shell, the lowest feedstock inlet and the second material transit. It is quantitatively calculated using standard geometric formulae according to the prevalent dimensions, moving along and within the walls of the reactor shell between the lowest feedstock inlet to the second material transit. Various inlets and ancillary elements are assumed to be contiguous with the reactor shell, with open conduit ends bounded by the minimum, open cross-section surface encompassing all points of the open conduit end for the purposes of volumetric calculations, and the volume of any conduit that may be protruding into the reaction zone is not counted as reaction zone volume, as discussed in detail above. Various ancillary elements that may be present include but are not limited to conduits used to deliver fluidization gas to maintain fluidization of the particulate catalyst, sampling ports, or instrumentation probes (e.g., thermowells and pressure gauges).

In one embodiment of the invention, the volume of the first reaction stage is at least 20% and no greater than 90% of the sum of the volumes of the first and second reaction stages (i.e., the total reaction zone). The selection of a value in that range may be influenced by many factors, including prevailing economic circumstances associated with construction of a particular design, and the nature of the desired catalyst, feedstock, products and operating conditions associated with the use of the apparatus to conduct a conversion reaction. The selection of a value in that range may also be influenced by the desirability of certain AED for the first reaction stage and the second reaction stage. Further, more than one value in that range may satisfy the requirements of being an apparatus of the present invention on the same apparatus.

In another embodiment, the invention further includes a first material transit through which a fluidized, particulate catalyst, a conversion product and unreacted feedstock may flow out of the first reaction stage into the second reaction stage. Once a value for the proportion of the volume of the first reaction stage relative to the total reaction zone has been selected, one can determine the position of a first material transit. The first material transit is established as the open, cross-section surface within the apparatus, parallel to grade, that provides the selected first reaction stage volume between the lowest feedstock inlet and the first material transit. This is determined in a manner similar to determining the volume of the reaction zone described above, using geometric calculations according to the prevalent dimensions, moving along and within the walls of the apparatus, starting from the lowest feedstock inlet. The first material transit is considered a part of the first reaction stage, but serves as a geometric boundary of both the first reaction stage and the second reaction stage. Thus, the first material transit is considered to be joined to the second reaction stage.

In another embodiment of the invention, the first material transit is positioned at a higher elevation than the lowest feedstock inlet. However, the absolute position of the lowest feedstock inlet and the first material transit may vary widely, as noted in other figures and discussed below, and the selection is influenced by factors similar to those described for selection of the volume of the first reaction stage, noted above.

The AED of a reaction stage of the present invention is established with reference to cylinder, i.e., it is a characteristic width of a volume of any geometry calculated as the equivalent diameter of a regular cylinder that would have the same volume and characteristic length of that geometry. This straightforward parameter serves well, of itself and when combined with others, in characterizing the likely hydrodynamic flow regime of gases and particulates that would occur within the reaction zone of the apparatus when it is in use, over a very large range of possibilities for the exact geometry of the reaction zone.

In one embodiment, the AED of the first reaction stage is both at least about 0.3 meters and at least about 1.05 times the AED of the second reaction stage. Below a first reaction stage AED of 0.3 meters, when the apparatus is being used to conduct a hydrocarbon conversion reaction, the flow of vapors and solid, particulate catalyst through the first reaction stage may not be able to establish acceptable CSTR hydrodynamic behavior. For a first reaction stage AED below about 1.05 times the AED of the second reaction stage, there may not be a sufficient difference in AED between the first and second reaction stages available to initiate a sufficient change in hydrodynamic flow regime between the stages. Selection of the first reaction stage proportion beyond those values depends upon, among other things, the nature of the particular hydrocarbon conversion reaction to be conducted within the apparatus and conditions at which it is to be conducted, the degree of CSTR behavior desired, and correlation with the desired second reaction stage proportions.

For an apparatus of the present invention, the $AED_1$ of the first reaction stage is determined as follows:

1. Obtain the average equivalent cross-sectional area ($AECSA_1$) of the first reaction stage by taking its volume and dividing it by the difference between the value in elevation of the lowest feedstock inlet and the value in elevation of the first material transit (i.e., perpendicular to grade). This difference in elevation of the first reaction stage is herein termed "the length of the first reaction stage ($L_1$)."

2. Obtain the $AED_1$ by the following formula: $\sqrt{[(4 \times AECSA_1)/\pi]}$.

Having determined the geometry of the first reaction stage, and the geometry of the entire reaction zone (i.e., the sum of the first and second reaction stages), the geometry of the second reaction stage is thus established. Its volume is the difference of that of the entire reaction zone and that of the first reaction stage. Its boundaries are the volume formed within the reactor shell between the first and second material transits. This allows determination of the AED, and the ratio of length to AED, of the second reaction stage.

In another embodiment, the ratio of the length of the second reaction stage to the AED of the second reaction stage is at least about 5.0:1. Below this value, when the apparatus is being used to conduct a hydrocarbon conversion reaction, there may not be sufficient distance for the vapors and solid, particulate catalyst flowing through the second reaction stage to establish adequate PFR hydrodynamic flow characteristics. Selection of a ratio of the length of the second reaction stage to the AED of the second reaction stage beyond this value depends upon, among other things, the nature of the particular hydrocarbon conversion reaction to be conducted within the apparatus and conditions at which it is to be conducted, the degree of PFR behavior desired, and correlation with the desired first reaction stage proportions. In general, the larger the AED of the second reaction stage, the more desirable a larger ratio of the length of the second reaction stage to the AED of the second reaction stage to facilitate better approach to PFR behavior.

For an apparatus of the present invention, the $AED_2$ of the second reaction stage, and the ratio of length to $AED_2$ of the second reaction stage ($L_2/AED_2$) is determined as follows:

1. Obtain the average equivalent cross-sectional area ($AECSA_2$) of the second reaction stage by taking its volume and dividing it by the length of the second reaction stage. As used herein, the length of the second reaction stage ($L_2$) is defined as that of the minimum length of a line segment totally within the second reaction stage volume running from the first material transit to the second material transit. In the event there is more than one second material transit, use the longest of the lengths determined by these criteria from the first material transit to each of the second material transits.

2. Obtain the $AED_2$ by the following formula: $\sqrt{[(4 \times AECSA_2)/\pi]}$.

3. Obtain the $L_2/AED_2$ by dividing the length determined in step 1 of this paragraph by the AED determined in step 2 of this paragraph.

In various embodiments of the present invention, the volume of the first reaction stage is any logical range selected from the following: at least 20%, or at least 25%, or at least 30%, or at least 35%, or at least 40%, or at least 45%, or at least 50%, or at least 55%, or at least 60%, or at least 65%, or at least 70%, or at least 75%, or at least 80%, or at least 85%, and; no greater than 25%, or no greater than 30%, or no greater than 35%, or no greater than 40%, or no greater than 45%, or no greater than 50%, or no greater than 55%, or no greater than 60%, or no greater than 65%, or no greater than 70%, or no greater than 75%, or no greater than 80%, or no greater than 85%, or no greater than 90% of the volume of the sum of the first and second reaction stages.

As used herein, the phrase "any logical range selected from the following" directs one to select a combination of one "at least" value and one "no greater than" value, from an immediately subsequent list of such values, that is both a range and is possible, and apply it to the specification being discussed. In some instances, a portion of the pertinent specification to which the range is to be applied will be provided as a part of the immediately subsequent list. For example, in the immediately preceeding paragraph, one is being told that various embodiments include "the first reaction stage is at least 20% and no greater than 80% of the sum of the first and second reaction stages," or "the first reaction stage is at least 25% and no greater than 90% of the sum of the first and second reaction stages," etc., as they are logical ranges properly applied to the specification being discussed. However, for example, in the immediately preceding paragraph, one must not construe the "any logical range selected from the following" statement as saying that various embodiments include "the first reaction stage is at least 80% and no greater than 20% of the sum of the first and second reaction stages," or "the first reaction stage is at least 25% and no greater than 25% of the sum of the first and second reaction stages," etc., as they are not logical ranges; the former is not possible, and the latter is not a range.

In yet other embodiments of the present invention, the volume of the first reaction stage is 20%, or 25%, or 30%, or 35%, or 40%, or 45%, or 50%, or 60%, or 70%, or 80%, or 90% of the volume of the sum of the first and second reaction stages.

According to various embodiments of an apparatus of the present invention, the second reaction stage has a ratio of length to AED of at least about 5.0:1, or at least about 6.0:1, or at least about 7.0:1, or at least about 9.0:1, or at least about 10.0:1, or at least about 12.0:1, or at least about 15.0:1, or at least about 17.0:1, or at least about 20.0:1, or at least about 22.0:1, or at least about 25.0:1, or at least about 30.0:1, or at least about 35.0:1, or at least about 40.0:1, or at least about 45.0:1, or at least about 50.0:1. In yet other embodiments, the second reaction stage has a ratio of length to AED of no greater than about 20.0:1, or no greater than about 22.0:1, or no greater than about 25.0:1, or no greater than about 30.0:1, or no greater than about 40.0:1, or no greater than about 50.0:1, or no greater than about 75.0:1, or no greater than about 100.0:1. In still other embodiments the second reaction stage has a ratio of length to AED selected from the following: at least about 5.0:1, or at least about 6.0:1, or at least about 7.0:1, or at least about 9.0:1, or at least about 10.0:1, or at least about 12.0:1, or at least about 15.0:1, or at least about 17.0:1, or at least about 20.0:1, or at least about 22.0:1, or at least about 25.0:1, or at least about 30.0:1, or at least about 35.0:1, or at least about 40.0:1, or at least about 45.0, or at least about 50.0:1, and; no greater than about 20.0:1, or no greater than about 22.0:1, or no greater than about 25.0:1, or no greater than about 30.0:1, or no greater than about 40.0:1, or no greater than about 50.0:1, or no greater than about 75.0:1, or no greater than about 100.0:1.

In a number of embodiments of the invention, the first reaction stage AED is at least about 0.3 meters, and is at least about 1.05, or at least about 1.10, or at least about 1.15, or at least about 1.20, or at least about 1.25, or at least about 1.30, or at least about 1.35, or at least about 1.40, or at least about 1.45, or at least about 1.50, or at least about 2.00, or at least about 5.00, or at least about 10.00 times the second reaction stage AED. In a number of other embodiments, the first reaction stage AED is at least about 0.3 meters, and is no greater than about 1.20 times, or no greater than about 1.50 times, or no greater than about 2.00 times, or no greater than about 5.00 times, or no greater than about 10.00 times, or no greater than about 25.00 times the second reaction stage AED. In still other embodiments the first reaction stage AED is at least about 0.3 meters, and is any logical range selected from the following: at least about 1.05, is at least about 1.10, or at least about 1.15, or at least about 1.20, or at least about 1.25, or at least about 1.30, or at least about 1.35, or at least about 1.40, or at least about 1.45, or at least about 1.50, or at least about 2.00, or at least about 5.00, or at least about 10.00, and; no greater than about 1.20 times, or no greater than about 1.50 times, or no greater than about 2.00 times, or no greater than about 5.00 times, or no greater than about 10.00 times, or no greater than about 25.00 times the second reaction stage AED.

Various manifestations of the invention maintain that the first reaction stage AED is at least about 1.05 times the second reaction stage AED, and is at least about 0.3 meters, or at least about 0.5 meters, or at least about 1.0 meters, or at least about 1.5 meters, or at least about 2.0 meters, or at least about 3.0 meters, or at least about 4.0 meters, or at least about 5.0 meters, or at least about 6.0 meters, or at least about 7.0 meters, or at least about 9.0 meters, or at least about 12.0 meters. Other manifestations maintain that the first reaction stage AED is at least about 1.05 times the second reaction stage AED, and is no greater than about 0.5 meters, or no greater than about 0.7 meters, or no greater than about 1.0 meters, or no greater than about 1.5 meters, or no greater than about 2.0 meters, or no greater than about 2.5 meters, or no greater than about 5.0 meters, or no greater than about 7.0 meters, or no greater than about 10.0 meters, or no greater than about 12.0 meters, or no greater than about 15.0 meters, or no greater than about about 20.0 meters, or no greater than about 25.0 meters. Still other manifestations maintain that the first reaction stage AED is at least about 1.05 times the second reaction stage AED, and is any logical range selected from the following: at least about 1.05 times the second reaction stage AED, and is at least about 0.3 meters, or at least about 0.5 meters, or at least about 1.0 meters, or at least about 1.5 meters, or at least about 2.0 meters, or at least about 3.0 meters, or at least about 4.0 meters, or at least about 5.0 meters, or at least about 6.0 meters, or at least about 7.0 meters, or at least about 9.0 meters, or at least about 12.0 meters, and; no greater than about 0.5 meters, or no greater than about 0.7 meters, or no greater than about 1.0 meters, or no greater than about 1.5 meters, or no greater than about 2.0 meters, or no greater than about 2.5 meters, or no greater than about 5.0 meters, or no greater than about 7.0 meters, or no greater than about 10.0 meters, or no greater than about 12.0 meters, or no greater than about 15.0 meters, or no greater than about 20.0 meters, or no greater than about 25.0 meters.

According to different manifestations of the invention, the second reaction stage AED is at least about 0.3 meters, or at least about 0.5 meters, or at least about 0.7 meters, or at least about 1.0 meters, or at least about 1.5 meters, or at least about 2.0 meters. In other manifestations, the second reaction stage AED is no greater than about 0.5 meters, or no greater than about 1.0 meters, or no greater than about 1.5 meters, or no greater than about 2.0 meters, or no greater than about 2.5 meters, or no greater than about 3.0 meters, or no greater than about 4.0 meters, or no greater than about 5.0 meters. In still other manifestations the second reaction stage AED is any logical range selected from the following: at least about 0.3 meters, or at least about 0.5 meters, or at least about 0.7 meters, or at least about 1.0 meters, or at least about 1.5 meters, or at least about 2.0 meters, and; no greater than about 0.5 meters, or no greater than about 1.0 meters, or no greater than about 1.5 meters, or no greater than about 2.0 meters, or no greater than about 2.5 meters, or no greater than about 3.0 meters, or no greater than about 4.0 meters, or no greater than about 5.0 meters.

One aspect of the invention involves its unique capability to reduce the overall reaction zone volume, and hence decrease materials needed to define that volume and associated construction costs, while achieving superior selectivity to desired products during operation in a hydrocarbon conversion reaction. Thus in other manifestations, the highest point of the first reaction stage and the second reaction stage, perpendicular to and measured from grade, is no greater than about 120 meters, or no greater than about 110 meters, or no greater than about 100 meters, or no greater than about 90 meters, or no greater than about 80 meters, or no greater than about 70 meters, or no greater than about 60 meters, or no greater than about 50 meters. In still other manifestations, the highest point of the first reaction stage and the second reaction stage, perpendicular to and measured from grade, is at least about 10 meters, or at least about 20 meters, or at least about 30 meters, or at least about 40 meters. In still other manifestations, the highest point of the first reaction stage and the second reaction stage, perpendicular to and measured from grade, is any logical range selected from the following: at least about 10 meters, or at least about 20 meters, or at least about 30 meters, or at least about 40 meters, and; no greater than about 120 meters, or no greater than about 110 meters, or no greater than about 100 meters, or no greater than about 90 meters, or no greater than about 80 meters, or no greater than about 70 meters, or no greater than about 60 meters, or no greater than about 50 meters. In these manifestations, the highest point is the difference between value of the single, highest elevation within the first reaction stage and second reaction stage, perpendicular to and measured from grade, with grade having a reference value of zero elevation. Of course, combinations of any or all of the individual features, specifications and logical ranges of specifications of the aforementioned embodiments are also within the scope of the present invention.

Figure 2A:
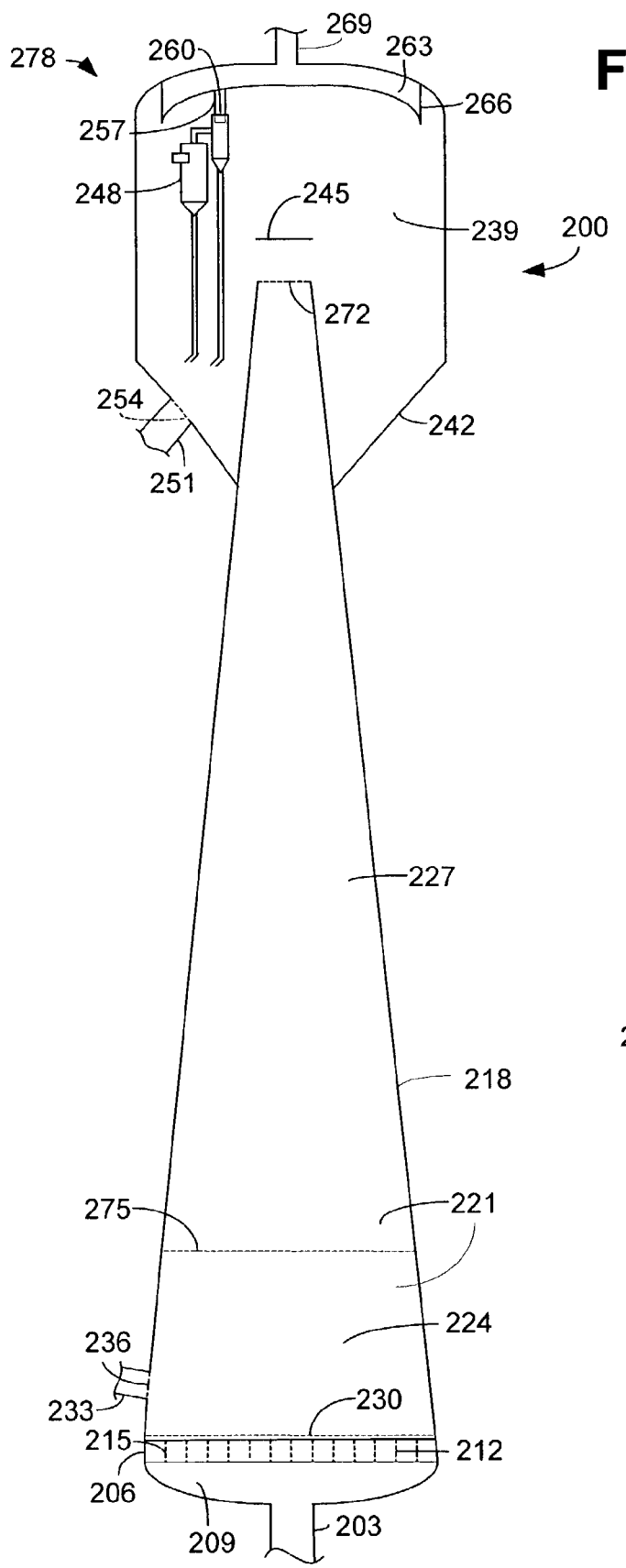
FIGS. 2A-B show a sectional elevation of another embodiment a hydrocarbon conversion apparatus of the present invention, and a partial transverse section of the apparatus along a line as indicated.
Figure 2B:
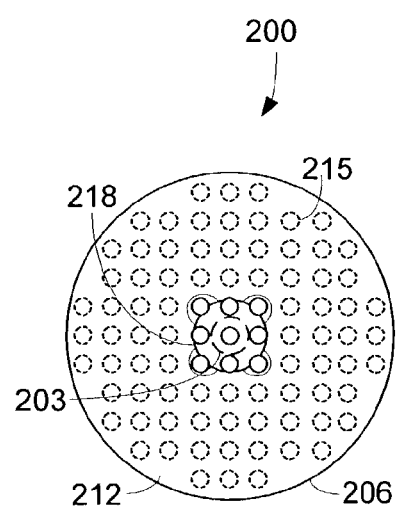

FIG. 2A presents a sectional elevation of a hydrocarbon conversion apparatus 200 of the present invention. FIG. 2B presents a partial transverse section of the apparatus, looking down on FIG. 2A along a line as indicated, focusing on elements associated with reaction zone 227 and omitting separation device 278. A feedstock conduit 203, that would provide a gaseous or liquid feedstock to the apparatus, is openly joined to a base 206, on which the apparatus may rest. Base 206 and the bottom plane of feedstock distribution grid 212 form a feedstock receiver volume 209, in which feedstock will reside during operation. Feedstock distribution grid 212 is located within base 206, and contains many perforations 215 of a size significantly smaller than the grid 212. Those perforations 215 are formed by omissions of grid 212 material at various locations, and are provided to allow feedstock to pass from the feedstock receiver volume 209 through the grid 212. Feedstock distribution grid 212 provides an even amount of feedstock exiting each of the perforations 215 on the side opposite receiver volume 209.

Base 206 is openly joined to reactor shell 218 which forms the totality of a reaction zone 221, in which a reaction among the feedstock and a solid, particulate catalyst would take place. Reaction zone 221 is composed of a first reaction stage 224 and a second reaction stage 227, distinguished in that the former has a larger AED than the latter, and provided to allow feedstock, product and other gases that may flow through the reaction zone 227 to have an increasing gas superficial velocity as the reaction proceeds to completion. Most of reactor shell 218 is a right frustum having an angle from the perpendicular to grade of 5 degrees (apart from a relatively small open surface enabling a catalyst inlet, discussed below).

A lowest feedstock inlet 230, through which feedstock would flow from the exit of the perforations 215 of feedstock distribution grid 212 into first reaction stage 224, is defined as the open, cross-section surface, parallel to grade, formed along the top surface of feedstock distribution grid 212 (the very small separation in the FIG. 2A between lowest feedstock inlet 230 and the top of feedstock distribution grid 212 is for illustrative purposes only). A catalyst inlet conduit 233, that would provide a solid, particulate catalyst to the apparatus, is openly joined to reactor shell 218, establishing catalyst inlet 236, through which a solid, particulate catalyst would flow from the catalyst inlet conduit 233 into first reaction stage 224, as another part of the boundary of first reaction stage 224.

FIGS. 2A-B further show a separation device 278 which is comprised of separation elements 239, 242, 245, and 248, catalyst exit 254 and product exit 260. One end of reactor shell 218 is in open communication with termination volume 239, formed by termination vessel shell 242. Located in termination volume 239 is another separation element, plate 245 located above one end of reactor shell 218, provided to abruptly stop upward inertial motion of catalyst exiting one end of reactor shell 218. Another separation element, series cyclone separators 248, is provided to change inertial motion of catalyst that may still be entrained in gaseous materials entering from termination volume 239 to a downward helix in a barrel. The design and operation of cyclone separators are known to those skilled in the art, see for example U.S. Pat. No. 5,518,695, incorporated in its entirety herein by reference. In the operation of a cyclone separator, vapor reaction product and unreacted feedstock, if any, would proceed up the cyclone separator and out the top, while the catalyst would proceed down the cyclone separator through standpipe portion at the bottom, exiting into termination vessel volume 239.

A catalyst exit conduit 251, which would carry catalyst away from the separation device 278, is openly joined to termination vessel shell 242. A catalyst exit 254, through which catalyst may flow out of the termination volume 239 and into catalyst exit conduit 251, is formed as the open surface area at the junction of termination vessel shell 242 and catalyst exit conduit 251. Further, a product exit conduit 257, which would carry reaction product and possibly unreacted feedstock away from the separation device, is openly joined to the top of series cyclone separator 248. A product exit 260, through which conversion product and possibly unreacted feedstock may flow out of series cyclone separator 248 and into product exit conduit 257, is formed as the open surface area at the junction of series cyclone separator 248 and product exit conduit 257.

Product exit conduit 257 is openly joined to a plenum shell 266. Plenum volume 263 is formed within the boundaries of plenum shell 266 as joined to the top of termination vessel shell 242. The plenum shell 266 and plenum volume 263 are provided to collect reaction product and possibly unreacted feedstock exiting product exit conduit 257, and direct that material to a secondary product exit conduit 269, openly joined to termination vessel shell 242 in the vicinity of plenum volume 263, provided to convey reaction product and possibly unreacted feedstock away from the apparatus. Such plenum designs are particularly useful in embodiments when more separation elements are utilized, for example as disclosed in FIGS. 3A-C discussed below, where another set of series cyclone separators located elsewhere in the termination vessel volume are joined to another product exit conduit. The product exit conduits may all be openly joined to the plenum, and a single, secondary product exit conduit may be used to carry product away from the apparatus.

In accordance with an embodiment of the invention as exemplified in FIGS. 2A-B, the second material transit 272, through which a solid, particulate catalyst, a conversion product and possibly unreacted feedstock may flow out of second reaction stage 227 and into termination volume 239, is established as the open, cross-section surface formed at end of reactor shell 218 that enters into open communication with termination volume 239. The volume of reaction zone 221, which is the sum of the volumes of first reaction stage 224 and second reaction stage 227, is established by geometric calculations according to the prevalent dimensions, moving along and within the walls of the apparatus between the lowest feedstock inlet 230 and the second material transit 272.

Figure 3A:
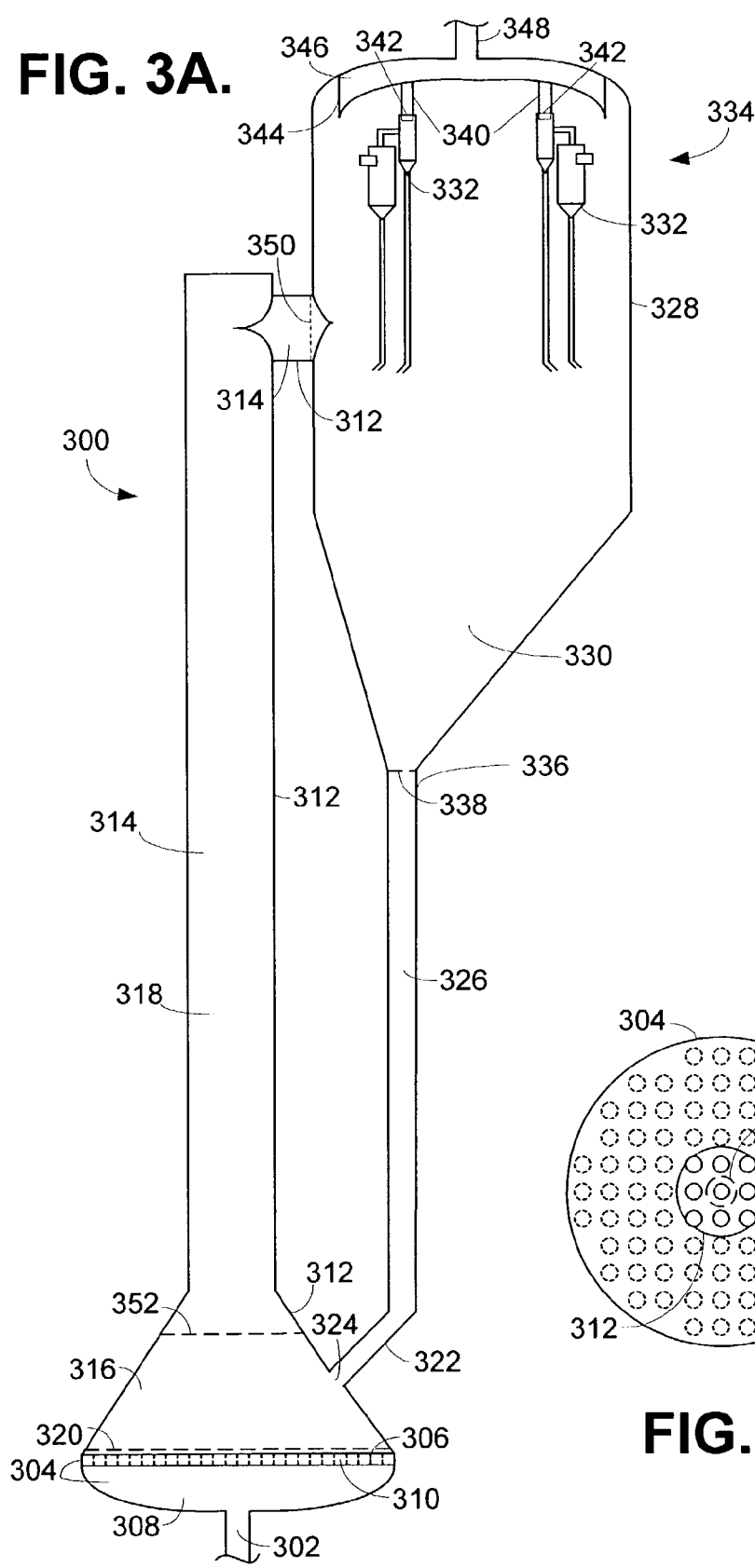
FIGS. 3A-C show a sectional elevation of a third embodiment of a of a hydrocarbon conversion apparatus of the present invention, and two partial transverse sections of the apparatus along lines as indicated.
Figure 3C:
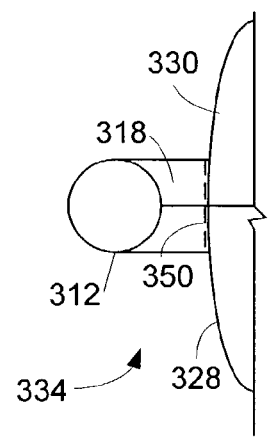
Figure 3B:
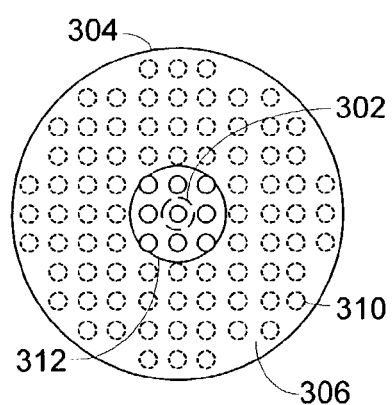

Referring now to FIGS. 3A-C, FIG. 3A presents a sectional elevation of a hydrocarbon conversion apparatus 300 of the present invention. FIG. 3B presents a partial transverse section of the apparatus, looking down on FIG. 3A along the line indicated, focusing on elements associated with reaction zone 314 and omitting separation device 334. FIG. 3C also presents a partial transverse section of the apparatus, looking down on FIG. 3A along a line indicated that is slightly higher than that for FIG. 3B, focusing on further elements associated with reaction zone 314 as it is connected to a portion of separation device 334.

According to FIGS. 3A-C, a feedstock conduit 302, that would provide a gaseous or liquid feedstock to the apparatus, is openly joined to a base 304, on which the apparatus may in part rest. Base 304 and the bottom plane of feedstock distribution grid 306 form a receiver volume 308, in which feedstock will reside during operation of the apparatus. Feedstock distribution grid 306 is located within base 304, and contains many perforations 310 of a size significantly smaller than the grid 306. Those perforations 310 are formed by omissions of grid 306 material at various locations, and are provided to allow feedstock to pass from the feedstock receiver volume 308 through feedstock distribution grid 306. Feedstock distribution grid 306 provides an even amount of feedstock exiting each of the perforations 310 on the side opposite receiver volume 308.

Base 304 is openly joined to reactor shell 312 that forms the totality of a reaction zone 314, in which a reaction among the feedstock and a solid, particulate catalyst will take place. Reaction zone 314 is composed of a first reaction stage 316 and a second reaction stage 318, distinguished in that the former has a larger AED than the latter, and provided to allow feedstock, product and other gasses that may flow through the reaction zone 314 to have an increasing superficial gas velocity as the reaction proceeds to completion. The reactor shell 312 is comprised of three contiguous geometries: a right frustum, a vertical cylinder and a horizontal cylinder. The right frustum and vertical cylinder are openly joined at a point in the bottom section of reactor shell 312. The vertical and horizontal cylinders are of substantially the same diameter, and wholly and rightly intersect, and are openly joined at a point in the top section of reactor shell 312.

A lowest feedstock inlet 320, through which feedstock would flow from the exits of the perforations 310 of feedstock distribution grid 306 into first reaction stage 316, is determined as the open, cross-section surface, parallel to grade, formed along the top surface of the feedstock distribution grid 306 (the very small separation in FIG. 3A between lowest feedstock inlet 320 and the top of feedstock distribution grid 306 is for illustrative purposes only). A catalyst inlet conduit 322, that would provide a solid, particulate catalyst to first reaction zone 316 of the apparatus, is openly joined to reactor shell 312, establishing catalyst inlet 324, through which a solid, particulate catalyst would flow from the catalyst inlet conduit 322 into first reaction stage 316, as a portion of the boundary of first reaction stage 316.

FIGS. 3A-C further show a separation device 334 which is comprised of separation elements 328, 330 and 332, catalyst exit 338 and product exits 342. One end of reactor shell 312 is openly joined to termination vessel shell 328. Termination vessel shell 328 forms termination volume 330; they are provided as a separation element. Located within termination volume 330 are more separation elements, two series cyclone separators 332. A catalyst exit conduit 336, which would carry catalyst away from the separation device 334, is openly joined to termination vessel shell 328. A catalyst exit 338, through which catalyst may flow out of the termination volume 330 and into catalyst exit conduit 336, is formed as the open surface area at the junction of termination vessel shell 328 and catalyst exit conduit 336. Further, product exit conduits 340, which would carry reaction product and possibly unreacted feedstock away from the separation device 334, are openly joined to the top of series cyclone separators 332. Product exits 342, through which reaction product and possibly unreacted feedstock would flow out of series cyclone separators 332 and into product exit conduits 340, are formed as the open surfaces at the junction of series cyclone separators 332 and product exit conduits 340.

In one embodiment of the invention, a catalyst circulation conduit, through which a catalyst may flow, is provided to enable fluid communication of catalyst from a separation device to a first reaction stage. This feature may be efficient in certain reaction systems wherein at least a portion of the catalyst entering a separation device is suitable for reuse in the first reaction zone, possibly without a major catalyst altering step such as regeneration, discussed later herein. A catalyst circulation conduit may provide for a direct path of travel of the catalyst from the separation device to the first reaction stage, for example, by being joined to no other elements but a catalyst exit at one end and a catalyst inlet at another end. Alternatively, a catalyst circulation conduit may be openly joined to other elements of the apparatus, providing a more complex path, or part of the path, of travel of the catalyst from a separation device to the first reaction stage. Examples of such elements include, but are not limited to, control valves that would control the rate of catalyst moving through a catalyst circulation conduit, heat exchange equipment that might change the temperature of the catalyst prior to its introduction to the first reaction stage, and receiver volumes that might collect catalyst from a catalyst circulation conduit and other sources and provide for the combined catalyst to be delivered to the first reaction stage. The motive force for flow of catalyst through a catalyst circulation conduit may be gravity, or eduction with a vapor appropriately introduced to the conduit, or any other method suitable to providing motive force for catalyst flow through a conduit. Further, ancillary elements may be joined to a catalyst circulation conduit, such as instrumentation taps or probes, or smaller pipes that may supply fluidization gas or eduction gas (sometimes known to those skilled in the art as "lift gas") to facilitate movement of the catalyst within the conduit.

In the embodiment of FIGS. 3A-C, catalyst circulation conduit 326, through which a catalyst may flow, has a first end, catalyst exit conduit 336, joined to a catalyst exit 338 and a second end, catalyst inlet conduit 322, joined to a catalyst inlet 324. Catalyst circulation conduit 326 is provided to enable fluid communication between a catalyst exit 338 and first reaction stage 316. In this embodiment, catalyst circulation conduit 326 would provide for catalyst to flow from a separation device 334 directly to catalyst inlet 324.

In the embodiment depicted in FIGS. 3A-C, product exit conduits 340 are openly joined to a plenum 344. A plenum volume 346 is formed within the boundaries of plenum 344 as joined to the top of termination vessel shell 328. The plenum 346 and plenum volume 346 are provided to collect reaction product and possibly unreacted feedstock exiting product exit conduits 340, and direct that material to a common, secondary product exit conduit 348, used to convey reaction product and possibly unreacted feedstock away from the apparatus.

A second material transit 350, through which a solid, particulate catalyst, a conversion product and possibly unreacted feedstock may flow out of second reaction stage 318 and into separation device 334, is established as the open, cross-section surface formed at the end of reactor shell 312 that is openly joined with termination vessel 328. The volume of reaction zone 314, which is the sum of the volumes of first reaction stage 316 and second reaction stage 318, is established by geometric calculations according to the prevalent dimensions moving along and within the walls of the apparatus between the lowest feedstock inlet 320 to the second material transit 350.

Figure 4:
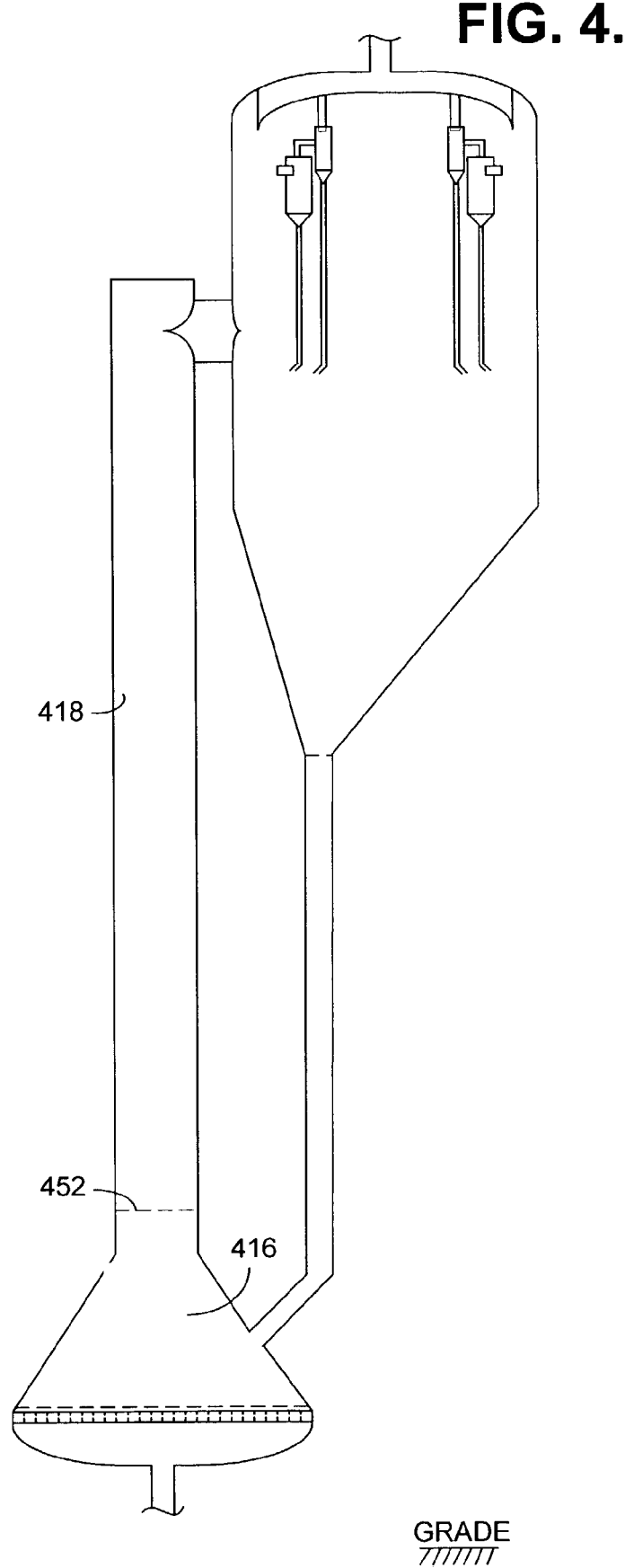
FIG. 4 shows a sectional elevation of a fourth possible embodiment of a hydrocarbon conversion apparatus of the present invention.

FIG. 4 shows an embodiment that is similar to that in FIG. 3A, except that the location of a first material transit 452 differs. This means that the volumes, heights, lengths and AEDs of first reaction stage 416 and second reaction stage 418 differ from those shown in FIG. 3A. Contrasting the embodiment in FIG. 3A with that in FIG. 4, this demonstrates that more than one value may satisfy the numerical requirements for $L_2/AED_2$ and $AED_1/AED_2$ on the same apparatus.

In FIGS. 5A-D, FIG. 5A presents a sectional elevation of a hydrocarbon conversion apparatus 500 of the present invention. FIG. 5B presents a partial transverse section of the apparatus, looking down on FIG. 5A along the line indicated, focusing on elements associated with reaction zone 510 and omitting separation device 520. FIG. 5C also presents a partial transverse section of the apparatus, looking down on FIG. 5A along a line indicated that is slightly higher than that for FIG. 5B, focusing on other features associated with reaction zone 510 as it is connected to a portion of separation device 520. FIG. 5D presents a partial transverse section of the apparatus, looking into FIG. 5A from the orthogonal right along the line indicated, focusing on features associated with reaction zone 510 and omitting separation device 520.

With continuing attention to FIGS. 5A-D a feedstock conduit 502, which provides a liquid or gaseous feedstock to the apparatus, passes through an opening in base 504, on which the apparatus may in part rest. Base 504 and feedstock conduit 502 form a (annular) receiver volume 506, in which solid, particulate catalyst would reside. Receiver volume 506 is provided to bring catalyst near the top end of feedstock conduit 502 from below it, thus allowing the flowing feedstock exiting feedstock conduit 502 to draft the catalyst up with it, during operation of the apparatus.

Base 504 is openly joined to reactor shell 508, that forms the totality of reaction zone 510, in which a reaction among the feedstock and catalyst may take place. Reaction zone 510 is composed of a first reaction stage 512 and a second reaction stage 514, distinguished in that the former has a larger AED than the latter, and provided to allow feedstock, product and other gasses that may flow through the reaction zone 510 to have an increasing gas superficial velocity as the reaction proceeds to completion. A reactor shell 508 is comprised of four contiguous geometries, starting from the bottom and working upwards: a cylinder, a right frustum, another cylinder and a rectangular duct. The bottom cylinder is openly joined to the bottom of the frustum, the top of the frustum is openly joined to the bottom of the top cylinder, and the rectangular duct is openly joined to near the top of the top cylinder.

A lowest feedstock inlet 516, through which feedstock would flow out the top end of feedstock conduit 502 into first reaction stage 512, is determined as the open, cross-section surface, parallel to grade, formed along the top end of feedstock conduit 502. A catalyst inlet 518, through which a solid, particulate catalyst would flow from receiver volume 506 into first reaction stage 512, is established as the open, annular cross-section surface co-planar with the lowest feedstock inlet 516, and represents a portion of the boundary of first reaction stage 512.

Separation device 520 is comprised of separation element 522, catalyst exits 524 and 525, and product exit 526, in what is known to those skilled in the art as a "closed cyclone" configuration. By "closed cyclone" is meant a cyclone separator is openly joined to a reactor shell, with no open volume between those two elements (although there may be a small opening where they are joined to equalize pressure with their surroundings, in the event the cyclones and pertinent section of the reactor shell are enclosed in a larger volume vessel).

The rectangular duct section at the top of reactor shell 508 is openly joined to series cyclone separator 522. A first catalyst exit conduit 528, which would carry catalyst away from separation device 520, is openly joined to the first stage of series cyclone separator 522, and a first catalyst exit 524, through which catalyst may flow out of the series cyclone separator to first catalyst exit conduit 528, is formed as the open surface area at the junction of the first stage of series cyclone separator 522 and first catalyst exit conduit 528. A second catalyst exit conduit 530, which would also carry catalyst away from separation device 520, is openly joined to the second stage of series cyclone separator 522, and a second catalyst exit 525, through which catalyst may flow out of the series cyclone separator 522 to the second catalyst exit conduit 530, is formed as the open surface area at the junction of the second stage of series cyclone separator 522 and second catalyst exit conduit 530. Further, product exit conduit 532, which would carry reaction product and possibly unreacted feedstock away from separation device 520, is openly joined to the second stage of series cyclone separator 522. Product exit 526, through which reaction product and possibly unreacted feedstock would flow out of series cyclone separator 522 and into product exit conduit 532, is formed as the open surface at the junction of series cyclone separator 522 and product exit conduit 532.

A second material transit 534, through which a solid particulate catalyst, a conversion product and possibly unreacted feedstock may flow out of second reaction stage 514 and into separation device 520, is established as the open, cross-sectional surface formed at the end of reactor shell 508 having the rectangular duct that is openly joined to the first stage of series cyclone 522. The volume of reaction zone 510, which is the sum of the volumes of first reaction stage 512 and second reaction stage 514, is established by geometric calculations according to the prevalent dimensions moving along and within the walls of the apparatus between the lowest feedstock inlet 516 and the second material transit 534.

A catalyst circulation conduit 538, through which a catalyst may flow, has a first end, first catalyst exit conduit 528, and a second end 540 openly joined to base 506. Catalyst circulation conduit 538 is provided to enable fluid communication between catalyst exit 528 and catalyst inlet 518. In this embodiment, there are two other elements included in the path of catalyst that would travel from first catalyst exit 524 to catalyst inlet 518. The first is a flow control device 542, provided to control the rate of flow of catalyst through the catalyst circulation conduit 538. The second element is a receiver volume 506, discussed previously. Examples of catalyst flow control devices include but are not be limited to slide valves, plug valves and ball valves, optionally further comprising mechanized or hydraulic movement.

A catalyst regeneration apparatus 568 is shown in FIG. 5A in fluid communication with hydrocarbon reactor apparatus 500. The catalyst regeneration apparatus 568 is comprised of a catalyst stripper 542, a catalyst regenerator 548 and a catalyst cooler 554.

A second catalyst exit conduit 530 further provides fluid communication of catalyst from separation device 520 to a catalyst stripper 542. Second catalyst exit conduit 530 is openly joined to a place near the top of catalyst stripper 542, and has located in its length a first regenerator flow control device 544, provided to control the rate of flow of catalyst from separation device 520 to catalyst stripper 542. Catalyst stripper 542 is provided to remove at least a portion of volatile or entrained combustible materials from a catalyst in a stripping vapor stream that will exit through a conduit openly joined near the top of the catalyst stripper 542. The stripping vapor will be provided through a conduit openly joined near the bottom of catalyst stripper 542, and contact the catalyst that is passing downward, typically using mass transfer enhancing devices known to those skilled in the art, such as packing or trays. The catalyst will then exit the catalyst stripper 542 through a third catalyst conduit 546 openly joined near the bottom of the catalyst stripper 542. Third catalyst conduit 546 provides for fluid communication of catalyst from the catalyst stripper 542 to catalyst regenerator 548, and has located in its length a second regenerator flow control device 550, provided to control the rate of flow of catalyst from catalyst stripper 542 to catalyst regenerator 548.

In FIG. 5A, catalyst regenerator 548 is provided to restore reactive activity to a solid, particulate catalyst that may have been lost during a hydrocarbon conversion reaction in hydrocarbon conversion apparatus 500. Catalyst regenerator 548 is openly joined to a fourth catalyst conduit 552, to provide fluid communication of catalyst from catalyst regenerator 548 to a catalyst cooler 554. Catalyst cooler 554 is provided to remove heat from and reduce the temperature of catalyst from catalyst regenerator 548. A fifth catalyst conduit 556 provides fluid communication of cooled catalyst from catalyst cooler 554 back to catalyst regenerator 548, and has located in its length a third regenerator flow control device 558, provided to control the rate of flow of catalyst from catalyst cooler 554 and catalyst regenerator 548. Openly joined to fifth catalyst conduit 556 is a lift gas conduit 560, that provides a lift gas to transport catalyst up fifth catalyst conduit 556 and back into catalyst regenerator 548. A sixth catalyst conduit 562 splits off from fifth catalyst conduit 556 and is openly joined to base 504. Sixth catalyst conduit 562 provides fluid communication of catalyst from catalyst cooler 554 to receiver volume 506, and has located in its length a fourth regenerator flow control device 564, provided to control the rate of flow of catalyst from catalyst cooler 554 to receiver volume 506.

Designs of a catalyst regenerator 548 may include a regeneration gas inlet conduit, receiver volume and distribution grid near the bottom of the catalyst regenerator 548, and a catalyst separation element and a gas exit conduit near the top. In some embodiments, a regenerator will provide for combustion of at least a portion of carbonaceous deposits that may be present on the catalyst, and the catalyst cooler will generate steam. Examples of regenerators and catalyst coolers are found in U.S. Pat. Nos. 4,595,567, 4,615,992 and 4,780,195, each incorporated herein by reference in its entirety.

One will also appreciate that many variations in the configuration of the regeneration apparatus 568 and its connections with hydrocarbon reactor apparatus 500 are possible, and within the scope of the present invention. For example, the catalyst stripper 542 or the catalyst cooler 554, or both, may be omitted, providing only a catalyst regenerator 548. Similarly, it may be useful to provide catalyst from hydrocarbon conversion apparatus 500 to any part of regenerator apparatus 568, or provide catalyst from regenerator apparatus 568 to any part of hydrocarbon conversion apparatus 500. In embodiments not shown, this may include a catalyst conduit that provides catalyst from a regenerator apparatus directly to the first reaction stage through another catalyst inlet at an open joining to a reactor shell, or to a catalyst circulation conduit via an open joining, or to a termination vessel volume by an open joining to a termination vessel shell, among many other possibilities. Finally, in one embodiment, a catalyst heater, having a very similar indirect heat transfer device design to a catalyst cooler, is used to increase the heat content of the catalyst flowing within it.

The geometry of the first or second reaction stage, as defined by a reactor shell and various inlet, transit and outlet surfaces, may vary widely. In the embodiment in FIG. 1A, the geometry is comprised of rectangular and square parallelepipeds. In the embodiment in FIG. 2A, the geometry is comprised of a single, right frustum of a cone. In the embodiments in FIGS. 3A, 4, and 5A the geometry is comprised of a right frustum of a cone and right cylinders. Other suitable geometric shapes include, but are not limited to, triangular prisms and frusta of pyramids, rectangular and square wedges and frusta of pyramids, and pentagonal, hexagonal, septagonal and octagonal prismatoids and frusta thereof, general and right. Further non-limiting examples include various polyhedrons, such as a tetrahedron, an octohedron, a dodecahedron or an icosahedron, and conical spheres and spherical sectors, and torus and barrels in their circular, elliptical or parabolic forms, and frusta thereof, general and right. Multiple occurrences of any of these geometric shapes defining the first or second reactions stages are also within the scope of an apparatus of the present invention.

A cross-sectional area for net flow may be determined at any point in the reaction zone of an apparatus of the present invention. By net flow is meant the overall, integrated feedstock, product and other gas flow moving along a path within a reaction zone towards the second material transit (as opposed to the flow at a specific point, which may be going in any direction due to turbulent flow eddies or other local factors). The cross-sectional area for net flow is defined as the actual cross-sectional area within the reaction zone in a plane perpendicular to the direction of the net flow of feed stock, product and any other gases that may flow through the reaction zone if the apparatus were in use. Unlike average equivalent cross-sectional area, cross-sectional area for net flow is determined at a single point in the reaction zone and is not normalized to any particular geometry. Rather, it is a straightforward calculation according to the exact geometry of the cross-section in the plane perpendicular to net flow at the specific point of interest. Further, determination of the direction of net flow of feedstock, product and any other gases that may flow through the reaction zone if the apparatus were in use is a straightforward exercise well known to those skilled in the art. For example, in FIG. 1A, the direction of net flow of feedstock, product and any other gases that would flow through reaction zone 109 is, at all points, upwards perpendicular to grade.

In one embodiment, the invention has a second reaction stage of a smaller average equivalent diameter than that of the first reaction stage. Accordingly, the reactor shell, and thus the reaction zone thereby defined, and hence at least one of the reaction stages thereby defined, will have at least one tapering element having a tapering element angle of at least 1.1 degree in its geometry when traversing its length. A tapering element will contribute to providing a reduction in the cross-sectional area for net flow moving from the lowest feedstock inlet to the second material transit, and hence provide a reduction in average equivalent diameter from the first reaction stage to the second reaction stage. A portion of the reaction zone having a tapering element angle or angles of 1.0 degree or less will not sufficiently change the cross-sectional area for net flow over a practical length scale to be considered a tapering element. (Neither will it be considered indicative of an enlarging element, discussed in more detail below). Beyond that, however, the geometry of a tapering element of the first or second reaction stage, or both, may vary widely, and include many of the shapes noted above in the discussion of the geometry of the reaction stages.

A tapering element angle is defined herein as the value of the smallest angle, measured from a plane that is both perpendicular to grade and tangential to any point on a reaction stage cross section perimeter (as defined by the reactor shell) made in a plane parallel to grade, to the interior surface of a reactor shell, feedstock inlet or catalyst inlet defining the first and second reaction stages. By this definition, a tapering element angle cannot fall below 0 degrees and cannot exceed 90 degrees. However, a tapering element angle as defined herein may or may not be associated with a tapering element.

The Figures discussed thus far provide several examples of a particular type of tapering element termed herein an "iris diaphragm tapering element." By "iris diaphragm tapering element" is meant that a reduction in cross-sectional area for net flow of the reaction zone is obtained in moving through the reaction zone from the lowest feedstock inlet to the second material transit in the fashion of a iris diaphragm, with a sudden or gradual contraction of a cross-section perimeter of similar or gradually changing shape, similar to the working of the iris of an eye or of a camera.

Another type of tapering element which can be used in this invention is a "sudden geometric shift tapering element." By "sudden geometric shift tapering element" is meant that there is, in addition to a reduction in cross-sectional area for net flow, a sudden shift in the cross-sectional perimeter shape of the reactor shell forming the reaction zone. The sudden geometric shift tapering element can also be characterized by causing a change in the direction of net flow of feedstock, product and any other gases that may flow through the reaction zone, in this instance from upwards perpendicular to grade to rightwards parallel to grade.

Note that a tapering element will provide a reduction cross-sectional area for net flow moving along the apparatus from the lowest feedstock inlet to the second material transit. With regard to FIG. 5A, the tapering element angle of the right cylinder portions of reactor shell 508 that are perpendicular to grade is zero degrees (similarly with the right cylinder portion of reactor shell 312 in FIG. 3A), and hence those portions of the reaction zone are not tapering elements, as they cannot provide a reduction in cross-sectional area for net flow moving along the apparatus from the lowest feedstock inlet to the second material transit. A tapering element must, by definition herein, have a tapering element angle of at least 1.1 degree. Also, with regard to FIGS. 3A and 4, there is a tapering element angle of 90 degrees associated with the lateral cylindrical portion of the reaction zone 314 adjacent to second material transit 350, but since that lateral cylindrical portion does not contribute to a reduction in cross-sectional area for net flow, it is not a tapering element. Further, with respect to FIGS. 6A-C, discussed in detail below, there is a tapering element angle of 45 degrees for the right frustum portion of reactor shell 610 adjacent to base 604, but since that particular right frustum portion does not contribute to a reduction in cross-sectional area for net flow moving along the apparatus from the lowest feedstock inlet from the lowest feedstock inlet to the second material transit, it is not a tapering element. Rather, the tapering element angle of 45 degrees for the right frustum portion of reactor shell 610 adjacent to base 604 increases the cross-sectional area for net flow moving along the apparatus from the lowest feedstock inlet to the second material transit, and is herein termed an "enlarging element."

Also note that in order for an apparatus of the present invention to be characterized as having more than one tapering element, as discussed above for the embodiment provided in FIG. 5A, each must be separated by a section of the reaction zone that is not a tapering element, i.e., a section of the reaction zone that does not have a tapering element angle of at least 1.1 degrees, or does not change the cross-sectional area for net flow moving from the lowest feedstock inlet to the second material transit according to the definitions herein.

In alternative embodiments not shown, there is another type of tapering element herein termed a "penetrating mass tapering element." By "penetrating mass" is meant that there is a mass of some type penetrating through or otherwise positioned within (e.g., by hanging from a portion of a separation device) a portion of a reactor shell, and thus associated with determining the geometry, volume and cross-sectional area for net flow of the reaction zone defined thereby. The penetrating mass will serve to reduce a given cross-sectional area for net flow of the reaction zone (and hence the average equivalent diameter of one or both reaction stages), and increase the superficial gas velocity of flowing feedstock or conversion product, or both, as they flow from the lowest feedstock inlet to the product exit. As defined herein, a penetrating mass tapering element must also provide for a reduction of at least about 0.7% in the cross-sectional area for net flow over a reactor length (as previously defined for either the first reaction stage or the second reaction stage, as appropriate to the location of the penetrating mass) of 1 meter; anything less will not provide a sufficient reduction over a practical length scale to be considered a tapering element, although it is still a feature that will be considered in the calculations of geometry, volume and average equivalent diameter. Non-limiting examples of a penetrating mass tapering element are a tube, baffle plate, or multiples and combinations thereof, positioned in the path of flow for the feedstock or conversion products between the lowest feedstock inlet and the second material transit. The geometry and orientation of a penetrating mass may vary widely.

An apparatus of the present invention may function with the reaction zone having one or more tapering elements, and with a wide range of tapering element angles, in a wide variety of specific positions. The selection will be based on factors associated with the conversion process to be conducted in the apparatus, discussed below.

The number of tapering elements employed in an apparatus of the present invention can be one, two, three, four, five, six or more. The location of a tapering element or elements in an apparatus of the present invention can be any part of the reactor shell, and hence any part of the reaction zone thereby defined, and apportioned in any manner to the first reaction stage and second reaction stage. A single tapering element can also be situated so as to be a part of both the first reaction stage and second reaction stage. See, for example, FIG. 1A, where the single iris diaphragm tapering element of a tapering element angle of 90 degrees is found at the first material transit 148; and see FIG. 3A, where the single iris diaphragm tapering element of a right frustum of a cone having a tapering element angle of 30 degrees near the bottom of reactor shell 312 straddles the first material transit 352. Alternatively, the tapering element or elements can be present only in the first reaction stage and not the second reaction stage, or be present only in the second reaction stage and not the first reaction stage.

With further regard to the location of a tapering element or elements, according to an embodiment of the invention, at least one tapering element or portion thereof is present at an elevation above the lowest point of the lowest feedstock inlet of less than about 90% of the difference between the elevation of the lowest point of the lowest feedstock inlet and the highest point of the first reaction stage and the second reaction stage. By "portion thereof" in this context is meant that some portion of a single tapering element may be above the specified elevation as well at or below it, in the manner elaborated on in the preceeding paragraph regarding the location of a tapering element with respect to a given reaction stage.

Various embodiments of an apparatus of the present invention hold that at least one tapering element or portion thereof is present at an elevation above the lowest point of the lowest feedstock inlet of no greater than about 90%, or no greater than about 85%, or no greater than about 80%, or no greater than about 70%, or no greater than about 60%, or no greater than about 50%, or no greater than about 40%, or no greater than about 30%, or no greater than about 20% of the difference between the elevation of the lowest point of the lowest feedstock inlet and the highest point of the first reaction stage and the second reaction stage. Alternative embodiments hold that at least one tapering element or portion thereof is present at an elevation above the lowest point of the lowest feedstock inlet of at least about 5%, or at least about 10%, or at least about 15%, or at least about 20%, or at least about 25%, or at least about 30%, or at least about 40% of the difference between the elevation of the lowest point of the lowest feedstock inlet and the highest point of the first reaction stage and the the second reaction stage. Still other embodiments hold that at least one tapering element or portion thereof is present at an elevation above the lowest point of the lowest feedstock inlet of any logical range selected from the following: at least about 5%, or at least about 10%, or at least about 15%, or at least about 20%, or at least about 25%, or at least about 30%, or at least about 40%, and; no greater than about 90%, or no greater than about 85%, or no greater than about 80%, or no greater than about 70%, or no greater than about 60%, or no greater than about 50%, or no greater than about 40%, or no greater than about 30%, or no greater than about 20% of the difference between the elevation of the lowest point of the lowest feedstock inlet and the highest point of the first reaction stage and the second reaction stage.

Other aspects of an apparatus of the present invention provide that only one tapering element or portion thereof is present at an elevation above the lowest point of the lowest feedstock inlet of no greater than about 90%, or no greater than about 85%, or no greater than about 80%, or no greater than about 70%, or no greater than about 60%, or no greater than about 50%, or no greater than about 40%, or no greater than about 30%, or no greater than about 20% of the difference between the elevation of the lowest point of the lowest feedstock inlet and the highest point of the first reaction stage and the second reaction stage. Yet other aspects provide that only one tapering element or portion thereof is present at an elevation above the lowest point of the lowest feedstock inlet of at least about 5%, or at least about 10%, or at least about 15%, or at least about 20%, or at least about 25%, or at least about 30%, or at least about 40% of the difference between the elevation of the lowest point of the lowest feedstock inlet and the highest point of the first reaction stage and the the second reaction stage. Still other aspects provide that only one tapering element or portion thereof is present at an elevation above the lowest point of the lowest feedstock inlet of a logical range selected from the following: at least about 5%, or at least about 10%, or at least about 15%, or at least about 20%, or at least about 25%, or at least about 30%, or at least about 40%, and; no greater than about 90%, or no greater than about 85%, or no greater than about 80%, or no greater than about 70%, or no greater than about 60%, or no greater than about 50%, or no greater than about 40%, or no greater than about 30%, or no greater than about 20% of the difference between the elevation of the lowest point of the lowest feedstock inlet and the highest point of the first reaction stage and the second reaction stage.

Certain embodiments of the invention provide that any and all tapering elements or portions thereof are present at an elevation above the lowest point of the lowest feedstock inlet of no greater than about 90%, or no greater than about 85%, or no greater than about 80%, or no greater than about 70%, or no greater than about 60%, or no greater than about 50%, or no greater than about 40%, or no greater than about 30%, or no greater than about 20% of the difference between the elevation of the lowest point of the lowest feedstock inlet and the highest point of the first reaction stage and the second reaction stage. Yet other embodiments provide that any and all tapering elements or portions thereof are present at an elevation above the lowest point of the lowest feedstock inlet of at least about 5%, or at least about 10%, or at least about 15%, or at least about 20%, or at least about 25%, or at least about 30%, or at least about 40% of the difference between the elevation of the lowest point of the lowest feedstock inlet and the highest point of the first reaction stage and the second reaction stage. Still other embodiments provide that any and all tapering elements or portions thereof are present at an elevation above the lowest point of the lowest feedstock inlet of a logical range selected from the following: at least about 5%, or at least about 10%, or at least about 15%, or at least about 20%, or at least about 25%, or at least about 30%, or at least about 40%, and; no greater than about 90%, or no greater than about 85%, or no greater than about 80%, or no greater than about 70%, or no greater than about 60%, or no greater than about 50%, or no greater than about 40%, or no greater than about 30%, or no greater than about 20% of the difference between the elevation of the lowest point of the lowest feedstock inlet and the highest point of the first reaction stage and the second reaction stage.

In one embodiment of the invention, a tapering element will be present. The tapering element desirably has a tapering element angle or angles of at least about 1.2 degrees, or at least about 1.5 degrees, or at least about 2.0 degrees, or at least about 3.0 degrees, or at least about 5.0 degrees, or at least about 7.0 degrees, or at least about 10.0 degrees, or at least about 15.0 degrees, or at least about 20.0 degrees. In yet different embodiments, there will be present at least one tapering element having a tapering element angle of no greater than about 2.0 degrees, or no greater than about 4.0 degrees, or no greater than about 6.0 degrees, or no greater than about 8.0 degrees, or no greater than about 10.0 degrees, or no greater than about 15.0 degrees, or no greater than about 30.0 degrees, or no greater than about 60.0 degrees, or no greater than about 80.0 degrees. In still different embodiments, there will be present at least one tapering element having a tapering element angle of any logical range selected from the following: at least about 1.2 degrees, or at least about 1.5 degrees, or at least about 2.0 degrees, or at least about 3.0 degrees, or at least about 5.0 degrees, or at least about 7.0 degrees, or at least about 10.0 degrees, or at least about 15.0 degrees, or at least about 20.0 degrees, and; no greater than about 2.0 degrees, or no greater than about 4.0 degrees, or no greater than about 6.0 degrees, or no greater than about 8.0 degrees, or no greater than about 10.0 degrees, or no greater than about 15.0 degrees, or no greater than about 30.0 degrees, or no greater than about 60.0 degrees, or no greater than about 80.0 degrees.

The selection of a particular number, type, geometry and position of a tapering element or elements, and the value or range of values for a tapering element angle present in an apparatus of the present invention may be influenced by many factors. These include predetermined hydrodynamic flow characteristics of the gas and solids in each reaction stage and through a tapering element or portion of the reaction stage having a tapered element angle, and the nature of the catalyst, feedstock and reactants to be used in the apparatus, including prevalent reaction chemistry and kinetics, for example, the rate of secondary reactions that may consume desirable products once formed. With respect to the position of a tapering element, reaction systems that have a high rate of undesirable secondary reactions may find lower positions more useful, as they may, in consideration with other factors such as desired average equivalent diameters, provide for a higher second reaction stage volume. Alternatively, reaction systems that have lower rates of undesirable secondary reactions may find higher positions more useful. With regard to the number of tapering elements present at any given position or positions, consideration should be given to the nature of the anticipated hydrodynamic flow regimes in each part of the reaction zone, and the reaction stoichiometry, among other factors. For example, if it is straightforward to understand and control the hydrodynamic flow characteristics of a reaction system under most conditions, an increased number of tapering elements may be useful. On the other hand, if the hydrodynamics of the reaction system are complex and sensitive to a large number of factors, a smaller number of tapering elements may be useful to better control the system. In considering reaction stoichiometry, a system in which moles of species decline with increasing extent of reaction may find a higher number of tapering elements more useful, while a system in which moles of reactants increase may find a lower number of tapering elements is more useful.

Another particular consideration in the selection of a particular number, type, geometry and position of a tapering element or elements, and the value or range of values for a tapering element angle or angles present in an apparatus of the present invention is the attrition or hardness characteristics of the catalyst to be used, and the desired level of attrition that may result from a given choice of tapering element. Yet another particular consideration is the attrition or hardness characteristics to be used in conjunction with the desired materials of construction of the apparatus, and the acceptable levels of erosion for those materials of construction when in use. For the aforementioned particular considerations, smaller values and ranges of values of a tapering element angles are more useful, for example, no greater than about 45 degrees, or no greater than about 30 degrees, or no greater than about 15 degrees, or no greater than about 10 degrees, or no greater than about 7 degrees. One other particular consideration may be the ability to characterize and control the hydrodynamic flow regime of the gas and solids in the reaction stages. For that particular consideration, in general, larger tapering element angles are more useful, as they can more abruptly change the gas flow rate through the apparatus when in use, for example at least about 10 degrees, or at least about 20 degrees, or at least about 30 degrees, or at least about 45 degrees. Also for that consideration, right, isoangular tapering elements are useful, as they tend to render the flow characteristics similar across any given cross section of the first or second reaction stage. Right, isoangular tapering elements include right frusta of cones and triangular, rectangular and square pyramids, among others, that have the same tapering element angle at all points along a given cross-section perimeter of a reaction stage.

A factor determining how to select, design and position a penetrating mass, or a penetrating mass tapering element, in particular, is its purpose, i.e, consideration of if it is there specifically to provide a reduction in cross-sectional area, or if it is coincidentally being provided for a different purpose than a reduction in cross-sectional area. For example, the penetrating mass may primarily be provided as an inlet or ancillary element discussed earlier, e.g. a secondary feedstock inlet, a fluidization gas conduit or an instrumentation probe, and thus while still a tapering element, may be configured so as to minimize any change to a given cross-sectional area at any part of the reaction zone, and not be tapering element. In another example, the penetrating mass tapering element may be a series of heat exchanger tubes whose coincident purpose is to remove heat from the reaction zone, and thus may be designed to enhance heat transfer characteristics at a position closer to the second material transit than it is to the lowest feedstock inlet. Similar considerations will determine how to select, design and position a sudden geometric shift tapering element. For example, the sudden geometric shift may be primarily intended to make conditions more conducive to entering a separation device, and thus be configured to change net flow direction as well as velocity near the second material transit.

Of course, it will be appreciated by one of skill in the art that combinations of any or all of the features and ranges of the aforementioned embodiments regarding the particular number, type, geometry and position of a tapering element or elements, and the value or range of values for a tapering element angle, are also within the scope of an apparatus of the present invention. Further, the skilled artisan will understand that combinations of any or all of the features and ranges of the aforementioned embodiments regarding the particular number, type, geometry and position of a tapering element or elements, and the value or range of values for a tapering element angle, along with any or all of the previously noted features and ranges regarding features and other elements are also within the scope of an apparatus of the present invention.

Figure 6A:
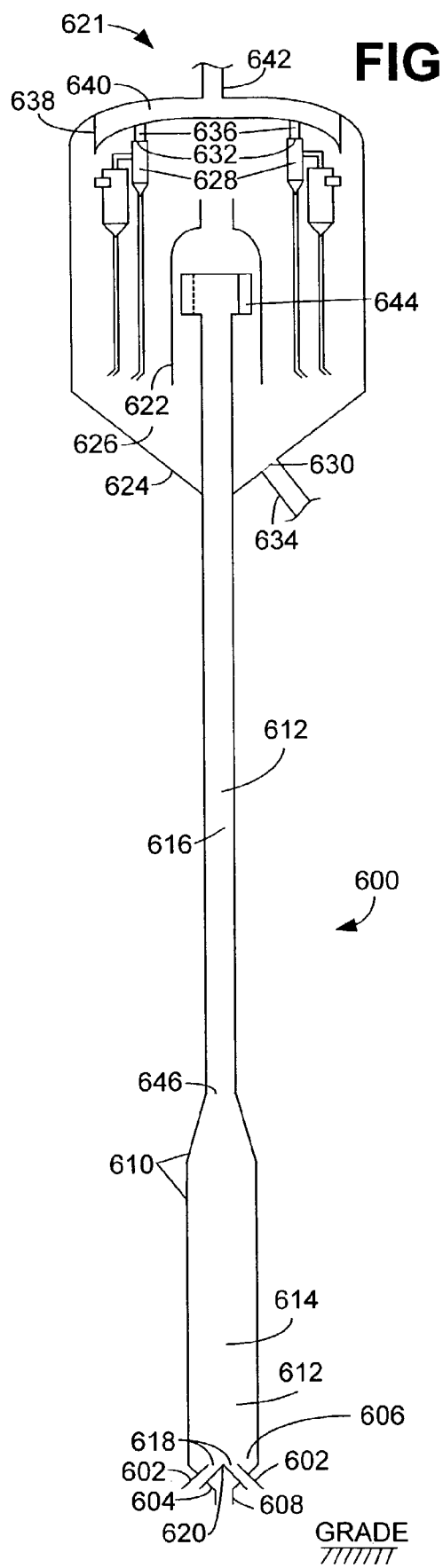
FIGS. 6A-C show a sectional elevation of another alternative embodiment of a hydrocarbon conversion apparatus of the present invention, and two partial transverse sections of the apparatus along lines as indicated.
Figure 6B:
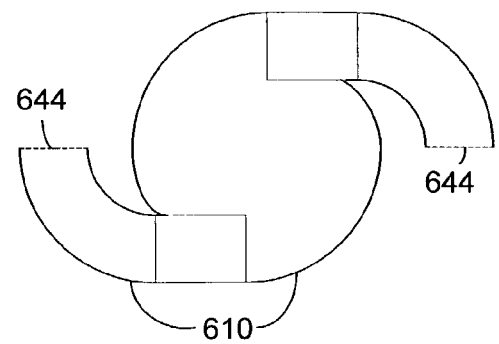
Figure 6C:
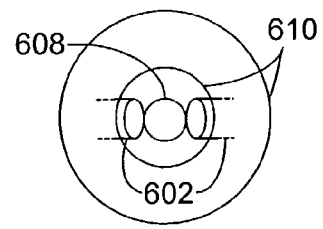

Now looking to FIGS. 6A-C, FIG. 6A presents a sectional elevation of a hydrocarbon conversion apparatus 600 of the present invention. FIG. 6B presents a partial transverse section of the apparatus, looking down on FIG. 6A along the line indicated, focusing on elements associated with the upper portion of reactor shell 610, and omitting separation device 621. FIG. 6C also presents a partial transverse section of the apparatus, looking down on FIG. 6A along the line indicated that is lower than that for FIG. 6B, focusing on the elements associated with the lower portion of reactor shell 610.

In FIGS. 6A-C, two feedstock conduits 602, that would provide a liquid or gaseous feedstock to the apparatus, pass through an opening in base 604, provided to form (partially conical) receiver volume 606, in which a solid, particulate catalyst may reside. Feedstock conduits 602 are right cylinders having an open end residing within the lower portion of reaction zone 612 at an angle of about 45 degrees. A catalyst inlet conduit 608, that would provide a solid, particulate catalyst to receiver volume 606, which is provided to bring catalyst to the lowest point of the open ends of feedstock conduits 602, thus allowing the flowing feedstock exiting feedstock conduits 602 to draft the catalyst up with it, during operation of the apparatus. Base 604 is openly joined to reactor shell 610, that forms the totality of reaction zone 612, in which a reaction among the feedstock and catalyst may take place. Reaction zone 612 is composed of a first reaction stage 614 and a second reaction stage 616, distinguished in that the former has a larger AED than the latter, and provided to allow feedstock, product and other gasses that may flow through the reaction zone 612 to have an increasing gas superficial velocity as the extent of reaction increases. The reactor shell 610 is comprised of six contiguous, openly joined geometries, starting from the bottom and working upwards: a right frustum of a cone with the base at the top, a right cylinder, a right frustum of a cone with the base at the bottom, another right cylinder, two short, straight rectangular ducts and two curved rectangular ducts. Note that the configuration of shorter ducts including a curved duct as part of a reactor shell is what is termed herein as a "ram's head." Another example of a "ram's head" can be found in U.S. Pat. No. 6,166,282, mentioned earlier herein.

A lowest feedstock inlet 618, through which feedstock would flow out of the lowest open point of feedstock conduits 602 into first reaction stage 614, is determined as the open, cross-section surface, parallel to grade, formed along the lowest open point of feedstock conduits 602. In this embodiment, a catalyst inlet 620, through which a solid, particulate catalyst would flow from receiver volume 606 into first reaction stage 614, is established as the open, cross-section surface co-planar with the lowest feedstock inlet 618, and represents a portion of the boundary of first reaction stage 614.

FIG. 6A further shows a separation device 621 which is comprised of separation elements 622, 624, 626 and 628, catalyst exit 630 and product exits 632. The "ram's head" end of reactor shell 610 is in open communication with termination volume 626, formed by termination vessel shell 624.

Located with termination volume 626 is a cylinder 622, open on both ends, surrounding the ram's head. In operation, the catalyst exiting the ram's head would strike the cylinder 622 at a tangent to its internal perimeter, and the combination of the ram's head configuration and cylinder 622 will act similarly to a cyclone separator, discussed previously. More conventional series cyclone separators 628 are provided as another separation element.

A catalyst exit conduit 634, which would carry catalyst away from the separation device 621, is openly joined to termination vessel shell 624. A catalyst exit 630, through which a catalyst may flow out of the termination volume 626 and into catalyst exit conduit 634, is formed as the open surface area at the junction of termination vessel shell 624 and catalyst exit conduit 634. Further, product exit conduits 636, through which a which would carry a reaction product and possibly unconverted feedstock away from separation device 621, are openly joined to the top of series cyclone separators 628. Product exits 632, through which a reaction product and possibly unreacted feedstock would flow out of series cyclone separators 628 and into product exit conduits 636, are formed as the open surfaces at the junction of series cyclone separators 628 and product exit conduits 636. Product exit conduits 636 are openly joined to a plenum 638. A plenum volume 640 is formed within the boundaries of plenum 638 as joined to the top of termination vessel shell 624. The plenum 638 and plenum volume 640 are provided to collect reaction product and possibly unreacted feedstock exiting product exit conduits 636, and direct that material to a common, secondary product exit conduit 642, provided to convey reaction product and possibly unreacted feedstock away from the apparatus.

A second material transit 644, through which a solid, particulate catalyst, a conversion product and possibly unreacted feedstock may flow out of second reaction stage 616 and into separation device 621, is determined as the open, cross-section surface formed at the open ends of the ram's head at the top of reactor shell 610 that is in open communication with termination vessel volume 626. The volume of reaction zone 612, which is the sum of the volumes of first reactions stage 614 and second reaction stage 616, is established by geometric calculations according to the prevalent dimensions moving along and within the walls of the apparatus between the lowest feedstock inlet 618 and the second material transits 644. It should be noted that in determining this total volume of reaction zone 612, the volume within feedstock conduits 602 and above lowest feedstock inlet 618 are omitted. This is because in operation, the flow of feedstock out of the feedstock conduits 602 will be of sufficient force to prevent catalyst from entering the volume within the feedstock conduits 602, and a reaction could not take place there.

Figure 7A:
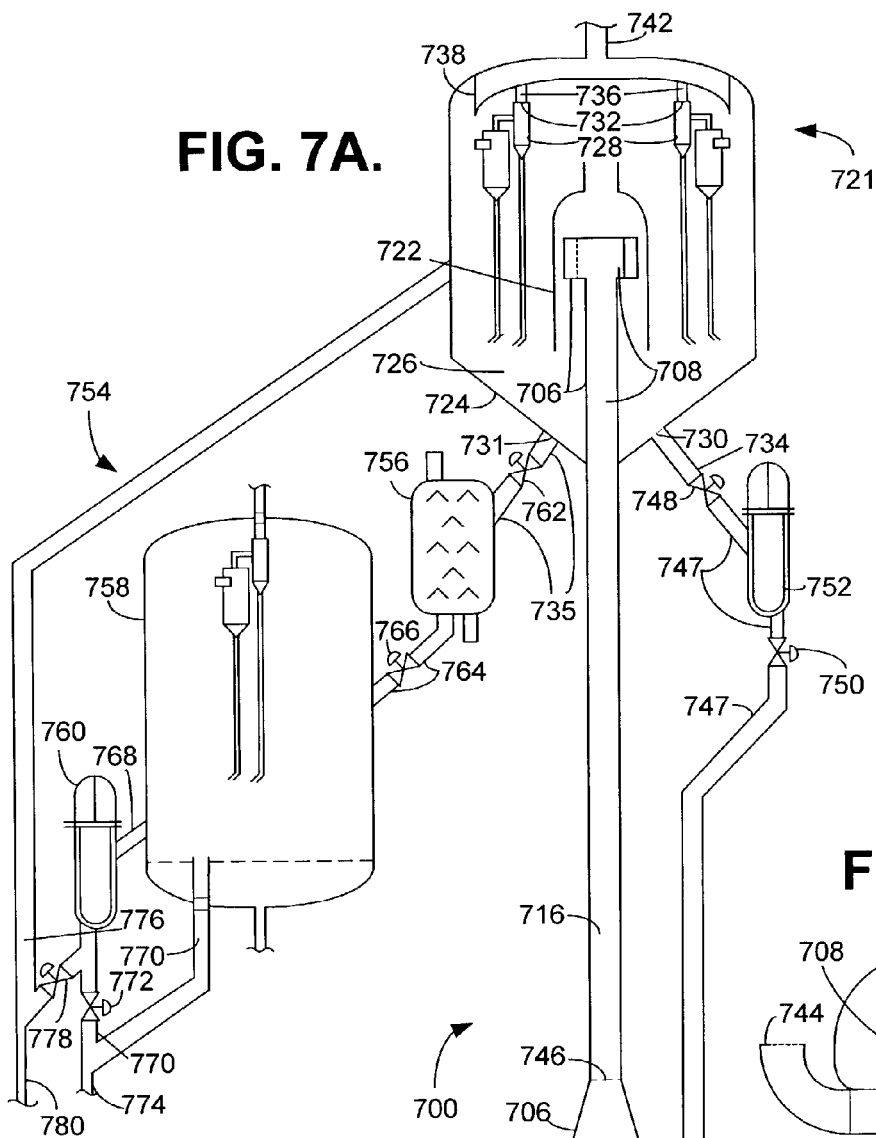
FIGS. 7A-C show a sectional elevation of a seventh embodiment of a hydrocarbon conversion apparatus of the present invention, and two partial transverse sections of the apparatus along lines as indicated.
Figure 7B:
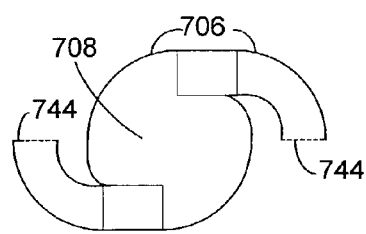
Figure 7C:
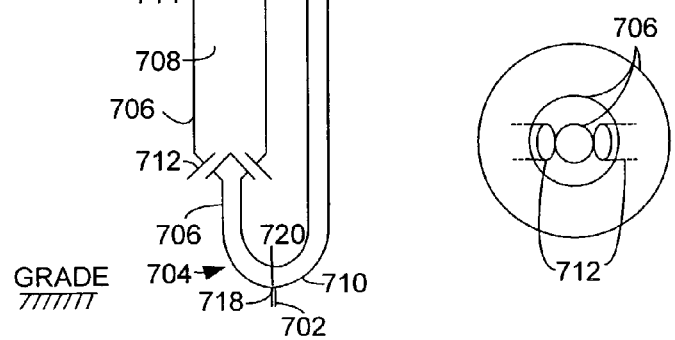

In FIGS. 7A-C, FIG. 7A shows a sectional elevation of a hydrocarbon conversion apparatus 700 of the present invention. FIG. 7B presents a partial transverse section of the apparatus, looking down on FIG. 7A along the line indicated, focusing on elements associated with the upper portion of reactor shell 706, and omitting separation device 721. FIG. 7C also presents a partial transverse section of the apparatus, looking down on FIG. 7A along the line indicated that is lower than for FIG. 7B, focusing on the elements associated with the lower portion of reactor shell 706.

With regard to FIG. 7A, a broken line is shown in the reactor shell. It is to be understood, however, that the apparatus will use a reactor shell that is, in fact, solid without a break.

In the embodiment of FIGS. 7A-C, a small feedstock conduit 702, that would provide an at least partially gaseous feedstock to the apparatus, is openly joined to the bottom of a semi-circular section of a torus 704. In this embodiment, small feedstock conduit 702 is designed to provide only a small amount of feedstock to the apparatus relative to the total that would be provided to the apparatus, and also serves as fluidization gas conduit to provide a gas (in this case, the feedstock itself) to fluidize the catalyst that may reside around the semi-circular section of torus 704 when the apparatus is in use. This particular embodiment may allow for a reduction in the cost of a utility that may otherwise typically be used as a fluidization gas, e.g., steam or nitrogen.

The portion of the semi-circular section of a torus 704 directly above and to the left of small feedstock conduit 702 is a portion of reactor shell 706 that forms the totality of a reaction zone 708, in which a reaction among the feedstock and a solid, particulate catalyst would take place. The portion of the semi-circular section of a torus 704 directly to the right of small feedstock conduit 702 is a catalyst inlet conduit 710, that would provide a solid, particulate catalyst to reaction zone 708 (in this embodiment, the particular part of reaction zone 708 defined by the portion of the semi-circular section of a torus 704 directly above and to the left of small feedstock conduit 702). Two main feedstock conduits 712, that would provide a liquid or gaseous feedstock to the apparatus, pass through an opening in reactor shell 706 and protrude into reaction zone 708.

The reaction zone 708 is composed of a first reaction stage 714 and a second reaction stage 716, distinguished in that the former has a larger AED than the latter, and provided to allow feedstock, product and other gasses that may flow through the reaction zone 708 to have an increasing gas superficial velocity as the extent of reaction increases. The reactor shell 706, and hence reaction zone 708 formed thereby, is comprised of 8 contiguous, openly joined geometries, starting from the bottom and working upwards: a one quarter section of a torus; a short, right cylinder; a right frustum of a cone with the base at the top (whose volume must be discounted by the protruding main feedstock conduits 712); a longer right cylinder; another right frustum of a cone with the base at the bottom; yet another, longer right cylinder; and two straight rectangular ducts and two curved rectangular ducts. The short, straight and rectangular duct configuration is another example of a "ram's head," discussed in detail previously.

A lowest feedstock inlet 718, through which feedstock would flow from small feedstock conduit 702 into first reaction stage 714, is defined as the open, cross-section surface, parallel to grade, formed at the open joint of small feedstock conduit 702 with reactor shell 706. In this embodiment, a catalyst inlet 720, through which a solid, particulate catalyst would flow from catalyst inlet conduit 710 into first reaction stage 714, is established as the open, minimum area, cross-section surface at the point where small feedstock conduit 702 and catalyst inlet conduit 710 join (in this instance, within the torus along a vertical plane perpendicular to the page). The point where small feedstock conduit 702 and catalyst inlet conduit 710 join is the first point the catalyst could be exposed to feedstock, and thus catalyst inlet 720 represents a portion of the boundary of first reaction stage 714.

FIG. 7A further shows a separation device 721 which is comprised of separation elements 722, 724, 726 and 728, catalyst exits 730 and 731, and product exits 732. The "ram's head" end of reactor shell 706 is in open communication with termination volume 726, formed by termination vessel shell 724. Located within termination volume 726 is a cylinder 722, open on both ends, surrounding the ram's head. In operation, the catalyst exiting the ram's head would strike the cylinder 722 at a tangent to its internal perimeter, and the combination of the ram's head configuration and cylinder 722 will act similarly to a cyclone separator, discussed previously. More conventional series cyclone separators 728 are provided as another separation element.

A first catalyst exit conduit 734, which would carry catalyst away from the separation device 721, is openly joined to a termination vessel shell 724. A first catalyst exit 730, through which a catalyst may flow out of the termination volume 726 and into first catalyst exit conduit 734, is formed as the open surface area at the junction of termination vessel shell 724 and catalyst exit conduit 734. A second catalyst exit conduit 735, which would carry catalyst away from the separation device 721, is openly joined to termination vessel shell 724. A second catalyst exit 731, through which a catalyst may flow out of the termination volume 726 and into second catalyst exit conduit 735, is formed as the open surface area at the junction of termination vessel shell 724 and second catalyst exit conduit 735.

Product exit conduits 736, through which would carry a reaction product and possibly unconverted feedstock away from separation device 721, are openly joined to the top of series cyclone separators 728. Product exits 732, through which a reaction product and possibly unreacted feedstock would flow out of series cyclone separators 728 and into product exit conduits 736, are formed as the open surfaces at the junction of series cyclone separators 728 and product exit conduits 736. Product exit conduits 736 are openly joined to a plenum 738. A plenum volume 740 is formed within the boundaries of plenum 738 as joined to the top of termination vessel shell 724. The plenum 738 and plenum volume 740 are provided to collect reaction product and possibly unreacted feedstock exiting product exit conduits 736, and direct that material to a common, secondary product exit conduit 742, provided to convey reaction product and possibly unreacted feedstock away from the apparatus.

A second material transit 744, through which a solid, particulate catalyst, a conversion product and possibly unreacted feedstock may flow out of second reaction stage 716 and into separation device 721, is determined as the open, cross-section surface formed at the open ends of the ram's head at the top of reactor shell 706 that is in open communication with termination vessel volume 726. The volume of reaction zone 708, which is the sum of the volumes of first reactions stage 714 and second reaction stage 716, is established by geometric calculations according to the prevalent dimensions moving along and within the walls of the apparatus between the lowest feedstock inlet 718 and the second material transits 744. It should noted that in determining the total volume of reaction zone 708, the volume within feedstock conduits 712 are omitted. This is because in operation, the flow of feedstock out of the feedstock conduits 712 will be of sufficient force to prevent catalyst from entering the volume within the feedstock conduits 712, and a reaction could not take place there.

The embodiment of FIGS. 7A-C further includes a catalyst circulation conduit 747, through which a solid, particulate catalyst may flow, that has a first end, first catalyst exit conduit 734, and a second end, catalyst inlet conduit 710. Catalyst circulation conduit 747 is provided to enable fluid communication between first catalyst exit 730 and catalyst inlet 720. In this embodiment, there are three other elements included in the path of catalyst that would travel from first catalyst exit 730 to catalyst inlet 720. The first is a first flow control device 748, provided to control the rate of flow of catalyst leaving termination volume 726 via catalyst exit 730 and entering first catalyst cooler 752. The second is a second flow control device 750, provided to control the rate of flow of catalyst leaving first catalyst cooler 752 and entering first reaction stage 714 via catalyst inlet 720. The third is a first catalyst cooler 752, provided to remove heat from catalyst that would travel from first catalyst exit 730 to catalyst inlet 720.

Also included in the embodiment of FIGS. 7A-C is an embodiment further including an optional, associated catalyst regeneration apparatus 754 in fluid communication with hydrocarbon reactor apparatus 700. The catalyst regeneration apparatus 754 comprises a catalyst stripper 756, a catalyst regenerator 758, and a second catalyst cooler 760.

A second catalyst exit conduit 735 shown in FIG. 7A further provides fluid communication of catalyst from separation device 721 via second catalyst exit 731 to a catalyst stripper 756. Second exit catalyst exit conduit 735 is openly joined to a place near the top of catalyst stripper 756, and has located in its length a first regenerator flow control device 762, provided to control the rate of flow of catalyst from separation device 721 to catalyst stripper 756. Catalyst stripper 756 is provided to remove at least a portion of volatile or entrained combustible materials from a catalyst in a stripping vapor stream that will exit through a conduit openly joined near the top of the catalyst stripper 756. That stripping vapor will be provided through a conduit openly joined near the bottom of catalyst stripper 756, and contact the catalyst that is passing downward, typically using mass transfer enhancing devices known to those skilled in the art, such as packing or trays. The catalyst will then exit the catalyst stripper 756 through a third catalyst conduit 764 openly joined near the bottom of the catalyst stripper 756. Third catalyst conduit 764 provides for fluid communication of catalyst from the catalyst stripper 756 to catalyst regenerator 758, and has located in its length a second regenerator flow control device 766, provided to control the rate of flow of catalyst from catalyst stripper 756 to catalyst regenerator 758.

The catalyst regenerator 758 is provided to restore reactive activity to a solid, particulate catalyst that may have been lost during a hydrocarbon conversion reaction in hydrocarbon conversion apparatus 700. Catalyst regenerator 758 is openly joined to a fourth catalyst conduit 768, to provide fluid communication of catalyst from catalyst regenerator 758 to a second catalyst cooler 760. Second catalyst cooler 760 is provided to remove heat from and reduce the temperature of catalyst from catalyst regenerator 758. A fifth catalyst conduit 770 provides fluid communication of cooled catalyst from catalyst cooler 760 back to catalyst regenerator 758, and has located in its length a third regenerator flow control device 772, provided to control the rate of flow of catalyst from catalyst cooler 760 to catalyst regenerator 758. Openly joined to fifth catalyst conduit 770 is a lift gas conduit 774, that provides a lift gas to transport catalyst up fifth catalyst conduit 770 and back into catalyst regenerator 758. A sixth catalyst conduit 776 splits off from fifth catalyst conduit 770 and is openly termination vessel 724. Sixth catalyst conduit 776 provides fluid communication of catalyst from catalyst cooler 760 to termination volume 726, and has located in its length a fourth regenerator flow control device 778, provided to control the rate of flow of catalyst from catalyst cooler 760 to termination volume 726. Openly joined to sixth catalyst conduit 776 is a lift gas conduit 780, that provides a lift gas to transport catalyst up sixth catalyst conduit 776 and into termination volume 726.

Figure 8:
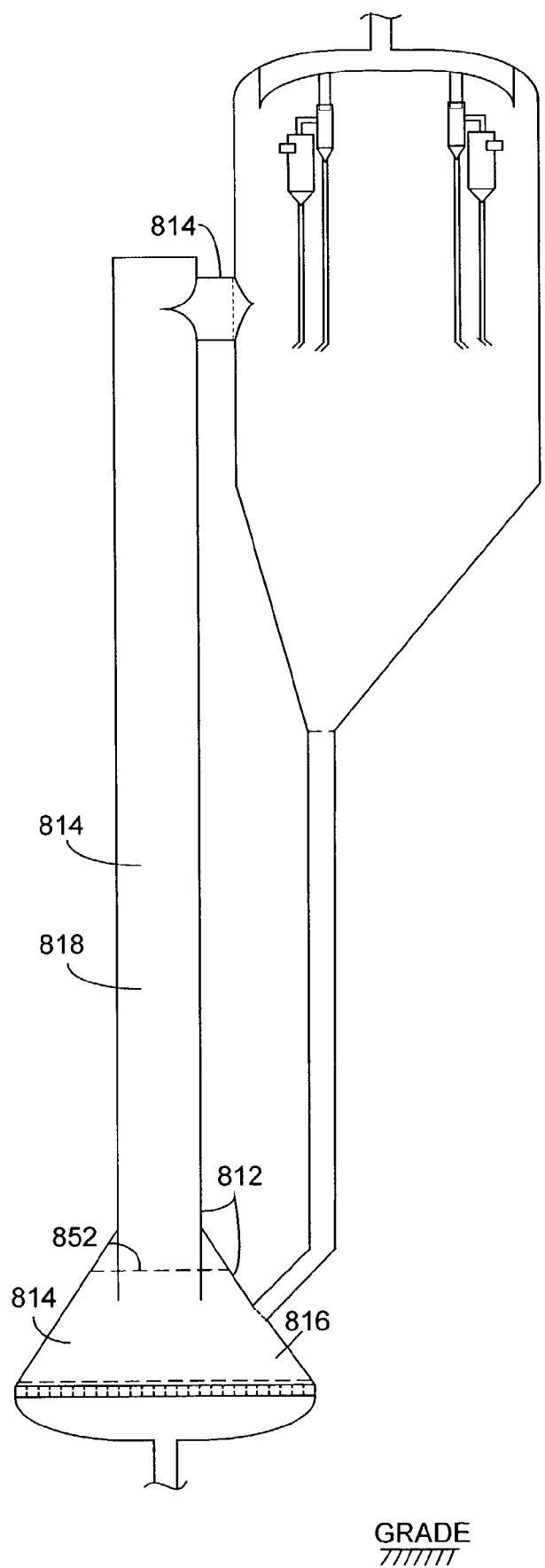
FIG. 8 shows a sectional elevation of a yet another embodiment of a hydrocarbon conversion apparatus of the present invention.

FIG. 8 shows another embodiment that is similar to that in FIG. 3A, except that a portion of a reactor shell 812 is extended downward into the frusto-conical section. However, the location of a first material transit 852, and the volumes, heights, lengths and AEDs of first reaction stage 816 and second reaction stage 818, which are included in reaction zone 814, are substantially the same as those shown in FIG.

3A. Contrasting the embodiment in FIG. 3A with that in FIG. 8, this demonstrates that more than one type of reactor shell configuration may provide identical geometries for various transits and identical numerical results for $L_2/AED_2$ and $AED_1/AED_2$.

Figure 9A:
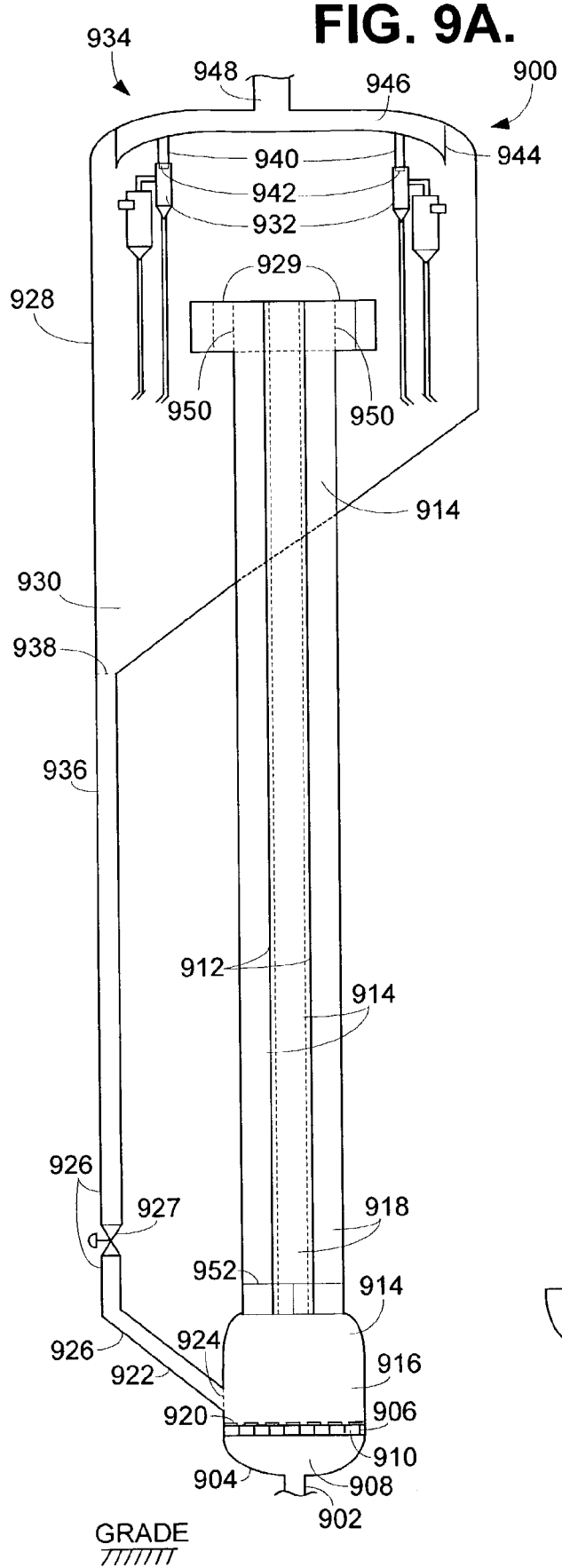
FIGS. 9A-D show a sectional elevation of a still another embodiment of a hydrocarbon conversion apparatus of the present invention, and three partial transverse sections of the apparatus along lines as indicated.
Figure 9B:
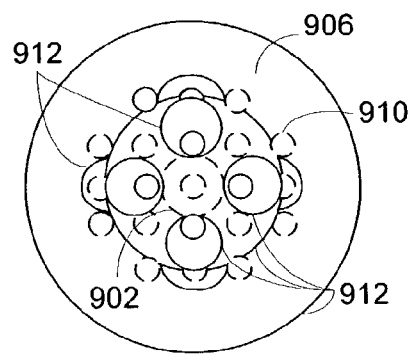
Figure 9C:
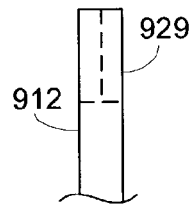
Figure 9D:
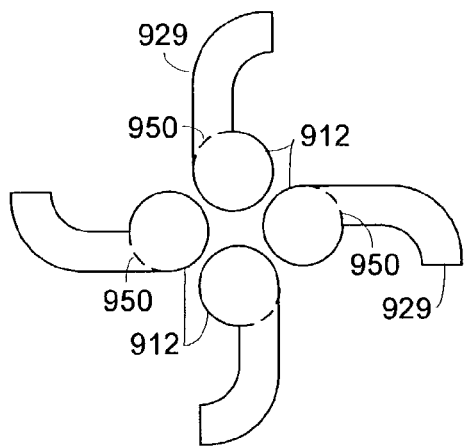

In FIGS. 9A-D, FIG. 9A presents a sectional elevation of a hydrocarbon conversion apparatus 900 of the present invention. FIG. 9B presents a partial transverse section of the apparatus, looking down on FIG. 9A along the line indicated, focusing on elements associated with reaction zone 914 and omitting separation device 934. FIG. 9C also presents a partial transverse section of the apparatus, looking down along FIG. 9A along the line indicated that is slightly higher than that for FIG. 9B, focusing of other features associated with reaction zone 914 as it is connected to a portion of separation device 934. FIG. 9D presents a partial transverse section of the apparatus, looking into FIG. 9A from the orthogonal right along the line indicated, focusing on features associated with reaction zone 914 and separation device 934.

A feedstock conduit 902, that would provide a gaseous or liquid feedstock to the apparatus, is openly joined to a base 904, on which the apparatus may in part rest. Base 904 and the bottom plane of feedstock distribution grid 906 form a receiver volume 908, in which feedstock will reside during operation of the apparatus. Feedstock distribution grid 906 is located within base 904, and contains many perforations 910 of a size significantly smaller than the grid 906. Those perforations 910 are formed by omissions of grid 906 material at various locations, and are provided to allow feedstock to pass from the feedstock receiver volume 908 through feedstock distribution grid 906. Feedstock distribution grid 906 provides an even amount of feedstock exiting each of the perforations 910 on the side opposite receiver volume 908.

Base 904 is openly joined to reactor shell 912 that forms the totality of a reaction zone 914, in which a reaction among the feedstock and a solid, particulate catalyst would take place. Reaction zone 914 is composed of a first reaction stage 916 and a second reaction stage 918, distinguished in that the former has a larger AED than the latter, and provided to allow feedstock, product and other gasses that may flow through the reaction zone 914 to have an increasing superficial gas velocity as the reaction proceeds to completion. The reactor shell 912 is comprised of multiple contiguous geometries in series and in parallel: a bottom vertical cylinder, a spherical sector and four parallel vertical cylinders. Near the bottom section of reactor shell 912, the top of the bottom cylinder and base of the spherical sector are openly joined. Also near the bottom section of reactor shell 912, the top face of the spherical sector and the bases of the four parallel cylinders are openly joined (except for the open joinings with the smaller cylinders, the top face of the spherical sector is solid to provide containment of the reaction zone 914).

A lowest feedstock inlet 920, through which feedstock would flow from the exits of the perforations 910 of feedstock distribution grid 906 into first reaction stage 916, is determined as the open, cross-section surface, parallel to grade, formed along the top surface of the feedstock distribution grid 906 (the very small separation in FIG. 9A between lowest feedstock inlet 920 and the top of feedstock distribution grid 906 is for illustrative purposes only). A catalyst inlet conduit 922, that would provide a solid, particulate catalyst to first reaction zone 916 of the apparatus, is openly joined to reactor shell 912, establishing catalyst inlet 924, through which a solid, particulate catalyst would flow from the catalyst inlet conduit 922 into first reaction stage 916, as a portion of the boundary of first reaction stage 916.

FIG. 9A further shows a separation device 934 which is comprised of separation elements 928, 929, 930 and 932, catalyst exit 938 and product exits 942. The ends of each the four parallel cylinders near the top of reactor shell 912 are openly joined to open, curved rectangular ducts 929. Open, curved rectangular ducts 929 are a variation of the "ram's head" discussed earlier, but because one side of the ducts are open (the bottom), it provides a way for gas to separate from solids and is considered a separation element rather than a portion of the reactor shell (as was the case in earlier descriptions of a rams head). The open, curved rectangular ducts 929 extend into termination volume 930, formed by termination vessel shell 928; they are also provided as a separation element. Located within termination volume 930 are more separation elements, two series cyclone separators 932. A catalyst exit conduit 936, which would carry catalyst away from the separation device 934, is openly joined to termination vessel shell 928. A catalyst exit 938, through which catalyst may flow out of the termination volume 930 and into catalyst exit conduit 936, is formed as the open surface area at the junction of termination vessel shell 928 and catalyst exit conduit 936. Further, product exit conduits 940, which would carry reaction product and possibly unreacted feedstock away from the separation device 934, are openly joined to the top of series cyclone separators 932. Product exits 942, through which reaction product and possibly unreacted feedstock would flow out of series cyclone separators 932 and into product exit conduits 940, are formed as the open surfaces at the junction of series cyclone separators 932 and product exit conduits 940.

A catalyst circulation conduit 926, through which a catalyst may flow, has a first end, catalyst exit conduit 936, joined to a catalyst exit 938 and a second end, catalyst inlet conduit 922, joined to a catalyst inlet 924. Catalyst circulation conduit 926 is provided to enable fluid communication between a catalyst exit 938 and first reaction stage 916. In this embodiment, catalyst circulation conduit 926 has located within it a flow control device 927, that would provide for control of catalyst flow from separation device 934 to catalyst inlet 924.

Product exit conduits 940 are openly joined to a plenum 944. A plenum volume 946 is formed within the boundaries of plenum 944 as joined to the top of termination vessel shell 928. The plenum 946 and plenum volume 946 are provided to collect reaction product and possibly unreacted feedstock exiting product exit conduits 940, and direct that material to a common, secondary product exit conduit 948, used to convey reaction product and possibly unreacted feedstock away from the apparatus.

Four second material transits 950, through which a solid, particulate catalyst, a conversion product and possibly unreacted feedstock may flow out of second reaction stage 918 and into separation device 934, are established as the open, cross-section surface formed at the ends of each of the four cylinders near the top of reactor shell 912 that are in open communication with termination vessel volume 930. The volume of reaction zone 914, which is the sum of the volumes of first reaction stage 916 and second reaction stage 918, is established by geometric calculations according to the prevalent dimensions moving along and within the walls of the apparatus between the lowest feedstock inlet 920 to the second material transits 950.

The embodiment presented in FIGS. 9A-D demonstrates that one embodiment of the invention includes a given reaction stage comprised of numerous discrete elements. The volume of such an embodiment is determined by simply combining the volume of each discrete element.

The parts and elements of an apparatus of the present invention may be constructed of a wide variety of materials, including metals, alloys of metals and refractory materials. Metals may include various types of steel, including carbon and numerous types of stainless steel, and more exotic alloys such as Hastelloy, Nimonic and Inconel, among others well known to those skilled in the art. Refractory materials include such items as clay or silica bricks, among others also well known to the skilled artisan. Also, a shell or conduit of the present invention may be constructed of a metal exterior, lined interiorly with a refractory material in a configuration regularly used in fluidized bed reactor applications, and any element or part may be further surrounded by insulation materials common throughout the petroleum and chemical process industries. Regardless, for an apparatus of the present invention, it is the interior surface of such shells (which may be of single or composite materials or layers) that form the basis for the determination of the various volumes, stages and zones defined by such shells, pursuant to the definitions provided herein.

One aspect of the present invention is directed to a method of conducting a hydrocarbon conversion reaction. It will be appreciated by one of skill in the art that any embodiment of an apparatus of the present invention will, in conducting a hydrocarbon conversion reaction, generally function similarly to any of the embodiments disclosed herein.

One example of the method of this invention is presented with regard to the apparatus shown in FIGS. 7A-C. The apparatus 700 is filled with an appropriate amount of solid, particulate catalyst suitable to conduct the desired hydrocarbon conversion reaction. The solid, particulate catalyst should be a fluidizable particulate, generally characterized in size as Geldart A or B, although other sizes may function. At least a portion of the solid, particulate catalyst will be in first reaction stage 714. To initiate the hydrocarbon conversion reaction and fluidize the solid, particulate catalyst within first reaction stage 714, a feedstock that is at least partially vapor is introduced via small feedstock conduit 702 through lowest feedstock inlet 718, and via main feedstock conduits 712. In one mode of operation, similar volumes and qualities of feedstock are introduced to each of the main feedstock conduits to promote hydrodynamic symmetry within the first reaction stage 714. Introducing similar volumes and qualities of feedstock to more than one feedstock inlet serving to form or share formation of the lowest feedstock inlet is one embodiment of a method of the present invention. By "similar" is meant a difference of no more than about 10% in moles per hour for volume, and a difference of no more than about 10% in vapor content for quality. Conditions, such as temperature, pressure and WHSV, within reaction zone 708 are those effective to convert the selected feedstock to desired products using the selected solid, particulate catalyst.

One aspect of a method of the present invention calls for introducing all of the feedstock into the first reaction stage. Other aspects call for introducing at least about 90 wt. %, or at least about 80 wt. %, or at least about 75 wt. % of all the feedstock into the first reaction stage. Another manifestation includes introducing all of the feedstock through the lowest feedstock inlet. Other manifestations include introducing at least about 90 wt. %, or at least about 80 wt. %, or at least about 75 wt. % of all of the feedstock introduced through the lowest feedstock inlet. These manifestations involving the lowest feedstock inlet are best performed in an embodiment other than that shown in FIG. 7A, where introducing all the feedstock through the small feedstock conduit 702 may disrupt the flow of solid, particulate catalyst through catalyst inlet 720.

Once the solid, particulate catalyst has reached an acceptable fluidized state within first reaction stage 714, the flowing vapors will transport a first stream including a first remaining hydrocarbon feedstock (an unreacted portion of the feedstock provided to the first reaction stage), solid, particulate catalyst, and a first hydrocarbon conversion product (as a result of the conversion of a portion of the feedstock provided to the first reaction stage), away from the lowest feedstock and through the first material transit 746 into second reaction stage 716.

In second reaction stage 716, the hydrocarbon conversion reaction continues. The flowing vapors will transport a second stream including a second hydrocarbon conversion product (as a result of the conversion of at least a portion of the feedstock provided to the second reaction stage, whether from the first reaction stage or another feedstock inlet), solid, particulate catalyst, and optionally a second remaining hydrocarbon feedstock (an unreacted portion of the feedstock provided to the second reaction stage), away from the first material transit 746, through second material transits 744 and into separation device 721.

The gas superficial velocity will increase with increasing extent of conversion of the feedstock as the flowing vapors move through reaction zone 708 towards the second material transits, due to the section of the reactor shell 706 (forming reaction zone 708) that is an iris diaphragm tapering element of a right frustum of a cone of about 10 degrees. The increase in gas superficial velocity as the feedstock, reaction product and solid, particulate catalyst move through the first reaction stage 714, past first material transit 746 and through second reaction stage 716 to second material transits 744 serves to impart a closer approach to plug flow behavior as the extent of reaction increases.

In an embodiment of a method of the present invention, the first reaction stage has a higher average gas superficial velocity than that of the second reaction stage. In this embodiment, while the gas superficial velocity may be different at all points in the reaction zone, especially if the hydrocarbon conversion reaction has a stoichiometry where the moles of products are different than the moles of reactants, or there are numerous changes in the geometry of the reaction zone, the average gas superficial velocity in the second reaction stage will be higher than the average gas superficial velocity in the first reaction stage. As defined herein, the average gas superficial velocity of a given reaction stage is the volumetric flow rate of feedstock, and diluent, if any, provided to the entire reaction zone, divided by the average equivalent cross sectional area of the given reaction stage. The volumetric flow rate of feedstock, and diluent, if any, should be determined using the combined (rate averaged) composition of all feedstock, and diluent, if any, provided to the entire reaction zone, and a temperature and pressure found within the reaction zone while conducting a hydrocarbon conversion reaction, assuming all of the feedstock and diluent to be gaseous. If there are numerous values of temperature and pressure within the reaction zone, e.g., calculations or measurements are undertaken to provide more detailed information at multiple points within the reaction zone while conducting a hydrocarbon conversion reaction, use the single highest temperature and single lowest pressure among those values.

Further, as used herein, a gas superficial velocity is determined at any specific point in the reaction zone according to the actual volumetric flow rate of feedstock, products, and diluent, if any, divided by the cross-sectional area for net flow, at that specific point in the reaction zone. The actual volumetric flow rate of feedstock, products, and diluent, if any is determined at the prevailing temperature, pressure, composition and state at that specific point. While methods to determine the gas superficial velocity at any point in a reactor are well known, average gas superficial velocity as defined herein is typically a more straightforward value to determine in designing a hydrocarbon conversion apparatus of the present invention and using it to conduct a hydrocarbon conversion reaction.

In one embodiment of the invention, the first reaction stage is operated so as to have an average gas superficial velocity of at least about 0.5 meters per second. At this value, the vapors flowing through the first reaction stage may provide a more stable, entrained flow of solid, particulate catalyst through the first material transit; the stability and rate of entrained solid, particulate catalyst may increase as the average gas superficial velocity is increased. In other embodiments, the first reaction stage has an average gas superficial velocity of at least about 0.6 meters per second, or at least about 0.8 meters per second.

In another embodiment of the invention, vapor and catalyst flow through the first reaction stage at an average gas superficial velocity greater than about 1.0 meter per second, or at least about 1.5 meters per second, or at least about 2.0 meters per second, or at least about 3.0 meters per second, or at least about 4.0 meters per second, or at least about 4.5 meters per second, or at least about 5.0 meters per second, or at least about 7.0 meters per second. In another embodiment of a method of the present invention, the average gas superficial velocity of the first reaction stage is no greater than about 10.0 meters per second. Above this value, the first reaction stage may have less than desirable hydrodynamic flow characteristics. In yet other embodiments, the first reaction stage has an average gas superficial velocity of no greater than about 2.0 meters per second, or no greater than about 3.0 meters per second, or no greater than about 5.0 meters per second, or no greater than about 7.0 meters per second, or no greater than about 9.0 meters per second. In still other embodiments, the first reaction stage has an average gas superficial velocity of any logical range selected from the following: at least about 0.5 meters per second, at least about 0.6 meters per second, or at least about 0.8 meters per second, or at least about 1.0 meters per second, or at least about 1.5 meters per second, or at least about 2.0 meters per second, or at least about 3.0 meters per second, or at least about 4.0 meters per second, or at least about 4.5 meters per second, or at least about 5.0 meters per second, or at least about 7.0 meters per second, and; no greater than about 1.0 meters per second, or no greater than about 2.0 meters per second, or no greater than about 3.0 meters per second, or no greater than about 5.0 meters per second, or no greater than about 7.0 meters per second, or no greater than about 9.0 meters per second, or no greater than about 10.0 meters per second.

Another aspect of a method of the present invention maintains that the second reaction stage has an average gas superficial velocity of at least about 1.0 meters per second. At this value, the vapors flowing through the second reaction stage may provide a closer approach to plug flow behavior, particularly above certain second reaction stage AED, for example, at or above about 0.9 meters; the approach may increase as the average gas superficial velocity is increased.

Other aspects maintain that the second reaction stage has an average gas superficial velocity of at least about 2.0 meters per second, or at least about 3.0 meters per second, or at least about 4.0 meters per second, or at least about 4.5 meters per second, or at least about 5.0 meters per second, or at least about 7.0 meters per second, or at least about 9.0 meters per second. Another aspect maintains that the second reaction stage has an average gas superficial velocity of no greater than about 25.0 meters per second. Above this value, the amount of solid, particulate catalyst in the second reaction stage may become very low, necessitating undesirably large volumes or other dimensions of the second reaction stage; the amount of solid, particulate catalyst may increase with decreasing average gas superficial velocity. Yet other aspects maintain that the second reaction stage has an average gas superficial velocity of no greater than about 22.0, or no greater than about 20.0 meters per second, or no greater than about 17.0 meters per second, or no greater than about 15.0 meters per second, or no greater than about 12.0 meters per second. Still other aspects maintain that the second reaction stage has an average gas superficial velocity of any logical range selected from the following: at least about 1.0 meters per second, at least about 1.5 meters per second, or at least about 2.0 meters per second, or at least about 3.0 meters per second, or at least about 4.0 meters per second, or at least about 4.5 meters per second, or at least about 5.0 meters per second, or at least about 7.0 meters per second, or at least about 9.0 meters per second, and; no greater than about 25.0, no greater than about 22.0, or no greater than about 20.0 meters per second, or no greater than about 17.0 meters per second, or no greater than about 15.0 meters per second, or no greater than about 12.0 meters per second.

As defined herein, the first hydrocarbon feedstock conversion (or extent of conversion) of the first reaction stage is the weight of feedstock provided to the first reaction stage via a feedstock inlet or inlets, minus the weight of feedstock flowing through the first material transit (or first remaining hydrocarbon feedstock), with that difference divided by the weight of feedstock provided to the first reaction stage via a feedstock inlet or inlets. Further, as defined herein, the second hydrocarbon feedstock conversion of the second reaction stage is the weight of feedstock provided to both the first and the second reaction stages via a feedstock inlet or inlets, minus the weight of feedstock flowing through the second material transit (or second remaining hydrocarbon feedstock), with that difference divided by the weight of feedstock provided to both the first and the second reaction stage via a feedstock inlet or inlets. Note that feedstock provided to the second reaction stage through the first material transit is not included in the determination of the second hydrocarbon feedstock conversion. The maximum extent of conversion is thus 1.000, if expressed as a fraction, or 100.0 percent. Determination of the extent of conversion at a particular point in a reaction stage is well known to those skilled in the art from calculations, given knowledge of geometry, reaction type and operating conditions, or utilizing the procurement and analysis of a sample during operation, and is not discussed further here.

In one embodiment of a method of the present invention, the second hydrocarbon feedstock conversion is higher than the first hydrocarbon feedstock conversion. In other embodiments, the second hydrocarbon feedstock conversion is at least about 1.0%, or at least about 2.0%, or at least about 5.0%, or at least about 10.0%, or at least about 15.0%, or at least about 20.0%, or at least about 25.0% higher than the first hydrocarbon feedstock conversion.

In alternative aspects of a method of the present invention, the second hydrocarbon feedstock conversion is higher than the first hydrocarbon feedstock conversion, and the first hydrocarbon feedstock conversion is no greater than about 98.0%, or no greater than about 95.0%, or no greater than about 90.0%, or no greater than about 80.0%, or no greater than about 70.0%, or no greater than about 60.0%. In different aspects, the second hydrocarbon feedstock conversion is higher than the first hydrocarbon feedstock conversion, and the first hydrocarbon feedstock conversion is at least about 20.0%, or at least about 25.0%, or at least about 30.0%, or at least about 35.0%, or at least about 40.0%, or at least about 50.0%, or at least about 65.0%, or at least about 80.0%. In still other aspects, the second hydrocarbon feedstock conversion is higher than the first hydrocarbon feedstock conversion, and the first hydrocarbon feedstock conversion is any logical range selected from the following: at least about 20.0%, or at least about 25.0%, or at least about 30.0%, or at least about 35.0%, or at least about 40.0%, or at least about 50.0%, or at least about 65.0%, or at least about 80.0%, and; no greater than about 98.0%, or no greater than about 95.0%, or no greater than about 90.0%, or no greater than about 80.0%, or no greater than about 70.0%, or no greater than about 60.0%.

Other manifestations of a method of the present invention maintain that the second hydrocarbon feedstock conversion is both higher than the first hydrocarbon feedstock conversion and is at least about 50.0%, or at least about 60.0%, or at least about 70.0%, or at least about 80.0%, or at least about 90.0%. Yet other manifestations maintain that the second hydrocarbon feedstock conversion is both higher than the first hydrocarbon feedstock conversion and is no greater than about 99.5%, or no greater than about 99.0%, or no greater than about 95.0%, or no greater than about 90.0%. Still other manifestations maintain that the second hydrocarbon feedstock conversion is both higher than the first hydrocarbon feedstock conversion and is any logical range selected from the following: at least about 50.0%, or at least about 60.0%, or at least about 70.0%, or at least about 80.0%, or at least about 90.0%, and; no greater than about 99.5%, or no greater than about 99.0%, or no greater than about 95.0%, or no greater than about 90.0%.

Conducting the hydrocarbon conversion reaction within these conversion ranges is particularly effective with increasing proportions of feedstock to the first reaction stage, or more specifically the lowest feedstock inlet, relative to the second reaction stage. Selection of the conversion for a given reaction stage is a function of the particular reaction system, and the desired objective for the combined reaction system and/or apparatus, for example, maximum conversion, maximum selectivity to desired products, minimum reaction zone volume, minimum catalyst inventory in the reaction zone or a given reaction stage, etc., or combinations and specific optimizations thereof. Designing a hydrocarbon conversion apparatus of the present invention with these features provides the best performance in converting the feedstock at a selected lower extent of conversion in the first reaction stage, and the best conditions for converting the first remaining feedstock in the second reaction stage.

Returning to the discussion of the method of the present invention conducted in the apparatus shown in FIGS. 7A-C, the second stream exits second reaction stage 716 through second material transits 744 into separation device 721, whose elements and function have been described in detail previously herein, and which will not be repeated here. The reaction product and unreacted feedstock, if any, will exit the separation device 721 via secondary product exit conduit 742. The majority of the solid, particulate catalyst will fall to the bottom section of termination volume 726, which should contain an inventory of solid, particulate catalyst.

At least a portion of the solid, particulate catalyst in the bottom section of termination volume 726 will fall via gravity through first catalyst exit 730, first catalyst exit conduit 734, and the higher portion of catalyst circulation conduit 747 into first catalyst cooler 752. If desired, the flow of solid, particulate catalyst out of termination volume 726 and into catalyst cooler 752 may be controlled by first flow control device 748. Catalyst cooler 752 would reduce the temperature of the solid, particulate catalyst by indirect heat exchange with a cooling fluid. In one embodiment, the solid, particulate catalyst passes through the shell side of a catalyst cooler 752, and the cooling fluid is at least partially liquid water which is transformed into steam on the tube side. The cooled solid, particulate catalyst leaves catalyst cooler 752 and proceeds via gravity through the balance of catalyst circulation conduit 747 to catalyst inlet conduit 702. If desired, the flow of solid, particulate catalyst out of catalyst cooler 752 may be controlled by second flow control device 750. Solid, particulate catalyst flows through catalyst inlet conduit 710 and through catalyst inlet 720 into first reaction stage 714 to complete a catalyst circulation loop.

At various points along lower surfaces of termination vessel 724, the entire length of catalyst circulation conduit 747 and on first catalyst cooler 752, there may be openly joined any number of fluidization conduits (not shown) which provide for an injection of a fluidization gas to enable flow of the solid, particulate catalyst. This may be especially important in the lower portions of catalyst circulation conduit 747, where the pressure may be significantly increased due to the static head of the solid, particulate catalyst in the termination volume 726 and circulation conduit 746, and thus additional fluidization gas is required reduce local density and prevent the solid, particulate catalyst from packing too tightly to flow properly.

If desired, at least a portion of the solid, particulate catalyst can be processed through the catalyst regeneration apparatus 754. At least a portion of the solid, particulate catalyst in the bottom section of termination volume 726 will flow via gravity through second catalyst exit 731 and second catalyst exit conduit 735 into catalyst stripper 756. If desired, the flow of solid, particulate catalyst out of the termination volume 726 and into catalyst stripper 756 may be be controlled by the use of first regenerator flow control device 762. The operation of the catalyst stripper 756 has been described previously herein, and is not recounted here. The stripped solid, particulate catalyst from catalyst stripper 756 will flow down via gravity through third catalyst conduit 764 into catalyst regenerator 758, and its flow may be controlled using second regenerator flow control device 766.

The solid, particulate catalyst inside catalyst regenerator 758 will be exposed to a regeneration medium introduced through a conduit openly joined near the bottom of catalyst regenerator 758, which passes into a receiving volume and through a vapor distribution grid to contact the solid, particulate catalyst. The nature of the regeneration medium and exposure conditions may vary widely in providing for the solid, particulate catalyst to regain at least a portion of reaction activity that may have been lost while conducting a hydrocarbon conversion reaction using hydrocarbon conversion apparatus 700. The flow of regeneration medium and regeneration products, if any, will carry some solid, particulate catalyst up within the catalyst regenerator 758 into a set of regenerator series cyclone separators, which act in essentially the same manner as that described for the hydrocarbon conversion apparatus 700. The regeneration medium and regeneration products, if any, flow out of catalyst regenerator 758 via a conduit openly joined near the top of catalyst regenerator 758. In one embodiment, the regeneration medium is air used to remove carbonaceous deposits from the solid, particulate catalyst via a combustion reaction, thereby restoring catalytic activity and generating a regeneration product comprising carbon dioxide and water.

Regenerated solid, particulate catalyst from catalyst regenerator 758 flows via gravity through fourth catalyst conduit 768 into second catalyst cooler 760. The operation of second catalyst cooler 760 is similar to that of catalyst coolers described earlier herein, and is not recited here. Cooled, regenerated solid, particulate catalyst from second catalyst cooler 760 flows via gravity into fifth catalyst conduit 770 openly joined to a place near the bottom of second catalyst cooler 760, and flows through fifth catalyst conduit 770 back into catalyst regenerator 758. A transport or lift gas is provided to fifth catalyst conduit 770 via openly joined lift gas conduit 774 below third regenerator flow control device 772 to facilitate transport of the solid, particulate catalyst through that conduit against the force of gravity to catalyst regenerator 758. Sufficient inventory and density of solid, particulate catalyst is established within fifth catalyst conduit 770 above third regenerator flow control device 772 to ensure solid, particulate catalyst does not flow back into catalyst cooler 760 through that conduit.

At least a portion of the cooled, regenerated solid, particulate catalyst flowing through fifth catalyst conduit 770 is directed into sixth catalyst conduit conduit 776, the rate of which may be controlled through the use of fourth regenerator flow control device 778. A transport or lift gas is provided to sixth catalyst conduit 776 via openly joined lift gas conduit 780 below fourth regenerator flow control device 778 to facilitate transport of the solid, particulate catalyst through that conduit against the force of gravity to hydrocarbon conversion apparatus 700, thus completing the circulation loop of solid, particulate catalyst through the regenerator apparatus 754. (Again, sufficient inventory and density of solid, particulate catalyst is established within sixth catalyst conduit 776 above fourth regenerator flow control device 778 to ensure solid, particulate catalyst does not flow back into catalyst cooler 760 through that conduit). Specifically, sixth catalyst conduit 776 is openly joined to termination vessel 724, and the cooled, regenerated solid, particulate catalyst flowing through that conduit is provided to termination volume 726. At least a portion of the cooled, regenerated solid, particulate catalyst flowing into termination volume 726 will flow out through first catalyst exit 730 on its way to first reaction stage 714.

Useful fluidization and lift gasses include, but are not limited to, inert gasses, nitrogen, steam, carbon dioxide, inert hydrocarbons, air, or mixtures thereof. The choice of fluidization or lift gas depends upon the type of conversion reaction being conducted in the hydrocarbon conversion apparatus 700, or type of regeneration procedure being performed in regenerator apparatus 754, depending on where the catalyst is being fluidized or to where it is being lifted. Desirably, the fluidization or lift gas used with the hydrocarbon conversion apparatus 700 is unreactive (i.e., is inert, or is a diluent) in the reaction being conducted. A fluidization or lift gas introduced to a reaction stage of the present invention is to be considered in calculations involving the flow of vapors through the reaction stage, for example, in determining average gas superficial velocity, or for determining partial pressures of various materials.

The present invention is useful to conduct most any hydrocarbon conversion process in which a solid, particulate catalyst is employed to convert a hydrocarbon feedstock to desired products. The invention is particularly effective for hydrocarbon conversion reactions including, for example, olefin interconversion reactions, oxygenate to olefin conversion reactions, oxygenate to gasoline conversion reactions, the cracking of heavy petroleum hydrocarbon fractions to lighter ones (historically termed "Fluid Catalyst Cracking," or "FCC"), vapor phase catalytic oxidation of butane to maleic anhydride, vapor phase methanol synthesis, pthalic anhydride manufacture, Fischer-Tropsch reactions, vapor phase catalytic oxidation of propylene to acrylic acid, and acrylonitrile manufacture. These reactions tend to be sensitive to secondary reactions at high extents of conversion and benefit from PFR behavior at higher extents of conversion. Typical hydrocarbon feedstocks to be converted in those reactions include olefinic hydrocarbons, aliphatic hydrocarbons, aromatic hydrocarbons, oxygenated hydrocarbons, various refinery streams such as gas oil or naphtha, synthesis gas (e.g., mixtures comprising carbon monoxide and hydrogen), and mixtures thereof.

In one embodiment of conducting a hydrocarbon conversion reaction, the solid particulate comprises an active catalytic component. In another embodiment, the solid particulate catalyst comprises an active catalytic component and a formulation matrix material. In yet another embodiment, the solid particulate catalyst comprises an active catalytic component, a formulation matrix material and a facilitating material. As used herein, a facilitating material is one that does not directly facilitate conversion of a hydrocarbon to desired products, but will facilitate another desirable aspect of the present invention.

Typical active catalytic components present in the solid particulate catalyst suitable to facilitate conversion of the hydrocarbon feedstock to desired products include metals, metal oxides, zeolite molecular sieves and non-zeolitic molecular sieves, and mixtures thereof.

Examples of metal and metal oxide active catalytic components include vanadium, molybdenum, strontium, tungsten, copper, iron, cobalt, ruthenium, and palladium, and oxides thereof, such as vanadium pentoxide, and mixtures thereof. In some cases, a metal or metal oxide is not an active catalytic component but is rather a facilitating material. For example, the active catalytic component for converting a hydrocarbon to desired products may be a molecular sieve, as discussed below, but the solid particulate catalyst may comprise a particular metal, e.g., platinum or palladium, that does not facilitate the hydrocarbon conversion reaction, but rather is advantageous in promoting combustion of carbonaceous materials that are present on the solid particulate catalyst in a regeneration apparatus.

Molecular sieve active catalytic components include natural, mineral or synthetic, chemically formed crystalline materials comprising silica, or silica and alumina, or alumina and phosphorous, or silica and alumina and phosphorous. Currently, the most used molecular sieve active catalyst components in the petroleum and petrochemical industries are known as zeolites. A zeolite is an aluminosilicate having an open framework structure that usually carries negative charges. This negative charge within portions of the framework is a result of an $Al^{3+}$ replacing a $Si^{4+}$. Cations counterbalance these negative charges preserving the electroneutrality of the framework, and these cations are exchangeable with other cations and/or protons. A zeolite is typically formed from corner sharing the oxygen atoms of $[SiO_4]$ and $[AlO_4]$ tetrahedra or octahedra. Zeolites in general have a one-, two- or three-dimensional crystalline pore structure having uniformly sized pores of molecular dimensions that selectively adsorb molecules that can enter the pores, and exclude those molecules that are too large. The pore size, pore shape, interstitial spacing or channels, composition, crystal morphology and structure are a few characteristics of molecular sieves that determine their use in various hydrocarbon adsorption and conversion processes.

There are many different types of naturally occurring, mineral zeolites well known to convert a hydrocarbon feedstock into desired products that are suitable for use in the present invention, including faujasite, mordenite, clinoptilote, chabazite, erionite and offretite.

There are also many different types of synthetic, chemically formed zeolites well known to convert a hydrocarbon feedstock into desired products that are suitable for use in the present invention. For example, synthesis of ZSM-5 is described in U.S. Pat. No. 3,702,886, synthesis of ZSM-11 is described in U.S. Pat. No. 3,700,979, synthesis of ZSM-23 is described in U.S. Pat. No. 4,076,842, and synthesis of SSZ-13 is described in U.S. Pat. No. 4,544,538. The patents disclosed in this paragraph are incorporated herein by reference. Zeolites are typically synthesized by mixing sources of alumina and silica in a strongly basic aqueous media, often in the presence of a structure directing templating agent. The structure of the molecular sieve formed is determined in part by solubility of the various sources, silica-to-alumina ratio, nature of the cation, synthesis temperature, order of addition, type of templating agent, and the like.

The use of ZSM-5 to convert methanol into olefin(s) is described in U.S. Pat. No. 5,367,100, and the use of naturally occurring zeolites and other synthetic ZSM-type catalysts in converting gas oil to lower molecular weight products is described in U.S. Pat. No. 4,859,313. The patents disclosed in this paragraph are incorporated herein by reference.

Another type of active catalytic component is a silicoaluminophosphate (SAPO) molecular sieve, traditionally called a non-zeolitic molecular sieve. The SAPO molecular sieve comprises a three-dimensional microporous crystal framework structure of [$SiO_2$], [$AlO_2$] and [$PO_2$] corner sharing tetrahedral units. The way Si is incorporated into the structure can be determined by $^{29}Si$ MAS NMR. See Blackwell and Patton, J. Phys. Chem., 92, 3965 (1988). The desired SAPO molecular sieves will exhibit one or more peaks in the $^{29}Si$ MAS NMR, with a chemical shift $\delta(Si)$ in the range of –88 to –96 ppm and with a combined peak area in that range of at least 20% of the total peak area of all peaks with a chemical shift $\delta(Si)$ in the range of –88 ppm to –115 ppm, where the $\delta(Si)$ chemical shifts refer to external tetramethylsilane (TMS).

In general, silicoaluminophosphate molecular sieves comprise a molecular framework of corner-sharing [$SiO_2$], [$AlO_2$], and [$PO_2$] tetrahedral units. Silicoaluminophosphate molecular sieves are generally classified as being microporous materials having 8, 10, or 12 membered ring structures. These ring structures can have an average pore size ranging from about 3.5-15 angstroms.

Suitable silicoaluminophosphate molecular sieves include SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, the metal containing forms thereof, and mixtures thereof. Preferred are SAPO-18, SAPO-34, SAPO-35, SAPO-44, and SAPO-47, particularly SAPO-18 and SAPO-34, including the metal containing forms thereof, and mixtures thereof. As used herein, the term mixture is synonymous with combination and is considered a composition of matter having two or more components in varying proportions, regardless of their physical state.

Yet another type of active catalytic component is a substituted SAPO molecular sieve, also traditionally considered a non-zeolitic molecular sieve. These compounds are generally known as MeAPSOs or metal-containing silicoaluminophosphates. The metal can be alkali metal ions (Group IA), alkaline earth metal ions (Group IIA), rare earth ions (Group IIIB, including the lanthanide elements: lanthanum, cerium, praseodymium, neodymium, samarium, europium, gadolinium, terbium, dysprosium, holmium, erbium, thulium, ytterbium and lutetium; and scandium or yttrium) and the additional transition cations of Groups IVB, VB, VIB, VIIB, VIIIB, and IB.

Preferably, the Me represents atoms such as Zn, Mg, Mn, Co, Ni, Ga, Fe, Ti, Zr, Ge, Sn, and Cr. These atoms can be inserted into the tetrahedral framework through a [$MeO_2$] tetrahedral unit. The [$MeO_2$] tetrahedral unit carries a net electric charge depending on the valence state of the metal substituent. When the metal component has a valence state of +2, +3, +4, +5, or +6, the net electric charge is between –2 and +2. Incorporation of the metal component is typically accomplished adding the metal component during synthesis of the molecular sieve. However, post-synthesis ion exchange can also be used.

Still another type of active catalytic component is a metal aluminophosphate, or "MeAPO," molecular sieve, again conventionally termed a non-zeolitic molecular sieve. A MeAPO is a class of framework-substituted crystalline microporous aluminophosphates having a structure of $MeO_2^{-2}$, $AlO_2^{-2}$ and $PO_2^+$ tetrahedral units, where Me represents the desired metal. Examples of metals and corresponding MeAPO forms include iron (FeAPO), zinc (ZAPO), cobalt (CoAPO), and germanium (GeAPO).

In one embodiment, an aluminophosphate (ALPO) molecular sieve can also be included in the solid, particulate catalyst useful in the present invention. Aluminophosphate molecular sieves are crystalline microporous oxides which can have an $AlPO_4$ framework, and are considered non-zeolitic molecular sieves, typically having pore dimensions ranging from about 3 angstroms to about 10 angstroms. Some ALPO molecular sieves have catalytic activity for certain hydrocarbon conversion reactions and are active catalytic materials. However, some ALPO molecular sieves are not catalytically active components to any significant extent, but are capable of making size selective separations of molecular species, and hence are considered a facilitating material. More than two dozen structure types have been reported, including zeolite topological analogues. Preferred ALPO structures are ALPO-5, ALPO-11, ALPO-18, ALPO-31, ALPO-34, ALPO-36, ALPO-37, and ALPO-46.

The ALPO, MeAPO, MeAPSO and SAPO molecular sieves noted herein are synthesized by hydrothermal crystallization methods generally known in the art. See, for example, U.S. Pat. Nos. 4,310,440; 4,440,871; 4,567,029; 4,861,743; 4,888,167; 5,096,684; and 5,126,308, which are fully incorporated herein by reference. A reaction mixture is formed by mixing together reactive silicon, aluminum and phosphorus components, along with at least one structure directing template. Generally the mixture is sealed and heated, preferably under autogenous pressure, to a temperature of at least 100° C., preferably from 100-250° C., until a crystalline product is formed. Formation of the crystalline product can take anywhere from around 2 hours to as much as 2 weeks. In some cases, stirring or seeding with crystalline material will facilitate the formation of the product. Typically, the molecular sieve product will be formed in solution. It can be recovered by standard means, such as by centrifugation or filtration. The product can also be washed, recovered by the same means, and dried.

The use of the ALPO, MeAPO, MeAPSO and SAPO molecular sieves noted herein as active catalytic components are similarly well known in the art. For example, U.S. Pat. No. 4,449,327 describes the use of SAPO materials, and U.S. Pat. No. 4,524,234 the use of ALPO materials, in the conversion of oxygenates to olefins. Further, U.S. Pat. No. 4,527,001 describes the use of SAPO and ALPO materials in the interconversion of small olefins, and U.S. Pat. No. 4,512,875 describes the use of SAPO materials in petroleum cracking processes. The patents in this paragraph are incorporated by reference herein.

In one embodiment of the invention, an active catalytic component comprising, e.g., a metal, metal oxide, zeolite or silicoaluminophosphate, or combination thereof, is incorporated with other formulation matrix materials into a solid, particulate catalyst in which the catalytically active component is present in an amount effective to catalyze the desired conversion reaction. The solid, particulate catalyst may include a catalytically effective amount of the active component and one or more formulation matrix materials, e.g., a filler material or a binder material, or both, to provide a desired property or properties, such as solid, particulate catalyst activity, particle size or particle size range, heat capacity, mechanical strength, attrition resistance, mesoporosity and the like, to the solid, particulate catalyst. The formulation matrix materials are desirably catalytically inert (do not promote conversion of the feedstock or the desired products), but are often to some extent porous in nature and have some nonselective catalytic activity to promote the formation of undesired products, or in other instances have desirable properties other than catalytic conversion of a hydrocarbon feedstock to desired products and also be considered a facilitating material. Such formulation matrix materials include, for example, synthetic and naturally occurring substances, metal oxides, clays, silicas, aluminas, alumina-halogen compounds, silica-aluminas, silica-magnesias, silica-zirconias, silica-thorias, silica-beryllias, silica-titanias, silica-alumina-thorias, silica-aluminazirconias, and mixtures of these materials. In one embodiment, a particular binder material utilized is the alumina-halogen compound aluminum chlorhydril, also known as aluminum hydroxychloride.

Desirably, the solid, particulate catalyst is fluidizable under the reaction conditions, i.e., the solid, particulate catalyst will, to some extent, be dynamically suspended by or carried along with the flow of feedstock, product and other vapors through the reaction zone of the hydrocarbon conversion apparatus of the present invention, depending in part on the gas superficial velocity of the vapor flow. The solid, particulate catalyst thus has a characteristic size relative to its density that is effective for fluidization under reaction conditions, and is termed herein a solid, particulate catalyst. Embodiments include solid, particulate catalysts having a Geldart A or a Geldhart B classification. See Geldhart, D. (1973) Types of gas fluidization, *Powder Technology*, 7, 185-195. In various other embodiments, the solid particulate catalyst has a particle size of less than about 2000µ, or from about 0.1µ to about 1,000µ, or from about 20µ to about 500µ, or from about 30µ to about 200µ. In other embodiments, the solid particulate catalyst has a particle density of from about 50 pounds/cubic foot to about 200 pounds/cubic foot, or from about 70 pounds/cubic foot to about 150 pounds per cubic foot, or about 85 pounds per cubic foot to about 110 pounds per cubic foot.

The solid particulate catalyst, in various other embodiments, comprises about 1% to about 99%, or about 5% to about 90%, or about 10% to about 80%, by weight of active catalyst component; and an amount of about 1% to about 99%, or about 5% to about 90%, or about 10% to about 80%, or about 41% to about 79% by weight of formulation matrix material. In various other embodiments, the solid particulate catalyst has a heat capacity of from about 0.05 to about 1 cal/g-° C., or from about 0.1 to about 0.8 cal/g-° C., or from about 0.1 to about 0.5 cal/g-° C.

Any conventional method of preparing solid, particulate catalysts comprising the active component and formulation matrix material can be used. One may employ a variety of methods to achieve the desired physical and chemical characteristics. Such methods include, but are not necessarily limited to hydrothermal treatment, calcination, acid treatment, base treatment, milling, ball milling, grinding, spray drying, and combinations thereof. Examples include U.S. Pat. Nos. 3,464,929; 3,542,670; 3,562,148; 4,443,553; and 4,542,118; all incorporated herein by reference. One embodiment of the method of the present invention includes mixtures of different solid, particulate catalysts having different compositions, for example, two solid, particulate catalysts, each containing a different type of active catalyst material.

The hydrocarbon conversion method and apparatus of the present invention is particularly suited for conducting an oxygenate to olefin conversion reaction. In an oxygenate to olefin conversion reaction, an oxygenated hydrocarbon feedstock is contacted with a suitable solid, particulate catalyst under sufficient conditions to convert the oxygenated hydrocarbon to light olefins. Light olefins comprise ethylene and propylene, and optionally C4 olefins.

The process for converting oxygenates to olefins employs a feedstock including an oxygenate. The terms "oxygenate," "oxygenated hydrocarbon," and "oxygenate compound," and forms thereof, have the same meaning and are used interchangably. The oxygenate feedstock of this invention comprises at least one organic compound which contains at least one oxygen atom, such as aliphatic alcohols, ethers, or carbonyl compounds (aldehydes, ketones, carboxylic acids, carbonates, esters and the like). When the oxygenate is an alcohol, the alcohol can include an aliphatic moiety having from 1 to 10 carbon atoms, more preferably from 1 to 4 carbon atoms. Representative alcohols include, but are not limited to, lower straight and branched chain aliphatic alcohols and their unsaturated counterparts. Examples of suitable oxygenates include, but are not limited to: methanol; ethanol; n-propanol; isopropanol; $C_4$-$C_{20}$ alcohols; methyl ethyl ether; dimethyl ether; diethyl ether; di-isopropyl ether; formaldehyde; acetaldehyde; dimethyl carbonate; acetone; dimethyl ketone; acetic acid; and mixtures thereof. Preferred oxygenates are methanol, dimethyl ether, or a mixture thereof.

The invention can include the additional step of making oxygenates from other hydrocarbons such as oil, coal, tar sand, shale, biomass and natural gas. Methods for making oxygenates are known in the art. These methods include fermentation to alcohol or ether, making synthesis gas, then converting the synthesis gas to alcohol or ether. Synthesis gas can be produced by known processes such as steam reforming, autothermal reforming and partial oxidization.

In one embodiment of the invention, a diluent may be introduced to the reactor apparatus. In a particular embodiment, one or more inert diluents may be present in a mixture with an oxygenate, for example, in an amount of from 1 to 99 molar percent of the mixture, and the oxygenate feedstock is mixture of an oxygenate and a diluent. As defined herein, diluents are compositions which are essentially non-reactive across a molecular sieve catalyst, and primarily function to make the oxygenates in the feedstock less concentrated. Typical diluents include, but are not necessarily limited to, helium, argon, nitrogen, carbon monoxide, carbon dioxide, water in liquid form or as steam, essentially non-reactive paraffins (especially the alkanes such as methane, ethane, and propane), essentially non-reactive alkenes, essentially non-reactive aromatic compounds, and mixtures thereof. In another embodiment, a diluent is introduced to the hydrocarbon conversion apparatus of the present invention in a separate stream from an oxygenate feedstock, and is not a mixture with an oxygenate, for example, by using a diluent as a fluidization gas or a lift gas. In general, in an apparatus or method of the present invention, a diluent, per se, or a diluent stream that contains no reactive material (e.g., that does not further contain an oxygenate or an addition reactive hydrocarbon), is not to be considered a feedstock.

Another aspect of the invention maintains that an additional reactive hydrocarbon is introduced to at least one of the reaction stages. As defined herein, additional reactive hydrocarbons are hydrocarbon compositions which do not include an oxygen atom, and which are converted to another chemical arrangement when contacted with the solid, particulate catalyst used to facilitate the oxygenate to olefins reaction. Further, additional reactive hydrocarbons are provided to the reaction stages from outside the hydrocarbon conversion system, i.e., ex situ, in contrast with reactive hydrocarbons that may be produced by the desired hydrocarbon conversion reaction within one of the reaction stages (e.g., propylene produced by an oxygenate to olefin conversion reaction within a reaction stage in situ is not to be considered additional reactive hydrocarbon introduced at least one of the reaction stages).

One or more additional reactive hydrocarbons may be present in a mixture with an oxygenate, for example, in an amount of from 1 to 99 molar percent of the mixture, and the oxygenate feedstock is mixture of an oxygenate and an additional reactive hydrocarbon. Additional reactive hydrocarbons include olefins, reactive paraffins, reactive aromatics and alkylaromatics, or mixtures thereof. In various embodiments, additional reactive hydrocarbons include, propylene, butylene, pentylene, $C_4^+$ hydrocarbon mixtures, $C_5^+$ hydrocarbon mixtures, particularly $C_4^+$ or $C_5^+$ hydrocarbon mixtures which are obtained from separation and recycle of oxygenate conversion product, and mixtures thereof. In another embodiment, an additional reactive hydrocarbon is introduced to at least one of the reaction stages in a separate stream from an oxygenate feedstock. An additional reactive hydrocarbon may be introduced to any part of a reaction stage.

In general, any reactive hydrocarbon which will undergo conversion to a product at appropriate conditions using a solid, particulate catalyst, is to be considered a feedstock when determining manifestations of the present invention. Thus, in general, the present invention may be used to react more than one type of material, or to conduct more than one type of hydrocarbon conversion reaction. For example, an oxygenate may be provided to one portion of the reaction system, and an additional reactive hydrocarbon may be provided to another; one of the feedstock elements providing either of these materials to the reaction system may serve to define the lowest feedstock inlet, with the alternate being another feedstock inlet, and both feedstock elements are used to determine the volume of the reaction zone and reaction stages, pursuant to the definitions and explanations provided herein.

Returning to the discussion of an oxygenate to olefins conversion reaction, a portion of the oxygenate feedstock optionally comprising a diluent or additional reactive hydrocarbon, or separate diluent or additional reactive hydrocarbon stream, or portions of each in any combination, may be provided in liquid form. These liquid portions may be directly injected into a reaction stage, or entrained or otherwise carried into at least one of the reaction stages with any vapor portions of the oxygenate feedstock, diluent or additional reactive hydrocarbon. By providing a liquid to at least one of the reaction stages, the temperature can be reduced over providing all the feed as a vapor. The exothermic heat of reaction of oxygenate conversion is partially absorbed by the endothermic heat of vaporization of the liquid portion of the feed. Controlling the proportion of liquid to vapor provided to a reaction stage is one possible method for controlling the temperature of the reaction.

The amount of oxygenate feedstock optionally comprising a diluent or additional reactive hydrocarbon, or separate diluent or additional reactive hydrocarbon stream, provided in a liquid form to a reaction stage is from about 0.1 wt. % to about 85 wt. % of the total oxygenate, additional reactive hydrocarbon and diluent sent to the reaction stage in any form. In another embodiment, the range is from about 1 wt. % to about 75 wt. % of the total oxygenate, additional reactive hydrocarbon and diluent sent to a reaction stage in any form, and in yet another aspect, the range is from about 5 wt. % to about 30 wt. %. One particularly effective liquid is water, due to its relatively high heat of vaporization, which allows for a relatively high impact on the reaction temperature at a relatively small rate. Proper selection of the temperature and pressure of the oxygenate feedstock optionally comprising a diluent or additional reactive hydrocarbon, or separate diluent or additional reactive hydrocarbon stream will ensure at least a portion is in the liquid phase as it enters a reaction stage and comes into contact with the catalyst or vapors therein.

In one embodiment of the invention, all of the oxygenate feedstock optionally comprising a diluent or additional reactive hydrocarbon, and additional reactive hydrocarbon, if any, in any form is provided to the first reaction stage. In other embodiments, at least about 90 wt. %, or at least about 80 wt. %, or at least about 75 wt. % of all of the oxygenate feedstock optionally comprising a diluent or additional reactive hydrocarbon, and additional reactive hydrocarbon, if any, is provided to the first reaction stage. In another embodiment, all of the oxygenate feedstock optionally comprising a diluent or additional reactive hydrocarbon, and additional reactive hydrocarbon, if any, in any form is provided through the lowest feedstock inlet. Other embodiments maintain that at least about 90 wt. %, or at least about 80 wt. %, or at least about 75 wt. % of all of the oxygenate feedstock optionally comprising a diluent or additional reactive hydrocarbon, and additional reactive hydrocarbon, if any, provided in any form to the first reaction stage is provided through the lowest feedstock inlet.

In one embodiment of conducting an oxygenate to olefins reaction, a solid, particulate catalyst comprising a "small" pore molecular sieve is utilized. In another embodiment, a solid, particulate catalyst comprising a SAPO is utilized to conduct an oxygenate to olefins reaction. In still other embodiments, the SAPO utilized has a $Si/Al_2$ ratio of less than 0.65, or a $Si/Al_2$ ratio of not greater than 0.40, or a $Si/Al_2$ ratio of not greater than 0.32, or a $Si/Al_2$ ratio of not greater than 0.20. In another aspect, the SAPO is a small pore molecular sieve that has an average pore size of less than about 5 angstroms, preferably an average pore size ranging from about 3.5 to 5 angstroms, more preferably from 3.5 to 4.2 angstroms. In yet other aspects, the SAPO utilized is selected from the group of SAPO-17, SAPO-18, SAPO-34, SAPO-44 and SAPO-47, the metal containing (MeAPSO) forms thereof, and mixtures thereof.

Another embodiment of the invention maintains that the small pore molecular sieve utilized is an intergrowth material having two or more distinct phases of crystalline structures within one molecular sieve composition. In another embodiment, the small pore intergrowth molecular sieve utilized comprises an intergrowth of AEI and CHA framework-types. For example, SAPO-18, ALPO-18 and RUW-18 have an AEI framework-type, and SAPO-34 has a CHA framework-type. In particular, the small pore intergrowth molecular sieve utilized is one described in U.S. patent application Ser. No.

09/924,016 filed Aug. 7, 2001, or in PCT WO 98/15496 published Apr. 16, 1998, both of which are herein fully incorporated by reference, or a mixture of the two.

When conducting a hydrocarbon conversion reaction according to this invention, certain combinations of gas superficial velocity and average gas superficial velocity (and in direct proportion to increasing velocity), and characteristics of the solid, particulate catalyst (inversely proportional with density and particle size), will cause substantial portions of the solid, particulate catalyst to be entrained with the gas flowing through the reaction zone, and flow through the second material transit into the separation device. In one embodiment of the invention, at least a portion of the solid, particulate catalyst flowing through the second material transit and into the separation device is circulated from the separation device to the reaction zone to again contact feedstock and facilitate a conversion reaction. In various aspects of this, at least a portion of the solid, particulate catalyst is circulated to the first reaction zone, or at least a portion of the solid particulate catalyst is circulated to the second reaction zone. In a particular aspect, at least one portion of the solid, particulate catalyst from the separation device is circulated to the first reaction stage, and at least another portion of the solid particulate catalyst is circulated to the second reaction stage. In another, more particular aspect of this, at least a portion of the solid, particulate catalyst is circulated to the first reaction stage and none is circulated to the second reaction stage. In one other, more particular aspect of this, at least a portion of the solid, particulate catalyst is circulated to the second reaction stage and none is circulated to the first reaction stage. For an oxygenate to olefin conversion reaction, the rate of solid, particulate catalyst circulated from the separation device to the reaction zone, or preferably to the first reaction stage, is desirably from about 1 to about 100 times, or from about 10 to about 80 times, or from about 10 to about 50 times the total rate of oxygenate feedstock and any additional reactive hydrocarbon provided to the reaction zone.

In an oxygenate to olefin conversion reaction, light olefin products, i.e., ethylene and propylene, will form over a wide range of temperatures depending, at least in part, on the solid, particulate catalyst, the amount of solid, particulate catalyst circulated from the separation device to the reaction zone, the amount of regenerated catalyst provided to the reaction zone, the total pressure and partial pressures within the reaction zone, and the specific configuration of the reactor apparatus and reaction zone. In various embodiments, the oxygenate to olefin conversion reaction is conducted at a temperature of from about 200° C. to about 700° C., or from about 300° C. to about 600° C., or from about 400° C. to about 520° C. Lower temperatures generally result in lower rates of reaction, and the formation of light olefins may become markedly slower. However, at higher temperatures the process may form a unattractively low amount of light olefin products, and the amount of undesirable byproducts such as carbonaceous deposits (or coke) and light saturates (e.g., methane and propane) formed may be unattractively high.

Light olefin products will also form over a wide range of pressures. In several aspects, the initial partial pressure of oxygenate and any additional reactive hydrocarbons present in the reaction zone is from about 0.1 kPa to about 5 MPa, or from about 5 kPa to about 1 MPa, or from about 20 kPa to about 500 kPa. By initial partial pressure is meant the partial pressure within the reaction zone of the combined (rate averaged) composition of all the oxygenates and optionally additional reactive hydrocarbons as provided to the reaction zone, prior to reaction (the balance of partial pressures providing the total pressure within the reaction zone may come from any diluents present).

A wide range of weight hourly space velocity (WHSV) for the oxygenate conversion reaction, defined as the total weight of all the oxygenates and optionally additional reactive hydrocarbons provided to the reaction zone per hour per weight of molecular sieve in the solid, particulate catalyst in the reaction zone, function within the invention. The total weight of all the oxygenates and optionally additional reactive hydrocarbons provided to the reaction zone includes that provided in both the vapor and liquid form. Although the catalyst may contain other materials such as fillers and binders, as used herein, the WHSV is determined using only the weight of the molecular sieve in the solid, particulate catalyst in the reaction zone. In various aspects, the WHSV is from about 1 $hr^{-1}$ to about 1000 $hr^{-1}$, or from about 2 $hr^{-1}$ to about 500 $hr^{-1}$, or from about 5 $hr^{-1}$ to about 200 $hr^{-1}$, or from about 10 $hr^{-1}$ to about 100 $hr^{-1}$, or from about 15 $hr^{-1}$ about 50 $hr^{-1}$, or from about 18 $hr^{-1}$ to about 35 $hr^{-1}$.

Oxygenate conversions of 99.0% to 100.0% are useful if there is a specific need to minimize the potential recycle of unreacted methanol separated from the conversion products. If a particular objective is to increase oxygenate conversion yield or selectivity to light olefins, particularly ethylene and propylene, a first hydrocarbon feedstock conversion of no greater than about 80.0%, or no greater than about 75.0%, or no greater than about 70.0%, and a second hydrocarbon feedstock conversion of no greater than about 99.5%, or no greater than about 98.0%, or no greater than about 96.0%, or no greater than about 95.0% is useful, dependent upon, among other things, the choice of operating temperature, proportion and type of molecular sieve in the solid, particulate catalyst, and amount of regenerated solid, particulate catalyst provided to the reaction zone. If a particular objective is to reduce reaction zone volume, a first hydrocarbon feedstock conversion of at least about 40.0%, or at least about 50.0%, or at least about 60.0%, or at least about 65.0%, or at least about 70.0%, and a second hydrocarbon feedstock conversion of no greater than about 98.5%, or no greater than about 96.0%, or no greater than about 95.0%, or about no greater than about 94.0% is useful. Of course, these last two factors may be correlated with the cost of potentially recycling unconverted oxygenate feedstock to select a particular embodiment for a given situation.

While conducting an oxygenate conversion reaction of the present invention, one may utilize the operating parameters of the reaction process, such as characteristics of the solid, particulate catalyst and GSVs, to provide a different mass of solid, particulate catalyst within each reaction stage. Note that the mass of solid, particulate catalyst in a reaction stage is dynamically residing therein; although the same amount of solid, particulate catalyst, with respect to mass, may be in a given reaction stage during the course of operation, it may be different individual particles at any point in time, since the solid, particulate catalyst is flowing through the reaction zone. The desire to provide a different mass of solid, particulate catalyst in a reaction stage relative to the total mass in both the first and second reaction stages can be a useful criteria in the design of an apparatus of the present invention, and the method of conducting a hydrocarbon conversion reaction.

In various embodiments of the invention involving an oxygenate conversion reaction, the mass of solid, particulate catalyst in the second reaction stage is at least about 10.0 wt. %, or at least about 20.0 wt. %, or at least about 30.0 wt. %, or at least about 40.0 wt. %, or at least about 50.0 wt. % of the sum of the mass of solid, particulate catalyst in the first and second reaction stages. In other embodiments involving an oxygenate conversion reaction, the mass of solid, particulate catalyst in the second reaction stage is no greater than about 80.0 wt. %, or no greater than about about 70.0 wt. %, or no greater than about about 60.0 wt. %, or no greater than about about 50.0 wt. %, or no greater than about about 40.0 wt. % of the sum of the mass of solid, particulate catalyst in the first and second reaction stages. In yet other embodiments involving an oxygenate conversion reaction, the mass of solid, particulate catalyst in the second reaction stage is any logical range selected from the following: at least about 10.0 wt. %, or at least about 20.0 wt. %, or at least about 30.0 wt. %, or at least about 40.0 wt. %, or at least about 50.0 wt. %, and; no greater than about 80.0 wt. %, or no greater than about about 70.0 wt. %, or no greater than about about 60.0 wt. %, or no greater than about 50.0 wt. %, or no greater than about about 40.0 wt. % of the sum of the mass of solid, particulate catalyst in the first and second reaction stages.

In particular, if the objective is to increase oxygenate conversion yield or selectivity to light olefins, particularly ethylene and propylene, a mass of solid, particulate catalyst in the second reaction stage of at least about 15.0%, or at least about 20.0%, or at least about 25.0% of the sum of the mass of solid, particulate catalyst in both the first and second reaction stages is useful, dependent upon, among other things, the choice of operating temperature, proportion and type of molecular sieve in the solid, particulate catalyst, and desired extent of conversion in each reaction stage.

Many means of measuring and calculating the mass of solid, particulate catalyst in a reaction stage of the present invention are well known to those skilled in the art. One simple means comprises a determination of the pressure differential between two different heights in the same stage in the same direction as gravity during operation. The pressure differential is then divided by the difference in the height, which provides an average density within the stage. This average density is then multiplied by the volume of the stage under consideration, which is known through straightforward geometric calculations based on the design or actual measurements of the the stage, which provides a determination of mass in the stage. Due to the large difference in the density between the hydrocarbon feedstock, diluents, and conversion products within a stage under consideration and the density of the solid, particulate catalyst within that element, it is permissible to consider that determined mass to be the mass of solid, particulate catalyst within that element. The masses of each portion of a stage may be added to determine the total mass within the stage, being careful not to double count volumes. In the the present invention, the solid, particulate catalyst is moved around among the various elements in a random fashion such that an appropriate sample volume of solid, particulate catalyst in any stage or portion thereof will be very similar, in terms of the proportion of molecular sieve and binders and fillers. Thus, there is typically no need to consider the actual proportion of sieve and binders and fillers in the solid, particulate catalyst in making the determination of the mass of the solid, particulate catalyst in a reaction stage, even if different proportions are added to the reaction stages at different times.

During the conversion of oxygenates to light olefins, carbonaceous deposits (or coke) accumulate on the solid, particulate catalyst used to promote the conversion reaction. At some point, the build up of these carbonaceous deposits causes a reduction in the capability of the solid, particulate catalyst to convert the oxygenate feedstock to light olefins. At this point, the solid, particulate catalyst is partially deactivated. When a solid, particulate catalyst can no longer convert an oxygenate to an olefin product, the solid, particulate catalyst is considered to be fully deactivated. As an optional step in an oxygenate to olefin conversion reaction, a portion of the solid, particulate catalyst is withdrawn from a reaction stage and at least partially, if not fully, regenerated. By regeneration, it is meant that the carbonaceous deposits are at least partially removed from the solid, particulate catalyst. Desirably, the portion of the solid, particulate catalyst withdrawn from the reaction stage is at least partially deactivated. The regenerated solid, particulate catalyst, with or without cooling, is then returned to at least one of the reaction stages. The solid, particulate catalyst may be withdrawn from either reaction stage at any location and be sent to the regenerator. In one embodiment, the catalyst is withdrawn from the separation device having traveled through the second material transit. In this embodiment, the rate of withdrawing the portion of the solid, particulate catalyst for regeneration is from about 0.1% to about 99% of the rate of the solid, particulate catalyst through the second material transit into the separation device. More particularly, the rate is from about 0.2% to about 50%, and, most desirably, from about 0.5% to about 5%.

In another embodiment, a portion of the solid, particulate catalyst is removed from a reaction stage for regeneration and returned to at least one of the reaction stages at a rate of from about 0.1 times to about 10 times, more desirably from about 0.2 to about 5 times, and most desirably from about 0.3 to about 3 times the total feedstock rate of oxygenates and additional reactive hydrocarbon to the reaction stage.

Regeneration is carried out in the presence of a gas comprising oxygen or other oxidants. Examples of other oxidants include, but are not necessarily limited to, singlet $O_2$, $O_3$, $SO_3$, $N_2O$, $NO$, $NO_2$, $N_2O_5$, and mixtures thereof. Air, air enriched with oxygen, and air diluted with nitrogen or $CO_2$ are desired regeneration gases. The oxygen concentration in air can be reduced to a controlled level to minimize overheating of, or creating hot spots in, the regenerator. The solid, particulate catalyst may also be regenerated reductively with hydrogen, mixtures of hydrogen and carbon monoxide, or other suitable reducing gases.

In general, the solid, particulate catalyst may be regenerated in any number of methods—batch, continuous, semi-continuous, or a combination thereof. Continuous solid, particulate catalyst regeneration is a desired method. In particular, for an oxygenate to olefin conversion reaction, the solid, particulate catalyst is regenerated to a level of remaining coke from about 0.01 wt % to about 15 wt % of the weight of the solid, particulate catalyst.

The solid, particulate catalyst regeneration temperature should be from about 250° C. to about 750° C., and desirably from about 500° C. to about 700° C. Because the regeneration reaction takes place at a temperature considerably higher than the oxygenate conversion reaction, it may be desirable to cool at least a portion of the regenerated solid, particulate catalyst to a lower temperature before it is sent back to the reactor shell that houses the reaction stages. In general, and for an oxygenate to olefin conversion reaction, a catalyst cooler, such as catalyst cooler 554 shown in FIG. 5A, located external to the regenerator may be used to remove some heat from the solid, particulate catalyst after it has been withdrawn from the regenerator. When the regenerated solid, particulate catalyst is cooled, it is desirable to cool it to a temperature which is from about 200° C. higher to about 200° C. lower than the temperature of the solid, particulate catalyst which exits from the reactor shell that houses the reaction stages. More desirably, the regenerated solid, particulate catalyst is cooled to a temperature from about 10° C. to about 200° C. lower than the temperature of the solid, particulate catalyst from the reactor shell. This cooled solid, particulate catalyst then may be returned to either some portion of the reactor shell, the regenerator, or both. When the regenerated solid, particulate catalyst from the regenerator is returned to the reactor shell, it may be returned to any portion of the reactor shell.

In one embodiment, solid, particulate catalyst regeneration is carried out on an at least partially deactivated solid, particulate catalyst that has been stripped of most of readily removable organic materials (organics) in a stripper or stripping chamber first. This stripping can be achieved by passing a stripping gas over the spent solid, particulate catalyst at an elevated temperature. Gases suitable for stripping include steam, nitrogen, helium, argon, methane, $CO_2$, CO, hydrogen, and mixtures thereof. A preferred gas is steam. Gas hourly space velocity (GHSV, based on volume of gas to volume of solid, particulate catalyst and coke) of the stripping gas is from about 0.1 $h^{-1}$ to about 20,000 $h^{-1}$. Acceptable temperatures of stripping are from about 250° C. to about 750° C., and desirably from about 350° C. to about 675° C.

An embodiment of the invention further includes separation and purification of the conversion products to produce high purity olefins. High purity olefins are generally recognized by those skilled in the art to contain at least about 80 wt. % olefin of a single carbon number, preferably at least about 90 wt. %, more preferably at least about 95 wt. %, and most desirably at least about 99 wt. %. High purity olefins are also generally recognized as meeting further requirements around what type of components may be present with the desired olefin of a single carbon number. For example, in various embodiments of the present invention one or more products such as high purity ethylene, high purity propylene or high purity butylenes may be produced. In another embodiment of the present invention the high purity butylene product may be further processed to form products comprised of very high concentrations of particular butylene isomers, for example, high purity butene-1 comprising at least about 80 wt. % butene-1, or alternatively at least about 90 wt. % butene-1.

Purification to make high purity olefins traditionally requires removal of low level impurities or contaminants which interfere with the use of high purity olefins in subsequent derivative manufacture, particularly in the polymerization of ethylene and propylene. Low level contaminants generally comprise polar molecules, including oxygenates such as water, alcohols, carboxylic acids, aldehydes, ethers, ketones, esters and carbon oxides; sulfur compounds such as hydrogen sulfide, carbonyl sulfide and mercaptans; ammonia and other nitrogen compounds; arsine, phosphine; and chlorides. Other contaminants can be hydrocarbons such as acetylene, methyl acetylene, propadiene, butadiene and butyne, among others. Hydrogen is another contaminant of high purity olefin streams.

Low level contaminants in the oxygenate conversion products can be removed by a variety of processes, including hydrogenation reactions to saturate certain hydrocarbons; acid-base reactions, e.g. caustic washes to remove certain sulfur compounds and carbon dioxide; absorption of certain polar compounds with various materials, such as solid molecular sieves; extraction with various solvents; membrane permeation; and fractional distillation. In addition, the desired olefin of a given boiling point may be separated from a mix of olefins and paraffins of various other boiling points, including paraffins having the same number of carbon atoms as the desired olefin. This can be done using conventional fractional distillation techniques, or also using conventional absorbtion, extraction or membrane separations.

The oxygenate to olefin reaction may be particularly effective at high scales (oxygenate feedstock and additional reactive hydrocarbon, with commensurate prime olefin product rates and reactor apparatus volumes) which will benefit from the reduced cost of the apparatus in conjunction with the enhanced conversion of oxygenate feedstock to desired products. In alternative embodiments, the prime olefin (ethylene plus propylene) product generated using the oxygenate to olefin method of the present invention is any one of the following: at least about 4,500 kg per day; at least about 250,000 kg per day, at least about 500,000 kg per day; at least about 1,000,000 kg per day; at least about 1,300,000 kg per day; at least about 1,900,000 kg per day; and at least about 2,700,000 kg per day. An example of a type of apparatus utilizing multiple discrete riser shells with discrete reaction zones attached to a common separation device is found in co-pending patent application U.S. Ser. No. 09/564,613, incorporated herein by reference in its entirety.

A useful alternative embodiment of the present invention involves employing more than one discrete reactor shell joined to a common separation device. In one embodiment, one would replace the riser shells with a plurality of reactor shells including a tapering element and other features as disclosed earlier herein. In particular embodiments of employing multiple discrete reactor shells with a common separation device, it is useful to conduct an oxygenate to olefin reaction as detailed herein wherein each reactor shell generates prime olefin (ethylene plus propylene) product at any one of the following rates: at least about 250,000 kg per day and no greater than about 750,000 kg per day, and at least about 450,000 kg per day and no greater than about 650,000 kg per day.

The olefins produced by the oxygenate-to-olefin conversion reaction can be polymerized to form polyolefins, particularly polyethylene and polypropylene. Conventional processes can be used. Catalytic processes are preferred. Particularly preferred are metallocene, Ziegler/Natta and acid catalytic systems. See, for example, U.S. Pat. Nos. 3,258,455; 3,305,538; 3,364,190; 5,892,079; 4,659,685; 4,076,698; 3,645,992; 4,302,565; and 4,243,691, the catalyst and process descriptions of each being expressly incorporated herein by reference. In general, these methods involve contacting the olefin product with a polyolefin-forming catalyst at a pressure and temperature effective to form the polyolefin product.

A preferred polyolefin-forming catalyst is a metallocene catalyst. The preferred temperature range of operation is between 50 and 240° C. and the reaction can be carried out at low, medium or high pressure, being anywhere within the range of about 1 to 200 bars. For processes carried out in solution, an inert diluent can be used, and the preferred operating pressure range is between 10 and 150 bars, with a preferred temperature range of between 120 and 230° C. For gas phase processes, it is preferred that the temperature generally be within a range of 60 to 160° C., and that the operating pressure be between 5 and 50 bars.

In addition to polyolefins, numerous other olefin derivatives may be formed from the olefins recovered therefrom, including high purity olefins. These include, but are not limited to, aldehydes, alcohols, acetic acid, linear alpha olefins, vinyl acetate, ethylene dicholoride and vinyl chloride, ethylbenzene, ethylene oxide, cumene, isopropyl alcohol, acrolein, allyl chloride, propylene oxide, acrylic acid, ethylene-propylene rubbers, and acrylonitrile, and trimers and dimers of ethylene, propylene or butylenes. The methods of manufacturing these derivatives are well known in the art, and therefore, are not discussed herein.

This invention is further described in the following examples, which are intended to illustrate specific embodiments within the overall scope of the invention as claimed.

EXAMPLE 1A

An example of volumes of reaction stages is obtained with regard to FIGS. 1A-B. The first reaction stage 112 has a length of 0.2792 meters, width of 0.2532 meters and a height of 0.3239 meters. The second reaction stage 115 has a length of 0.2532 meters, a width of 0.2532 meters, and a height of 1.4288 meters. Therefore, the volume of the first reaction stage 112 is 0.0229 cubic meters, the volume of the second reaction stage 115 is 0.0916 cubic meters, and the total volume of reaction zone 109 is 0.1145 cubic meters. The AECSA of the first reaction stage 112 is 0.0707 square meters (0.0229 cubic meters/0.3239 meters), and the AED of the first reaction stage is 0.3 meters ($\sqrt{[\{4 \times 0.0707 \text{ square meters}\}/\pi]}$). The AECSA of the second reaction stage 115 is 0.0642 square meters (0.0916 cubic meters/1.4288 meters), and the AED of the second reaction stage is 0.2857 meters ($\sqrt{[\{4 \times 0.0642 \text{ square meters}\}/\pi]}$). The ratio of the length of the second reaction stage 115 to the AED of the second reaction stage 115 is 5.0 (1.4288 meters/0.2857 meters), and the ratio of the AED of the first reaction stage 112 to the AED of the second reaction stage 115 is 1.05:1 (0.3 meters/0.2857 meters).

EXAMPLE 1B

In the embodiment in FIGS. 1A-B, the volume of the first reaction stage 112 is chosen to be 20% of the sum of the volume of the first reaction stage 112 and the second reaction stage 115 as calculated in Example 1A. The volume of the first reaction stage 112 is, therefore, equal to 0.0229 cubic meters (0.2×0.1145 cubic meters). The first material transit 148, through which a solid, particulate catalyst, a conversion product and unreacted feedstock flow out of first reaction stage 112 and into the second reaction stage 115, is thus established as the cross-section plane, within reactor shell 106 and parallel to grade having a height of 0.3239 meters above the lowest feedstock inlet (as that height provides the chosen first reaction stage volume of 0.0229 cubic meters [0.2792 meters×0.2532 meters×0.3239 meters] within the reactor shell 106 between the lowest feedstock inlet 118 and the first material transit 148).

EXAMPLE 1C

Referring to the embodiment in FIGS. 1A-B, the highest point of the first reaction stage and the second reaction stage is determined. In this example, the highest point of the first reaction stage and second reaction stage is at an elevation of 1.7527 meters (first reaction stage 112 having a height of 0.2532 meters and second reaction stage 115 having a height of 1.4288 meters) plus the elevation of the lowest point of the lowest feedstock inlet 118 over grade.

EXAMPLE 1D

Referring to the embodiment in FIGS. 1A-B, the cross sectional area for net flow is determined. In this example, the direction of net flow of feedstock, product and any other gases that flow through reaction zone 109 is, at all points, upwards perpendicular to grade. Thus within the reaction zone 109 at an elevation of 0.2000 meters above the lowest feedstock inlet 118 the cross-sectional area for net flow is 0.0657 square meters (0.2792 meters×0.2532 meters). Within reaction zone 109 at an elevation of 1.0000 meters above lowest feedstock inlet 118 the cross sectional area for flow is 0.0641 square meters (0.2532 meters×0.2532 meters).

EXAMPLE 1E

Referring to the embodiment in FIGS. 1A-B, the tapering element is at the region where the first reaction zone 112 joins the second reaction zone 115, having a tapering element angle of 90°. Using the dimensions of Example 1A, the tapering element then has an elevation of 0.3239 meters (the height of the first reaction stage) above the lowest point of lowest feedstock inlet 118. This further places the tapering element at an elevation above the lowest point of the lowest feedstock inlet that is about 18% of the difference between the elevation of the lowest point of the lowest feedstock inlet and the highest point of the first reaction stage and the second reaction stage (which is 1.7527 meters).

EXAMPLE 2A

Referring to the embodiment in FIGS. 2A-B, the volume of reaction zone 221, which is the sum of the volumes of first reaction stage 224 and second reaction stage 227, is established by geometric calculations moving along and within the walls of the apparatus between the lowest feedstock inlet 230 and the second material transit 272. For this embodiment, the bottom or widest portion of the first reaction stage 224 has a diameter of 4.0736 meters, with the height of the first and second reaction stages (from the lowest feedstock inlet 230 to the second material transit 272) being 17.5657 meters, and the walls of the reaction zone 221 has a tapering element angle of 5° from the vertical. The tapering element can also be referred to as an iris diaphragm tapering element. The geometry of the walls of the reaction zone 221 (i.e., reaction shell 218) provides a more gradual change in gas superficial velocity than the 90° shift found in the embodiment in FIG. 1A. From these measurements, the total volume of the reaction zone 221 is 99.6436 cubic meters.

EXAMPLE 2B

In the embodiment in FIGS. 2A-B, the volume of the first reaction stage 224 is selected to be 30% of the sum of the volumes of the first reaction stage 224 and second reaction stage 227, which is 29.8931 cubic meters. A first material transit 275, through which a solid, particulate catalyst, a conversion product and unreacted feedstock flow out of the first reaction stage 224 and into the second reaction stage 227, is thus established as the cross section plane, within reactor shell 218 and parallel to grade having a height of 2.5657 meters over the lowest feedstock inlet 230 (and further having a diameter of 3.6247 meters), which provides the selected first reaction stage volume. The volume of the second reaction stage 227, based on the location of the first material transit 275 is by difference 69.7505 cubic meters.

EXAMPLE 2C

Referring to FIGS. 2A-B, and using the dimensions in Examples 2A and 2B, the first reaction stage 224 has an AECSA of 11.6511 square meters, and an AED of 3.8516 meters. The second reaction stage 227 has a length of 15.0000 meters, and so its AECSA is 4.6500 square meters and its AED is 2.4332 meters. Thus the ratio of the length to the AED of the second reaction stage 227 is 6.2, and the ratio of the AED of the first reaction stage 224 to the AED of the second reaction stage 227 is 1.5829:1.

EXAMPLE 3A

Referring to the embodiment in FIGS. 3A-C, the volume of the total reaction zone 314, which is the sum of the volumes of first reaction stage 316 and second reaction stage 318, is established by geometric calculations moving along and within the walls of the apparatus between the lowest feedstock inlet 320 and the second material transit 350. The height of the first reaction stage 316 is 2.3798 meters above the lowest feedstock inlet 320, with a top diameter of 3.8706 meters and a bottom diameter of 6.6188 meters. The walls of the first reaction stage 316 tapering element angle of 30° from vertical. The tapering element can also be referred to as an iris diaphragm tapering element.

The height of the second reaction stage 318 is 22.1202 meters, and the right cylindrical section of the second reaction stage 318, which begins at a height of 4.0000 meters above lowest feedstock inlet 320, has a diameter of 2.0000 meters. The conduit connecting the second reaction stage 318 to the separation device 334 is 2.0000 meters in diameter and 0.8488 meters long, and joins the second reaction stage 318 to the separation device 334 at an angle of 900. The upper portion of the conduit is further located at a distance of 0.5000 meters below the upper portion of the second reaction stage 318. The total volume of the reaction zone 314 is calculated as 131.4714 cubic meters.

The right frustrum of reactor shell 312 has an angle from the perpendicular to grade of about 30°. Such an embodiment provides a more gradual change in gas superficial velocity in the reaction zone than a 90° shift shown in FIG. 1A, while providing a section of constant characteristic width as found in FIG. 1A, and lacking in the embodiment of FIG. 2A.

EXAMPLE 3B

Referring to the embodiment of FIGS. 3A-C, and using the dimensions of Example 3A, the volume of the first reaction stage 316 is selected as 40% of the sum of the volumes of first reaction stage 316 and second reaction stage 318, which is 52.5886 cubic meters. A first material transit 352 through which a solid, particulate catalyst, a conversion product and unreacted feedstock flow out of the first reaction stage 316 and into the second reaction stage 318, is thus established as the cross-section plane, within reactor shell 312 and parallel to grade, having a height of 2.3798 meters above the lowest feedstock inlet 320 (and further having a diameter of 3.8706 meters), which provides the selected first reaction stage volume. The volume of the second reaction stage 318, based on the chosen location of the first material transit 352, is by difference 78.8828 cubic meters.

EXAMPLE 3C

Referring to FIGS. 3A-C, and using the dimensions of Example 3A along with the chosen location of the first material transit 352 in Example 3B, the first reaction stage 316 has a height of 2.3798 meters, an AECSA of 22.0979 square meters, and an AED of 5.3043 meters. Second reaction stage 318 has a length of 20.4690 meters [(22.1202 m−2.0000 m−0.5000 m)+0.8488 m], and so it has an AECSA of 3.8538 square meters, and an AED of 2.2151 meters. Thus the ratio of the length to the AED of the second reaction stage is 9.2407, and the ratio of the first reaction stage AED to the second reaction stage AED is 2.3946:1.

EXAMPLE 4A

Referring to FIG. 4, and using the corresponding dimensions in Example 3A, the sum of the volumes of the first reaction stage 416 and second reaction stage 418 is 131.4714 cubic meters. In this example, however, the volume of first reaction stage 416 is selected as 50% of the sum of the volumes of first reaction stage 416 and second reaction stage 418, which is 65.7357 cubic meters. A first material transit 452 is thus established at a height of 4.5757 meters above the lowest feedstock inlet (and further a location in the right cylindrical portion of the reactor shell with a diameter of 2.0000 meters), which provides the selected first reaction stage volume. The volume of the second reaction stage 418, based on the location of the first material transit 452, is by difference 65.7357 cubic meters.

EXAMPLE 4B

Referring to FIG. 4, and using the dimensions of Example 3A along with the chosen location of the first material transit 352 in Example 4A, the first reaction stage 416 has a height of 4.5757 meters, an AECSA of 14.3663 square meters, and an AED of 4.2769 meters. Second reaction stage 418 has a length of 18.2731 meters [(20.5000 m−2.0000 m−0.5000m)+0.8488 m−(4.5757 m−4.0000 m)], an AECSA of 3.5974 square meters and an AED of 2.1402 meters. Thus, the ratio of the length to the AED of the second reaction stage is 8.5380, and the ratio of the first reaction stage AED to the second reaction stage AED is 1.9984.

From Examples 3 and 4, it can be seen that more than one value in the required range of values for the volumetric proportion of the first reaction stage relative to the sum of the volume of the first and second reaction stages may satisfy the other numerical requirements for $L_2/AED_2$ and $AED_1/AED_2$ on the same apparatus.

EXAMPLE 5A

Referring to the embodiment in FIGS. 5A-D, the volume of reaction zone 510, which is the sum of the volumes of first reaction stage 512 and second reaction stage 514, is established by geometric calculations moving along and within the walls of the apparatus between the lowest feedstock inlet 516 and the second material transit 534. The right cylindrical section of the first reaction stage 512 rises to a height of 8.0588 meters above lowest feedstock inlet 516, at which point there occurs a tapering element angle of 20° from vertical, extending for an additional height of 3.0000 meters, where the first reaction stage 512 joins the second reaction stage 514. The tapering element can also be referred to as an iris diaphragm tapering element. In addition to the iris diaphragm tapering element, the embodiment includes a sudden geometric shift tapering element that is around the set of 90° tapering element angles in the upper portion of the reactor shell 508 adjacent to the second material transit 534, changing the geometry abruptly from a cylinder to a rectangular duct extending the second reaction stage 514.

The first reaction stage 512 has a bottom diameter of 3.6838 meters, the right cylindrical section of the second reaction stage 514 has a diameter of 1.5000 meters, and the second reaction stage 514 has a height of 31.0000 meters. The rectangular conduit connecting the second reaction stage 514 to the separation element 522 is 1.0000 meter high, 0.7500 meter wide, and 0.5000 meter long. The total volume of the reaction zone 510 is calculated as 157.9343 cubic meters.

EXAMPLE 5B

Referring to the embodiment of FIGS. 5A-D, and using the dimensions of Example 5A, the volume of the first reaction stage 512 is selected as 65% of the sum of the volumes of first reaction stage 512 and second reaction stage 514, which is 102.6573 cubic meters. A first material transit 536, through which a solid, particulate catalyst, a conversion product and unreacted feedstock flow out of first reaction stage 512 and into second reaction stage 514, is thus established as the cross-section plane, within reactor shell 508 and parallel to grade, having a height of 11.0588 meters above the lowest feedstock inlet 516 (and further having a diameter of 1.5000 meters), which provides the selected first reaction stage volume. The volume of second reaction stage 514, based on the chosen location of the first material transit 536, is by difference 55.2770 cubic meters.

EXAMPLE 5C

Referring to FIGS. 5A-D, and using the dimensions of Example 5A along with the chosen location of the first material transit 352 in Example 5B, the first reaction stage 512 has a height of 11.0588 meters, an AECSA of 9.2829 square meters, and an AED of 3.4379 meters. Second reaction stage 514 has a length of 30.5000 meters [(31.0000 m−1.0000 m)+0.5000 m], an AECSA of 1.8124 square meters, and an AED of 1.5191 meters. Thus the ratio of the length to the AED of the second reaction stage is 20.0777, and the ratio of the first reaction stage AED to the second reaction stage AED is 2.2631.

EXAMPLE 6A

Referring to FIGS. 6A-C, the volume of reaction zone 612 is 1215.7631 meters. The volume of first reaction stage 614 is selected as 55% of the volume of reaction zone 612, which is 668.6697 cubic meters. A first material transit 646, through which a solid, particulate catalyst, a conversion product and unreacted feedstock flow out of first reaction stage 614 and into second reactions stage 616, is thus determined as the cross-section plane, within reactor shell 610 and parallel to grade, having a height of 31.5078 meters above lowest feedstock inlet 618 (and further having a diameter of 3.0000 meters), which corresponds to the selected first reaction stage volume. The right frustum of the cone at the bottom of the reaction zone 612 has a continuous, constant tapering element angle of about 45 degrees, as well as a continuous, constant tapering element angle of about 10 degrees which converges toward the first material transit 646. The volume of the second reaction stage 616 is by difference 547.0934 cubic meters.

EXAMPLE 6B

Referring to FIGS. 6A-C, the first reaction stage 614 has a height of 31.5078 meters, an AECSA of 21.2224 square meters, and an AED of 5.1982 meters. Second reaction stage 616 has a length of 73.6566 meters, an AECSA of 7.4276 square meters, and an AED of 3.0752 meters. Thus the ratio of the length to AED of the second reaction stage is 23.9518, and the ratio of the first reaction stage AED to the second reaction stage AED is 1.6904.

EXAMPLE 7A

Referring to the embodiment in FIGS. 7A-C, the volume of reaction zone 708 is 1225.2529 cubic meters. The volume of first reaction stage 714 is selected as 56% of the volume of reaction zone 708, which is 686.1416 cubic meters. A first material transit 746, through which a solid, particulate catalyst, a conversion product and unreacted feedstock flow out of first reaction stage 714 and into second reaction stage 716, is thus determined as the cross-section plane, within reactor shell 706 and parallel to grade, having a height of 39.0199 meters above lowest feedstock inlet 718 (and further having a diameter of 3.0000 meters), which corresponds to the selected first reaction stage volume. The volume of the second reaction stage 716 is, by difference, 539.1113 cubic meters.

With further regard to FIG. 7A, the expanding element, right frustum of the cone at the bottom of the apparatus has a continuous, constant tapering element angle of about 45 degrees, and the tapering element, right frustum of the cone just below the first material transit 746 has a continuous, constant tapering element angle of about 10 degrees. Feedstock conduits 712 are shown as being right cylinders, and they have an open end residing within the apparatus at an angle of about 45 degrees.

EXAMPLE 7B

Referring to FIGS. 7A-C, the first reaction stage 714 has a height of 39.0199 meters, an AECSA of 17.5844 square meters, and an AED of 4.7317 meters. Second reaction stage 716 has a length of 72.5274 meters, an AECSA of 7.4332 square meters, and an AED of 3.0764 meters. Thus the ratio of the length to AED of the second reaction stage is 23.5754, and the ratio of the first reaction stage AED to the second reaction stage AED is 1.5381.

EXAMPLE 8A

Referring to the embodiment in FIG. 8, a portion of the cylindrical section of the reactor shell 812 extends 2.0000 meters downward into the lower frusto-conical section, and is assumed to make no change to the volume within the lower frusto-conical section relative to the embodiment shown in FIGS. 3A-C and described in Examples 3A-3C. (In a practical application, this may be achieved by adjusting the dimensions of the frusto-conical section slightly to account for the thickness of the protruding cylindrical section, say by slightly extending the height of the frusto-conical section maintaining the same right frustum tapering element angle and point of intersection with the cylindrical section; for the purpose of simplicity in this discussion of FIG. 8 relative to FIGS. 3A-C, and described in Examples 3A-3C, this calculation is omitted by the immediate assumption). Thus, reaction zone 814 has a volume of 131.4714 cubic meters (the identical volume as described in Example 3A).

EXAMPLE 8B

Referring to the embodiment of FIG. 8, and using the dimensions of Example 3A, the volume of the first reaction stage 816 is selected as 40% of the sum of the volumes of first reaction stage 816 and second reaction stage 818, which is 52.5886 cubic meters (identical to that selected and determined earlier for first reaction stage 316 and second reaction stage 318 in Example 3B). A first material transit 852 is thus established as the cross-section plane, within reactor shell 812 and parallel to grade, having a height of 2.3798 meters above the lowest feedstock inlet, and further having a diameter of 3.8706 meters, which provides the selected first reaction stage volume. The volume of the second reaction reaction stage 818, based on the chosen location of the first material transit 852, is by difference 78.8828 cubic meters. (Yet again, identical to first material transit 352 and second reaction stage 318 in Example 3B).

EXAMPLE 8C

Referring to FIG. 8, the AECSA and AED of the first and second reaction stage, and their various ratios, are identical to those described in Example 3C. Thus, more than one type of reactor shell configuration may provide identical geometries for various transits and identical numerical results for $L_2/AED_2$ and $AED_1/AED_2$.

It should be noted, however, that extending the cylindrical section of the reactor shell into the frusto-conical section as shown in FIG. 8 did change the nature of the tapering element associated with the reaction zone as described in Examples 3A-3C. This occurs by the definition of cross-sectional area for net flow, as while a reaction between a feedstock and a solid particulate catalyst may take place in the annulo-frustum section of the reaction zone 814, no net flow from the lowest feedstock inlet to the second material transit may take place through that section. The embodiment described in Examples 3A-3C uses a tapering element having a right frustum of a cone with a constant tapering element angle of 30 degrees. In FIG. 8, the tapering element is now a portion of that same right frustum, culminating in a shift from a cross-sectional area for net flow within the frustum to that within a right cylinder (at the bottom of the cylindrical section.

EXAMPLE 9A

Referring to the embodiment in FIGS. 9A-D, the first reaction stage 916 has a spherical sector having a constant radius of 3.0000 meters from the geometric center of the bottom cylinder at a height of 2.0000 meters above lowest feedstock inlet 920, providing a reduction in cross-sectional area for net flow from its base (based on a diameter of 6.0000 meters) to its top face (based on a diameter of 4.0000 meters), where the reduction in cross-sectional area for net flow is culminated by the joint with the four parallel cylinders (each cylinder having a diameter of 1.5000 meters). The joint is located at a height of 4.2361 meters above lowest feedstock inlet 920.

The spherical sector as joined to the four parallel cylinders is another example of a tapering element, in this instance a combination of an iris diaphragm type and a sudden geometric shift type. The height of each of the four parallel cylinders is 38.0000 meters to the open slot, with the distance from the open slot to the top of the curved rectangular ducts 929 being 2.000 meters.

EXAMPLE 9B

Referring to the embodiment of FIGS. 9A-D, the volume of reaction zone 914 is 390.8082 cubic meters. The volume of the first reaction stage 916 is selected as 30% of the volume of reaction zone 914, which is 117.2425 cubic meters. A first material transit 952, through which a solid, particulate catalyst, a conversion product and unreacted feedstock flow out of first reaction stage 916 and into second reaction stage 918, is thus established as the cross-section plane, within reactor shell 912 and parallel to grade, having a height of 5.5345 meters above the lowest feedstock inlet 920, which provides the selected first reaction stage volume. The volume of the second reaction stage 918, based on the chosen location of the first material transit 952, is by difference 273.5657 cubic meters.

EXAMPLE 9C

Referring to the embodiment of FIGS. 9A-D, and using the dimensions of Example 9A, the first reaction stage 916 has a height of 5.5345 meters, an AECSA of 21.1839 square meters, and an AED of 5.1935 meters. Second reaction stage 918 has a length of 36.7016 meters (38.0000 m+4.2361 m−5.5345 m), and so it has an AECSA of 21.1839 square meters, and an AED of 5.1935 meters. Thus the ratio of the length to the AED of the second reaction stage is 11.9134, and the ratio of the first reaction stage AED to the second reaction stage AED is 1.6858.

Persons of ordinary skill in the art will recognize that many modifications may be made to the present invention without departing from the spirit and scope of the present invention. The embodiments described herein, alone or in combination, are meant to be illustrative only and should not be taken as limiting the invention, which is defined by the following claims.

The invention claimed is:

1. A method of converting hydrocarbon feed to product, comprising:
    a) contacting a silicoaluminophosphate oxygenate to olefin conversion catalyst with a methanol-containing hydrocarbon feed in a first reaction stage at an average gas superficial velocity (GSV) of at least 1 meter per second and no greater than 10.0 meters per second to form a product at a first hydrocarbon feedstock conversion of at least 20.0% and no greater than 98.0%, and
    b) flowing the product, any unconverted hydrocarbon feed, and the catalyst from the first reaction stage to a second reaction stage in which the first reaction stage has an average equivalent diameter of at least 1.05 times that of the second reaction stage and the second reaction stage is operated at an average GSV greater than the average GSV of the first reaction stage so that conversion of the hydrocarbon feed continues in the second reaction stage, wherein the first and second reaction stages have volumes such that the volume of the first reaction stage is at least 20% and no greater than 90% than a total of the first reaction stage and the second reaction stage volumes, and the second reaction stage has a GSV of at least 2.0 meters per second, and wherein the first reaction stage exhibits more continuously stirred tank reactor type characteristics and the second reaction stage exhibits more plug flow reactor type characteristics.

2. The method of claim 1, wherein the product is formed in the first reaction stage at a first hydrocarbon feedstock conversion of no greater than 95.0%.

3. The method of claim 2, wherein the product is formed in the first reaction stage at a first hydrocarbon feedstock conversion of no greater than 90.0%.

4. The method of claim 3, wherein the product is formed in the first reaction stage at a first hydrocarbon feedstock conversion of no greater than 80.0%.

5. The method of claim 4, wherein the product is formed in the first reaction stage at a first hydrocarbon feedstock conversion of no greater than 70.0%.

6. The method of claim 5, wherein the product is formed in the first reaction stage at a first hydrocarbon feedstock conversion of no greater than 60.0%.

7. The method of claim 1, wherein the conversion in the second reaction stage is carried out at a second hydrocarbon feedstock conversion of least 1.0% higher than the first hydrocarbon feedstock conversion.

8. The method of claim 7, wherein the conversion in the second reaction stage is carried out at a second hydrocarbon feedstock conversion of least 2.0% higher than the first hydrocarbon feedstock conversion.

9. The method of claim 8, wherein the conversion in the second reaction stage is carried out at a second hydrocarbon feedstock conversion of least 5.0% higher than the first hydrocarbon feedstock conversion.

10. The method of claim 9, wherein the conversion in the second reaction stage is carried out at a second hydrocarbon feedstock conversion of least 10.0% higher than the first hydrocarbon feedstock conversion.

11. The method of claim 10, wherein the conversion in the second reaction stage is carried out at a second hydrocarbon feedstock conversion of least 20.0% higher than the first hydrocarbon feedstock conversion.

12. The method of claim 11, wherein the conversion in the second reaction stage is carried out at a second hydrocarbon feedstock conversion of least 25.0% higher than the first hydrocarbon feedstock conversion.

13. The method of claim 1, further comprising separating the catalyst from the product and any unreacted feed in the second stage, wherein the second reaction stage has a second hydrocarbon feedstock conversion of no greater than 99.5%.

14. The method of claim 1, wherein at least 10 wt. %, and no greater than 80.0 wt. %, of the catalyst in the first and second reaction stages is present in the second reaction stage.

15. The method of claim 1, wherein the first and second reaction stages are operated at a WHSV of at least 1 $hr^{-1}$ to 1000 $hr^{-1}$.

16. The method of claim 1, wherein the first reaction stage has a GSV of at least 2.0 meters per second.

17. The method of claim 16, wherein the first reaction stage has a GSV of at least 3.0 meters per second.

18. The method of claim 1, wherein the second reaction stage has a GSV of at least 3.0 meters per second.

19. The method of claim 18, wherein the second reaction stage has a GSV of at least 4.0 meter per second.

20. The method of claim 19, wherein the second reaction stage has a GSV of at least 5.0 meter per second.

21. The method of claim 1, wherein the first and second reaction stages are at a temperature of from 200° C. to 700° C.

22. The method of claim 1, wherein the first reaction stage has an average equivalent diameter of at least 0.3 meters.

23. The method of claim 1, wherein the second reaction stage has a length to average equivalent diameter ratio of at least 5.0:1.

* * * * *